No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 2.
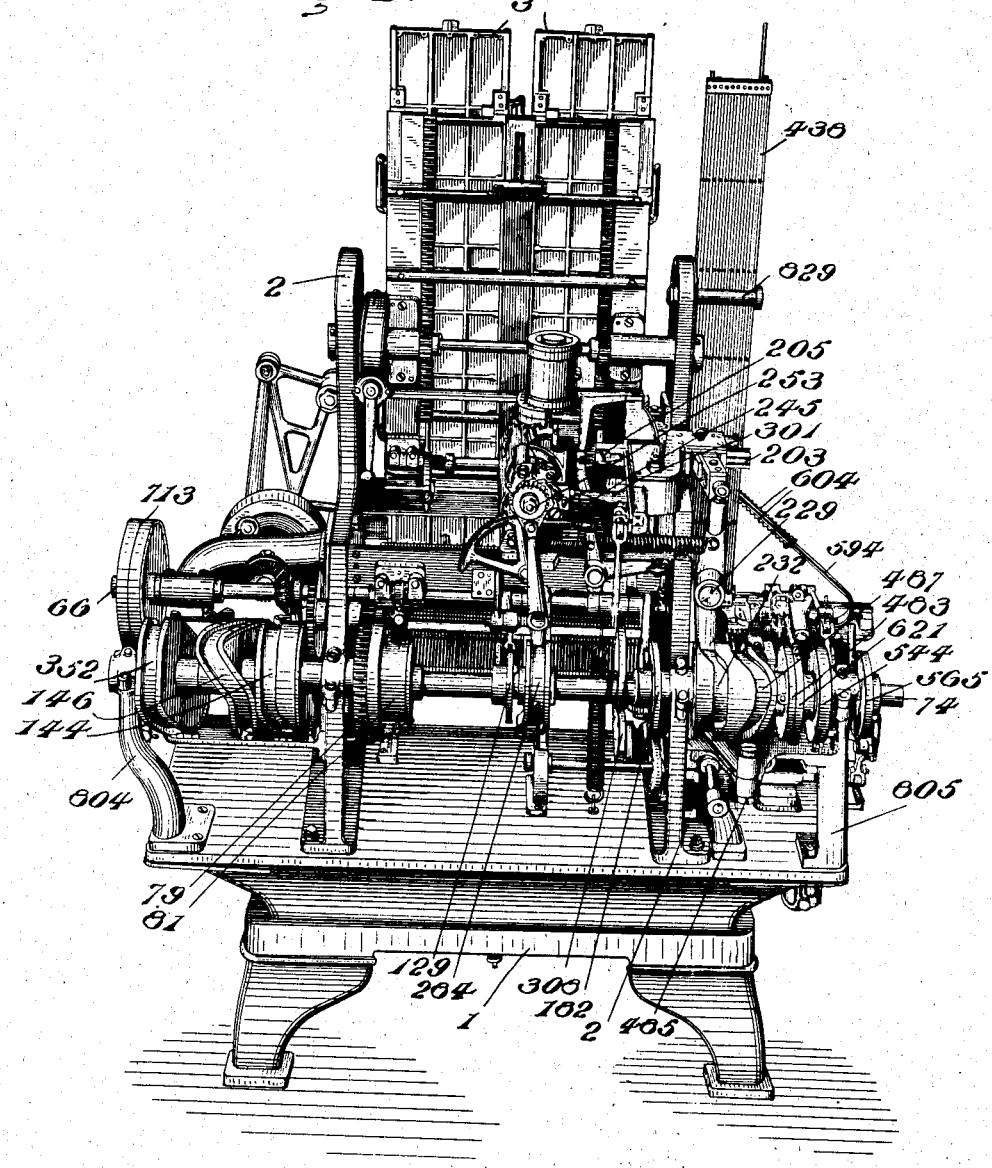

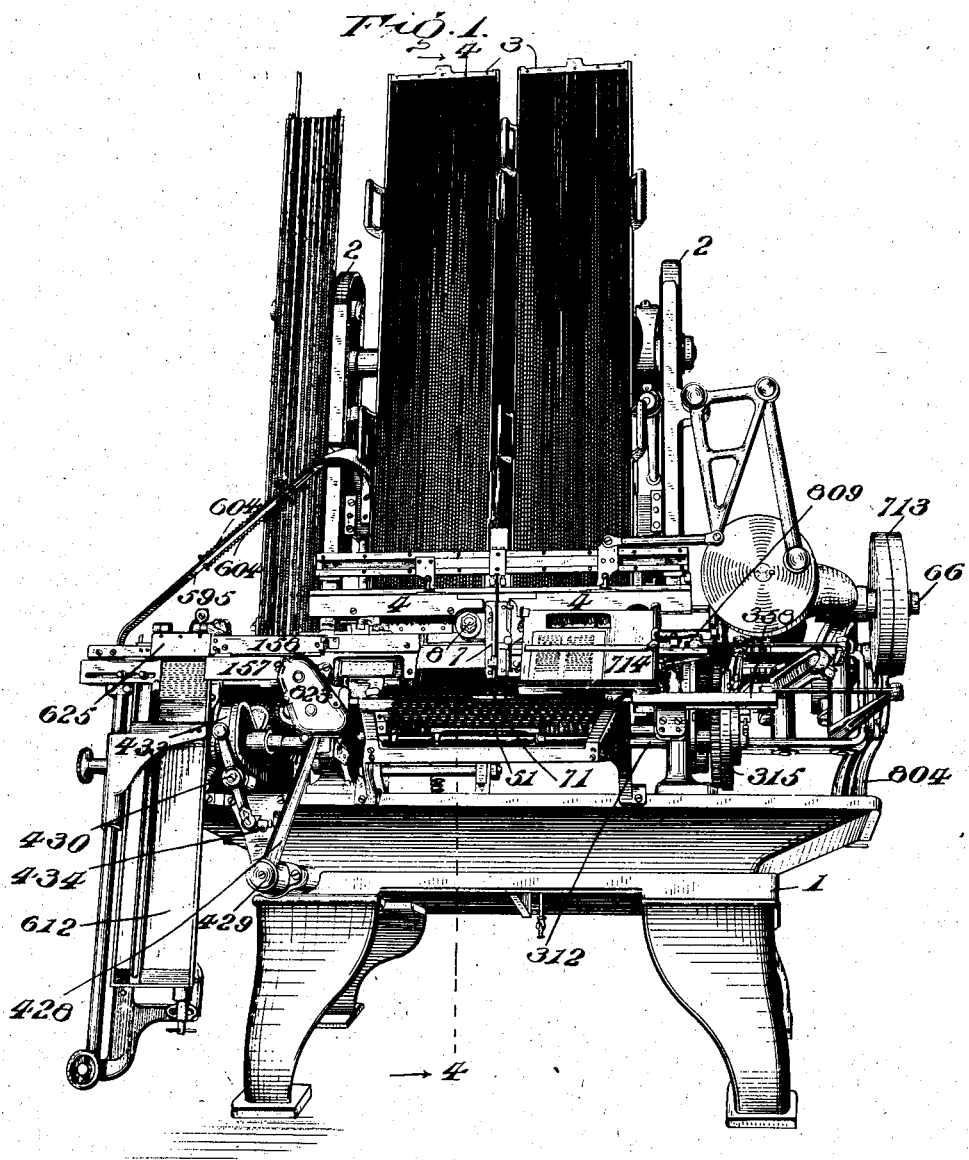

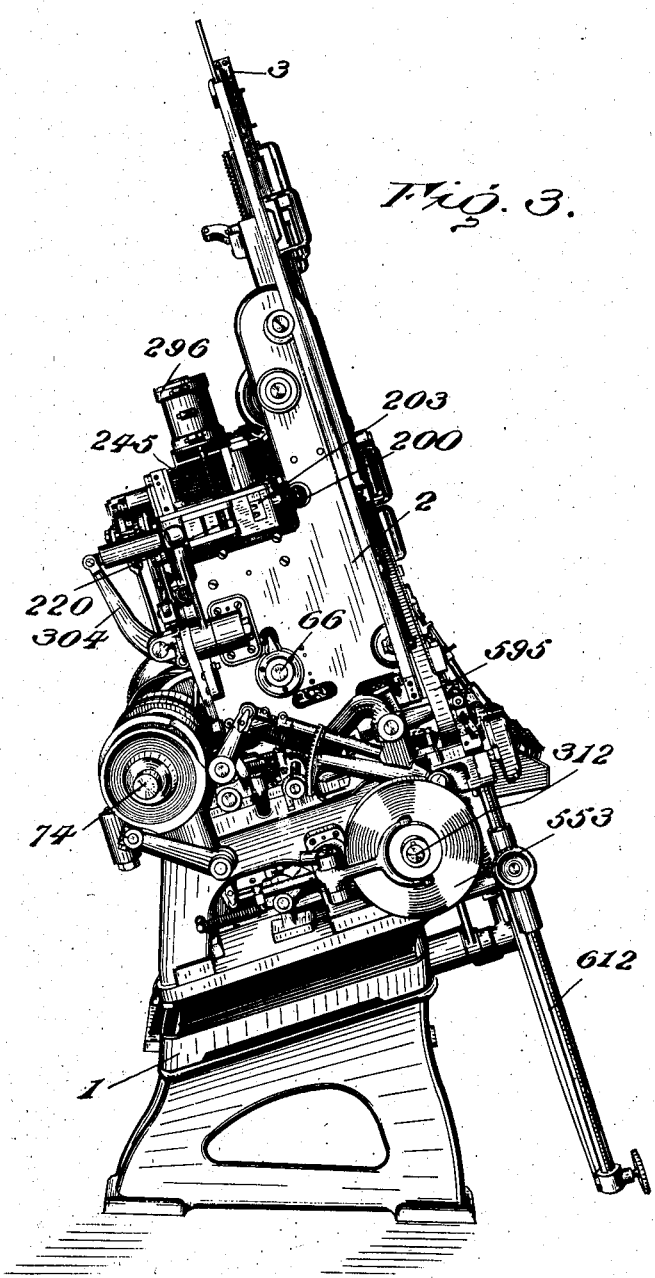

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 4.
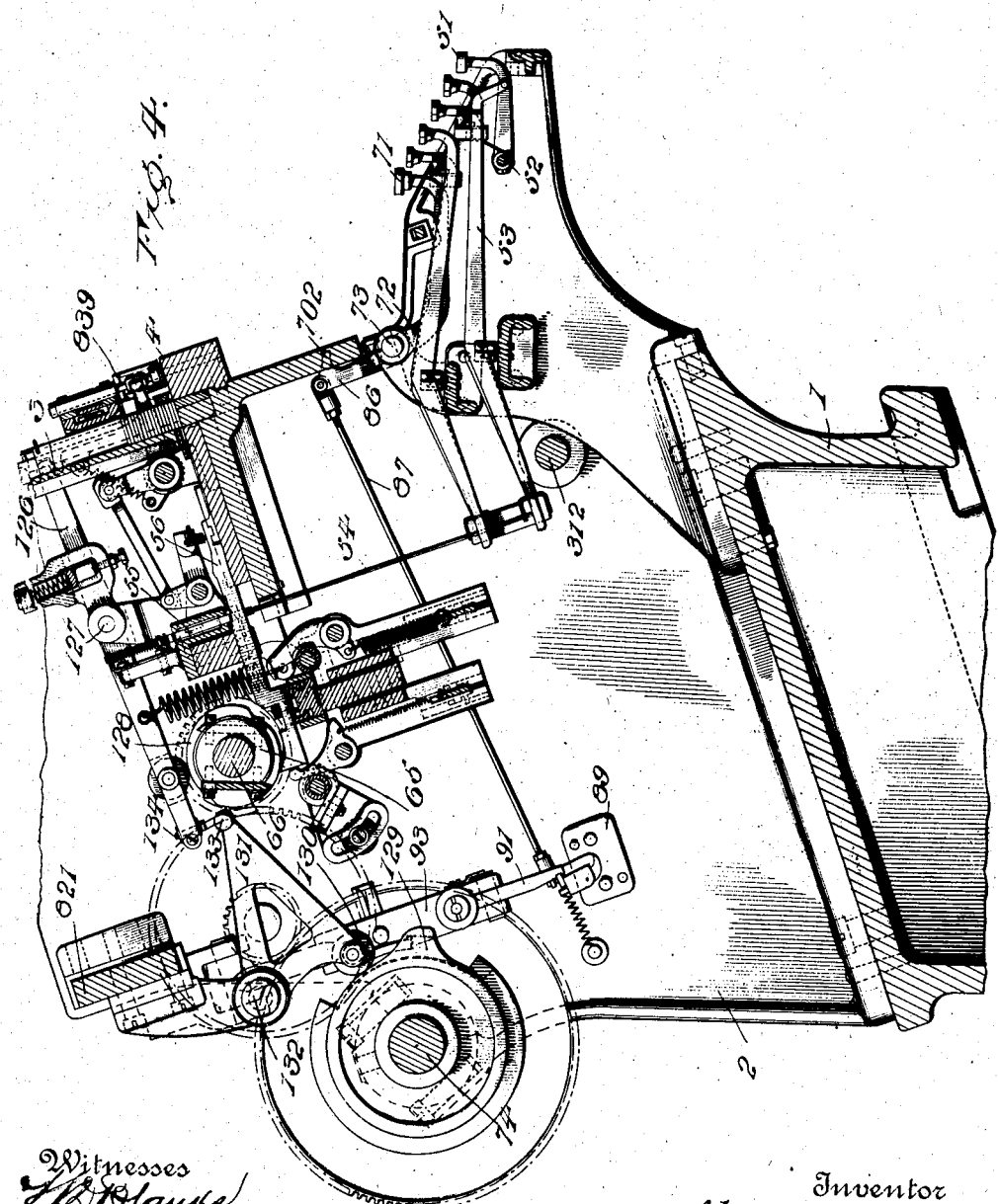

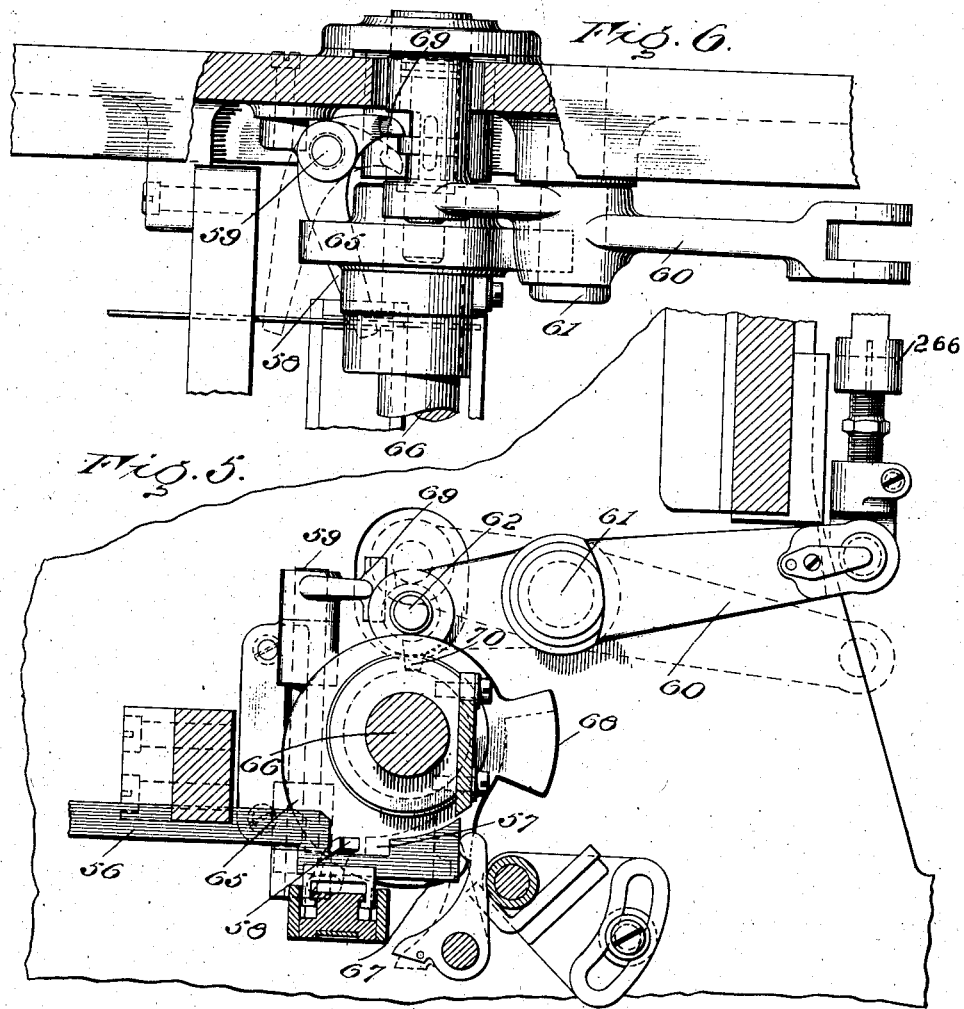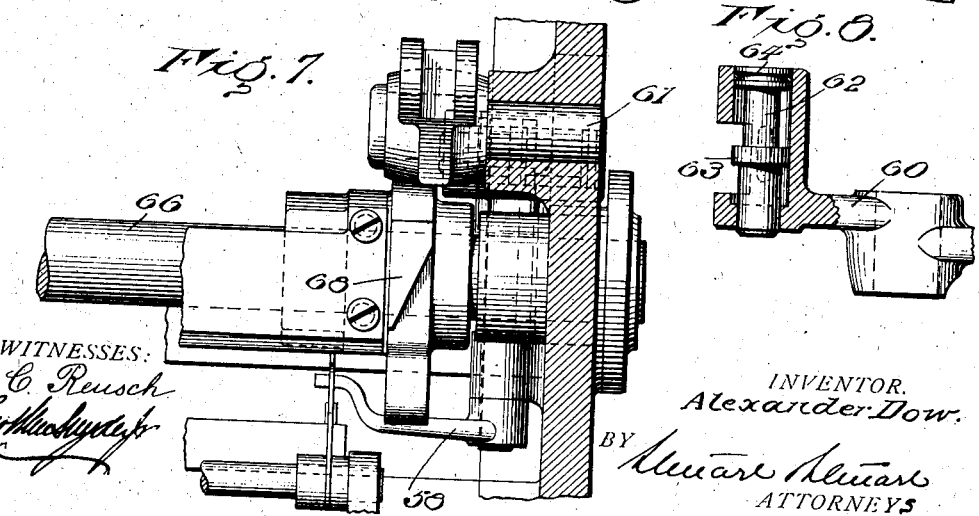

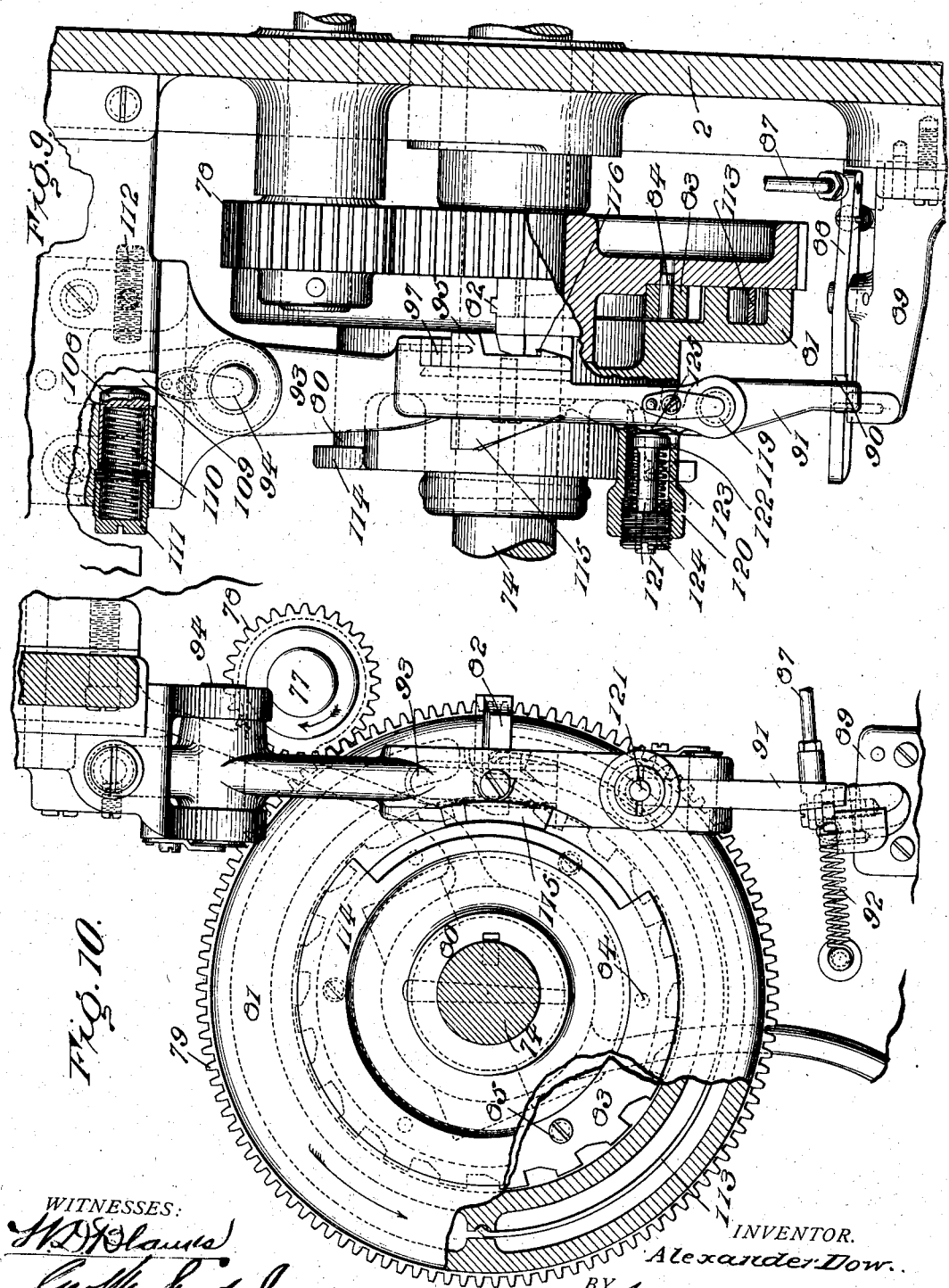

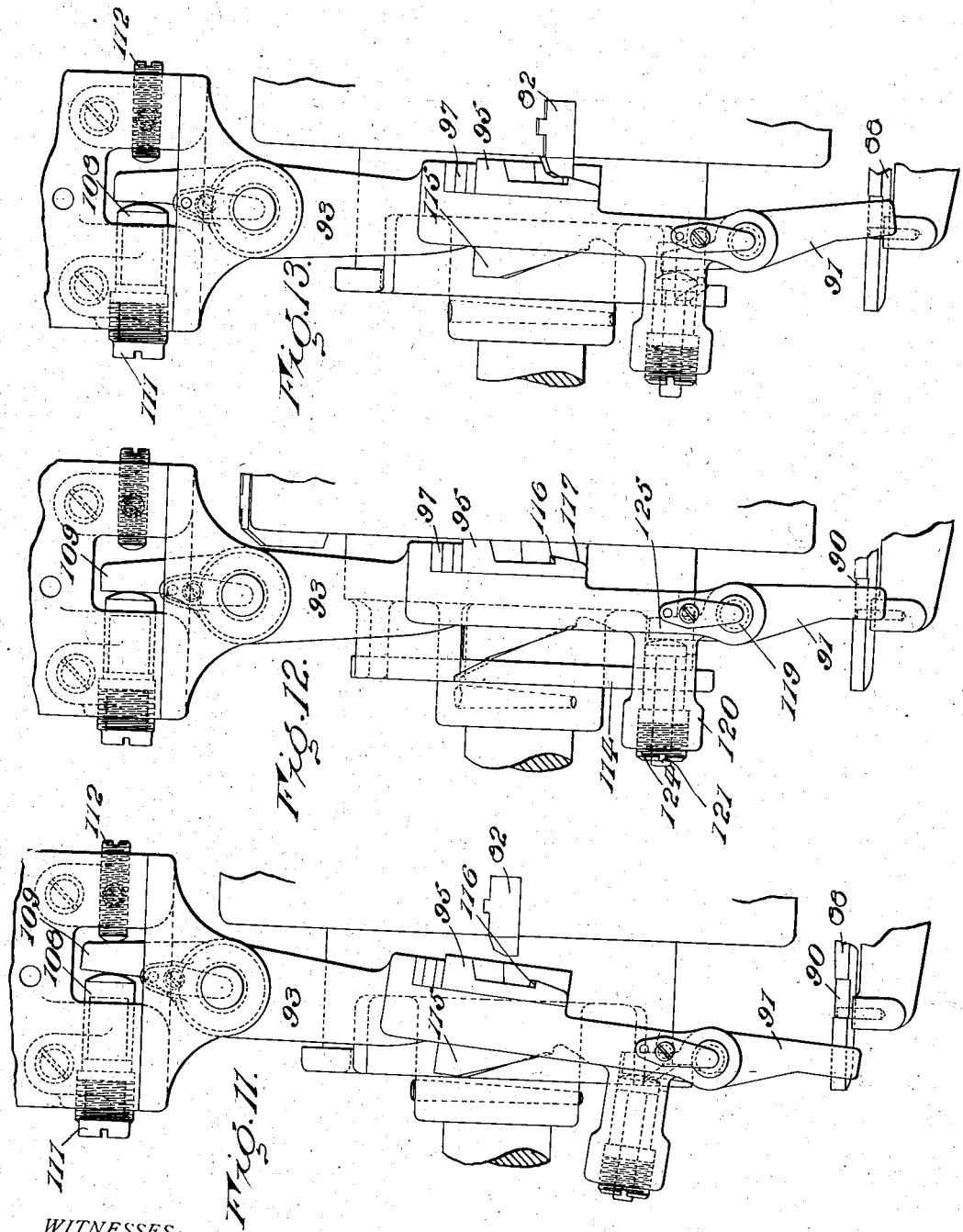

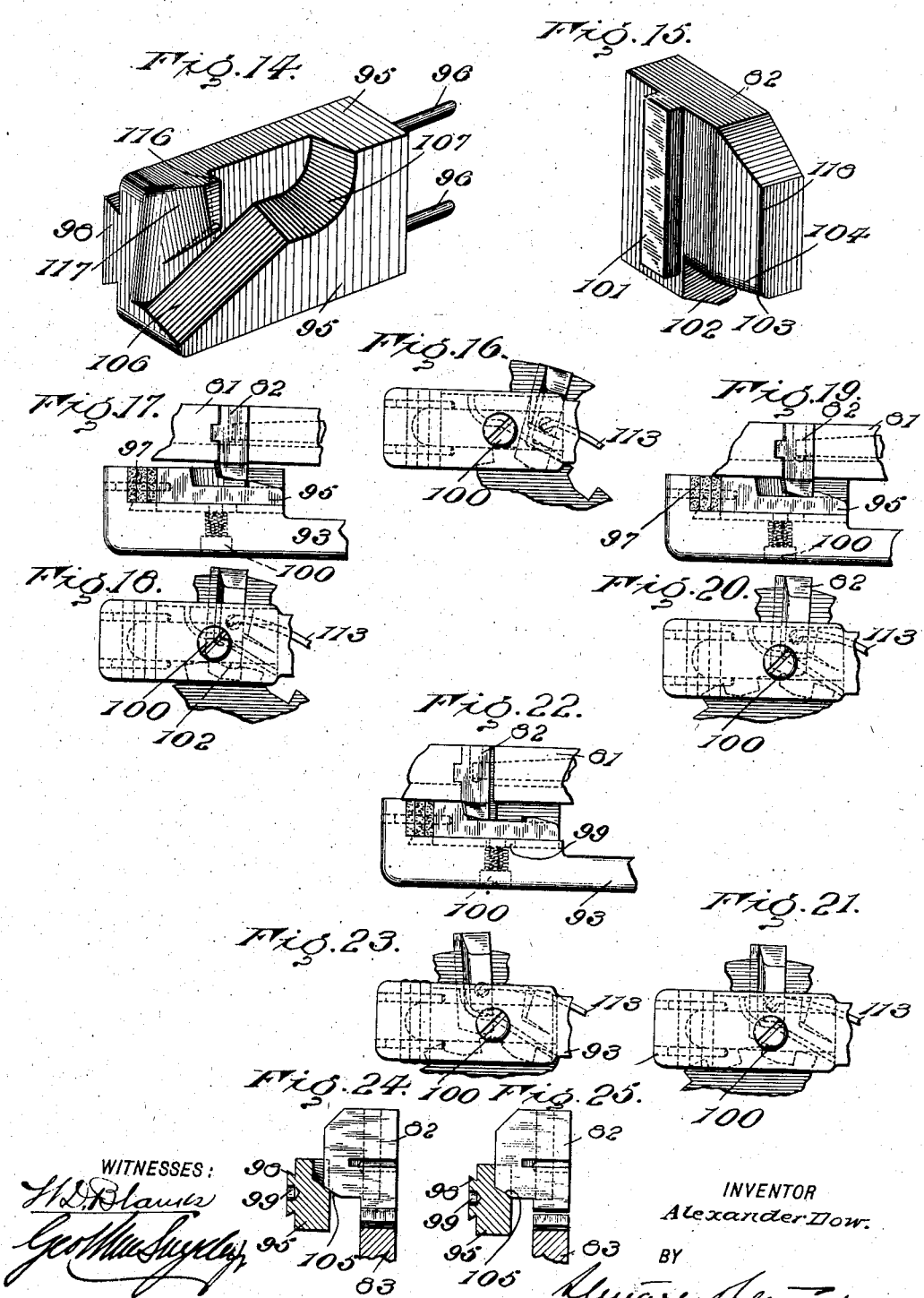

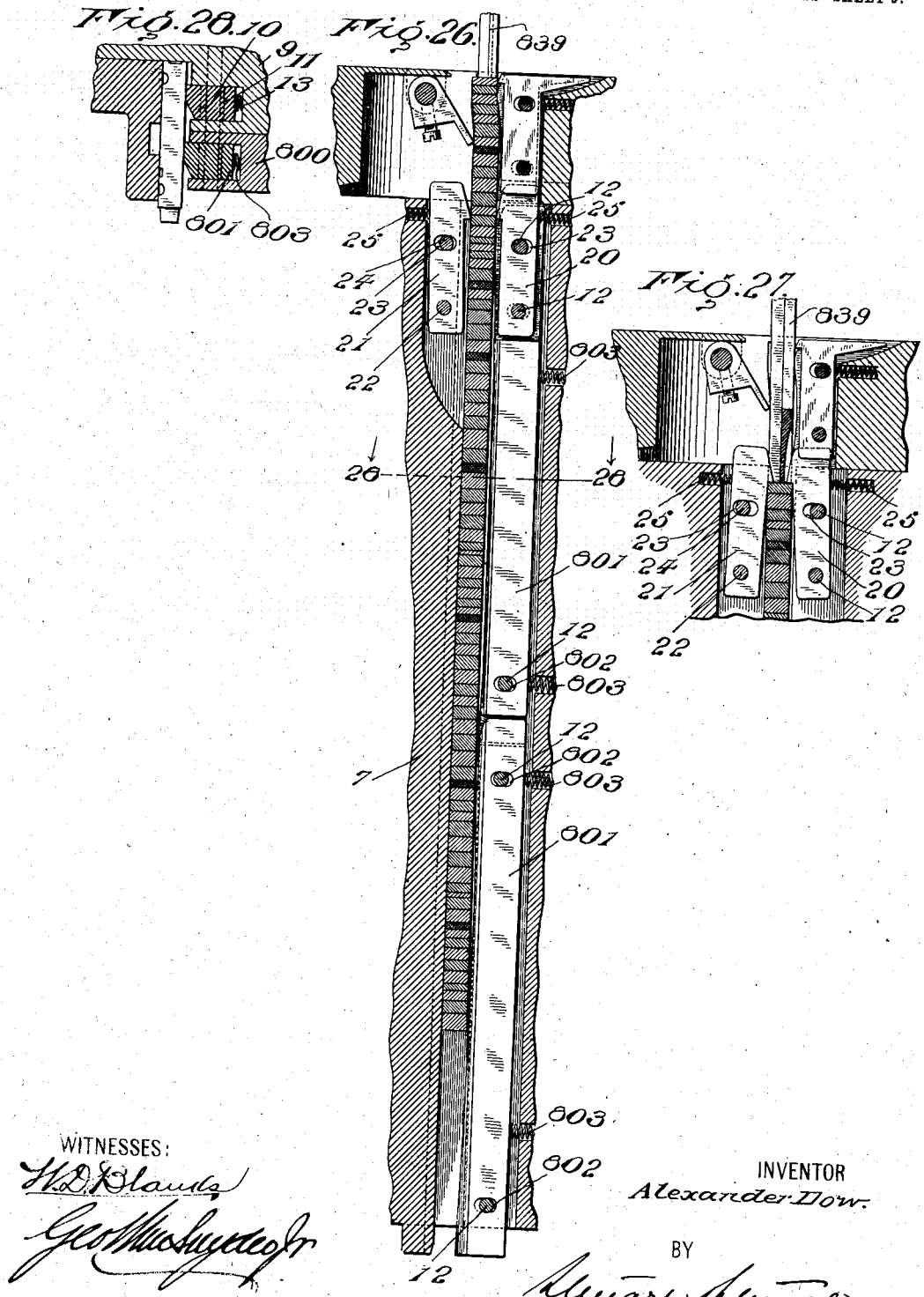

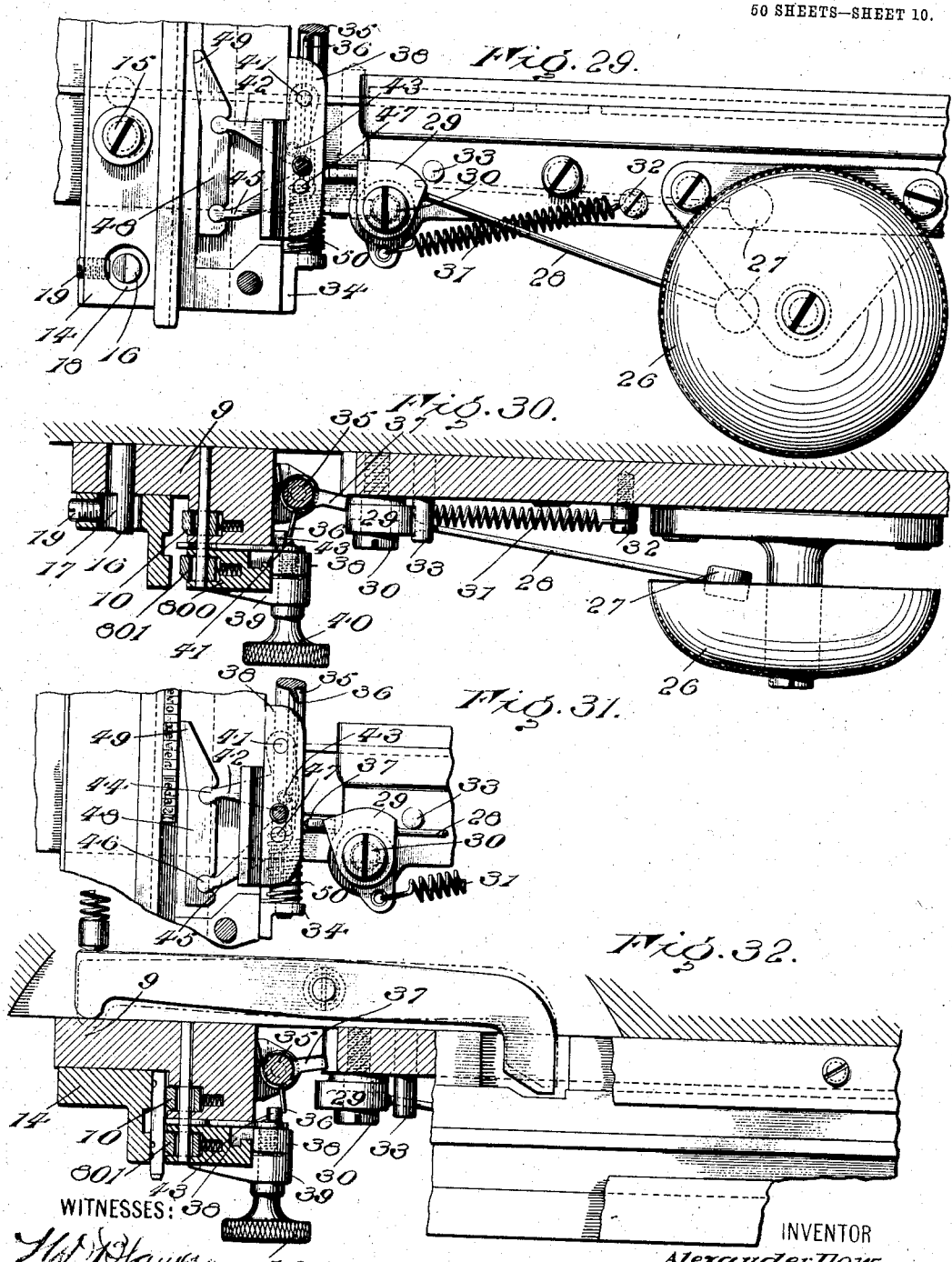

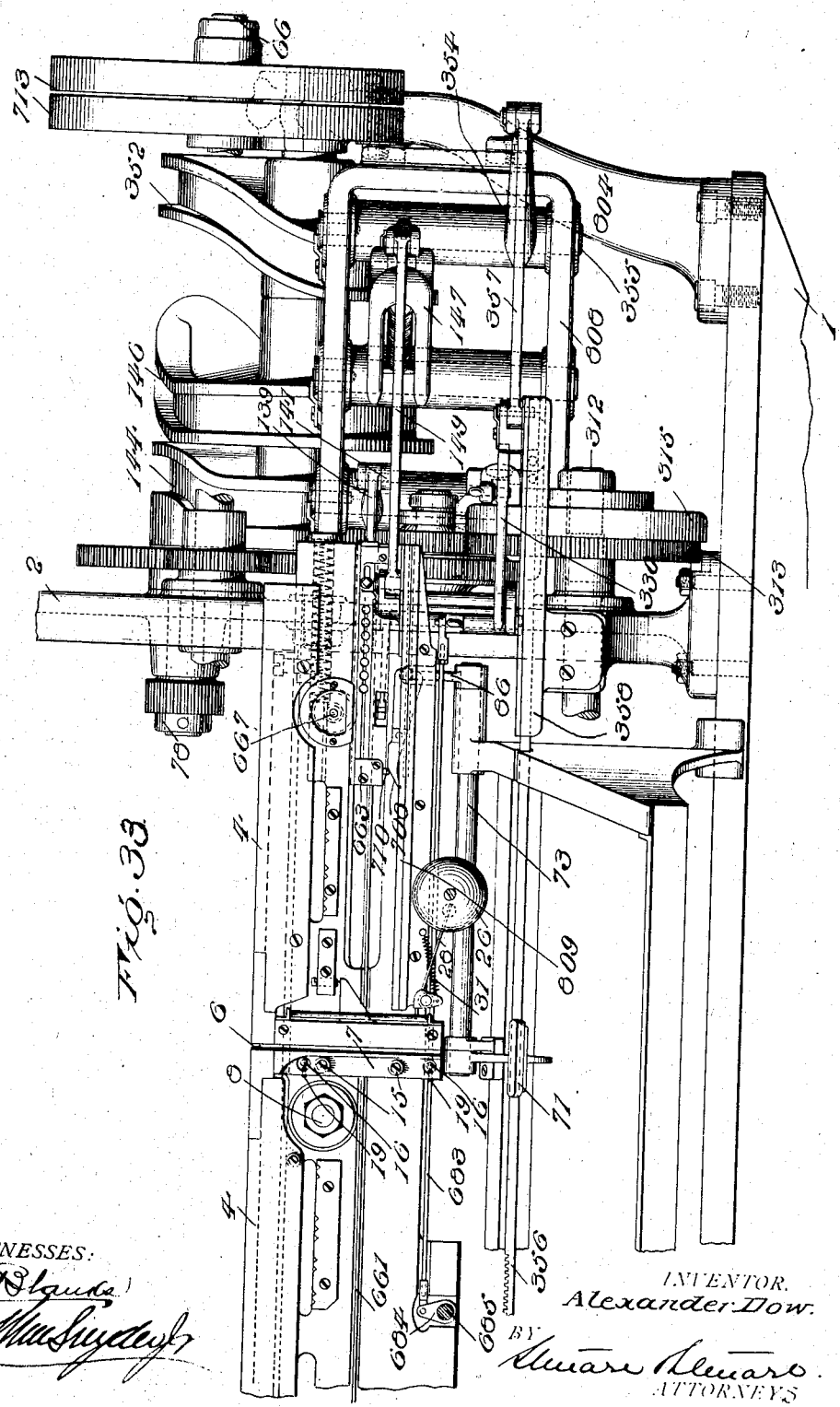

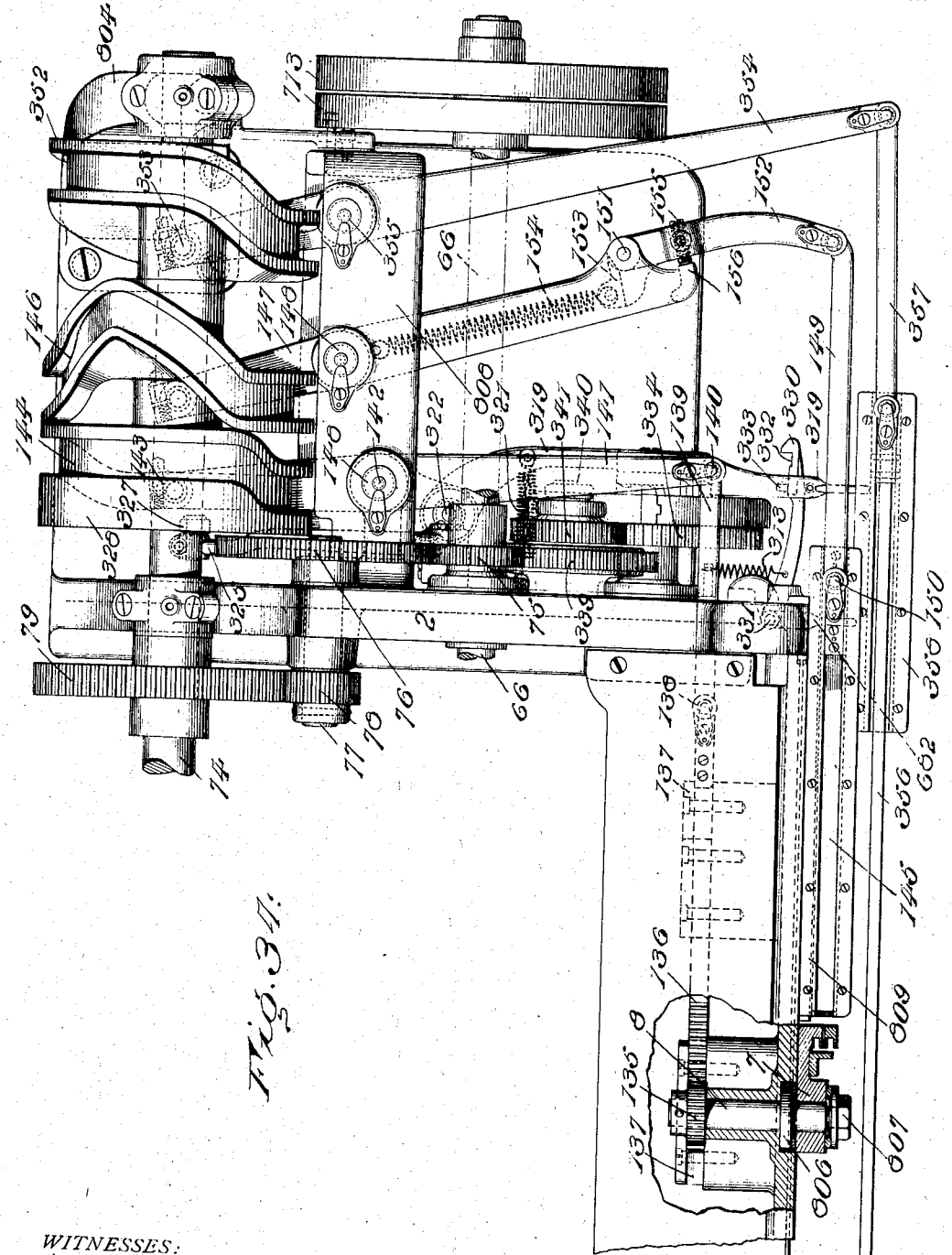

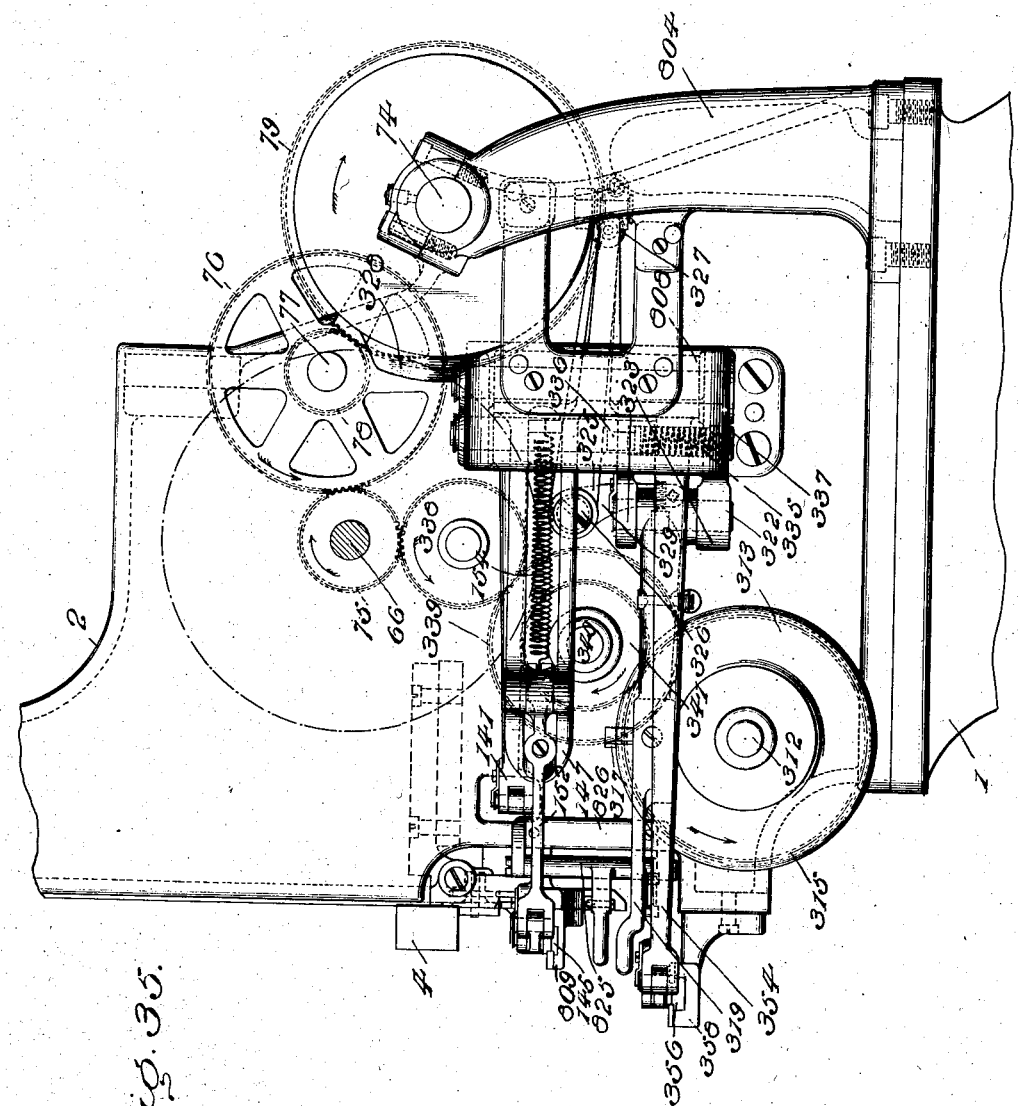

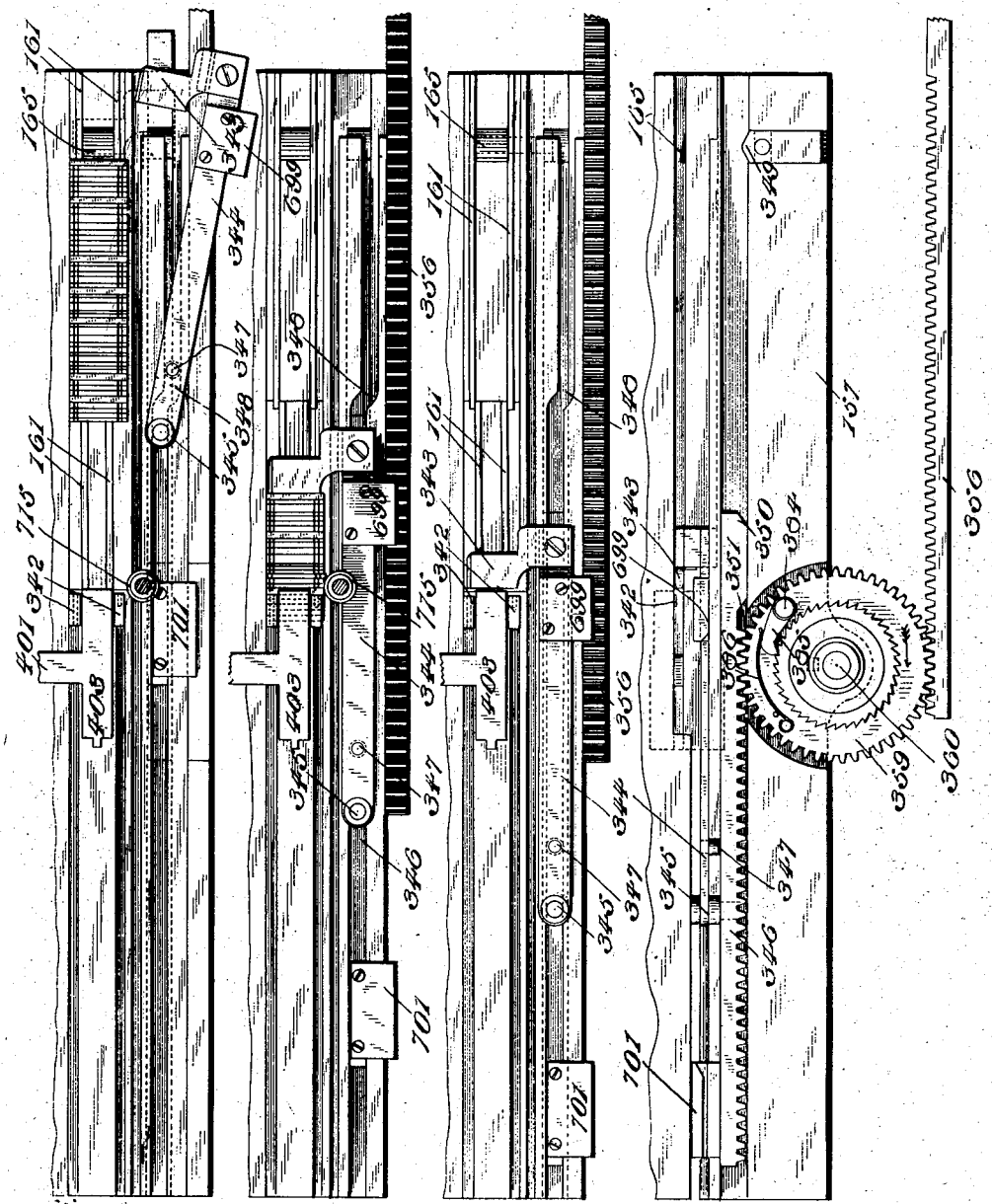

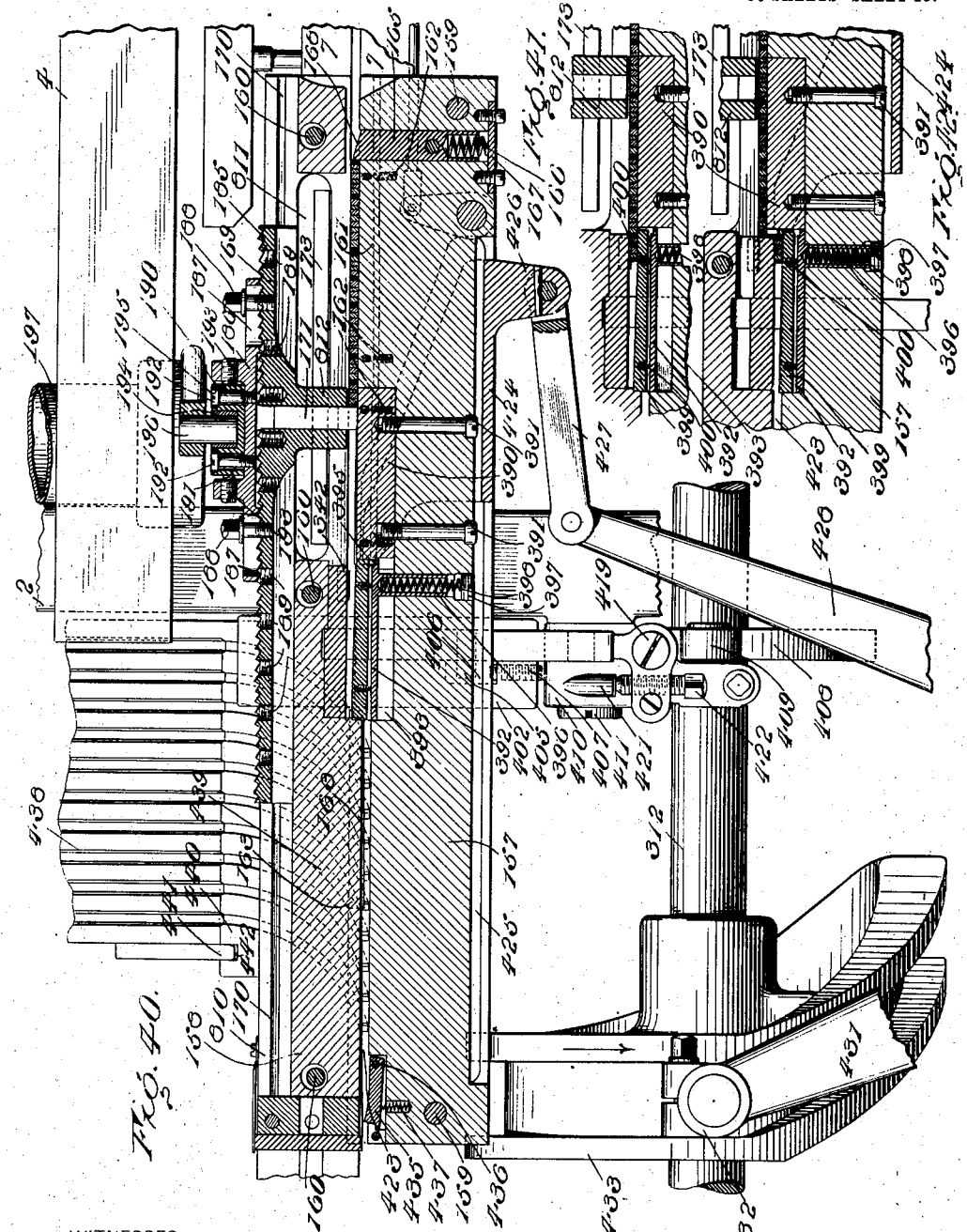

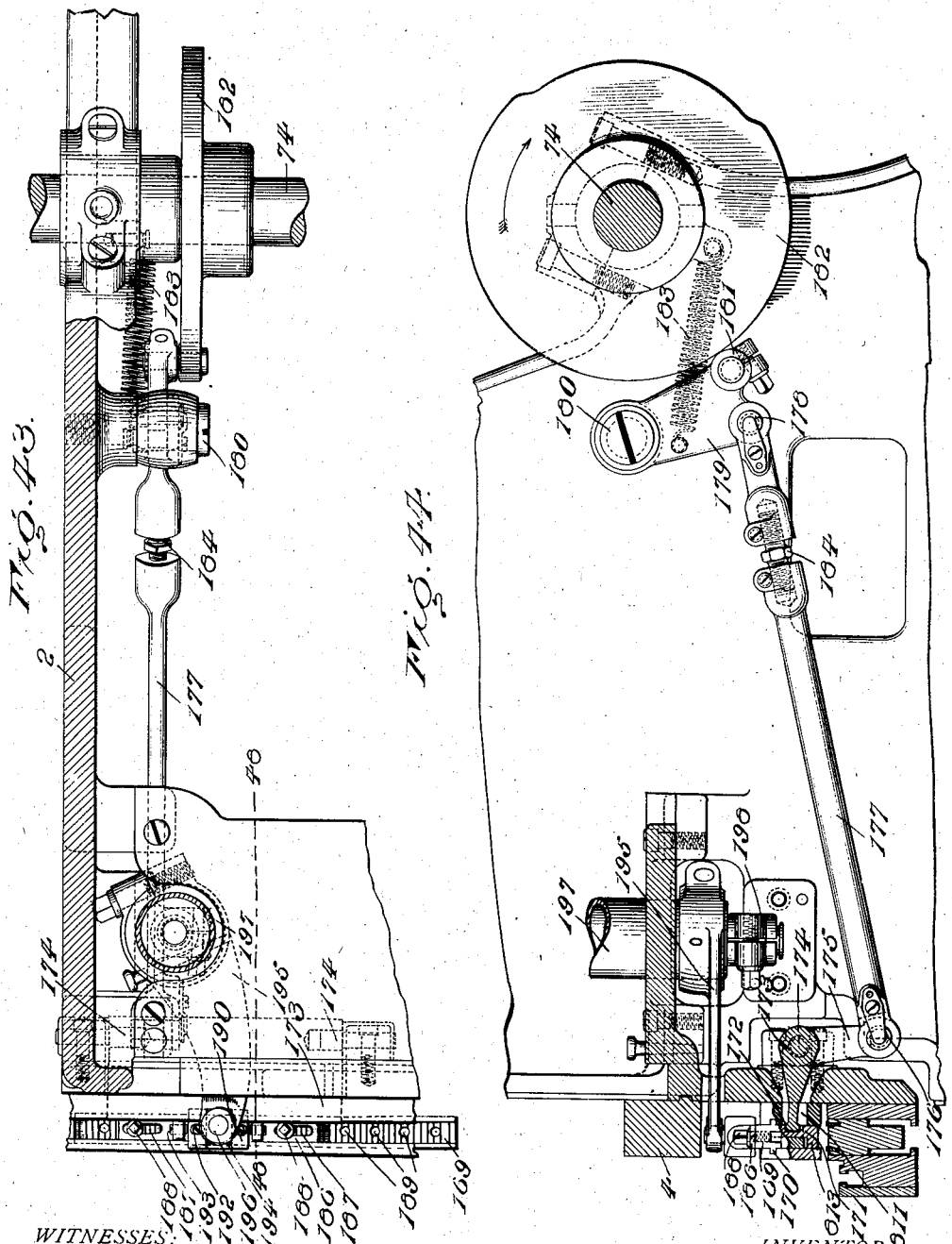

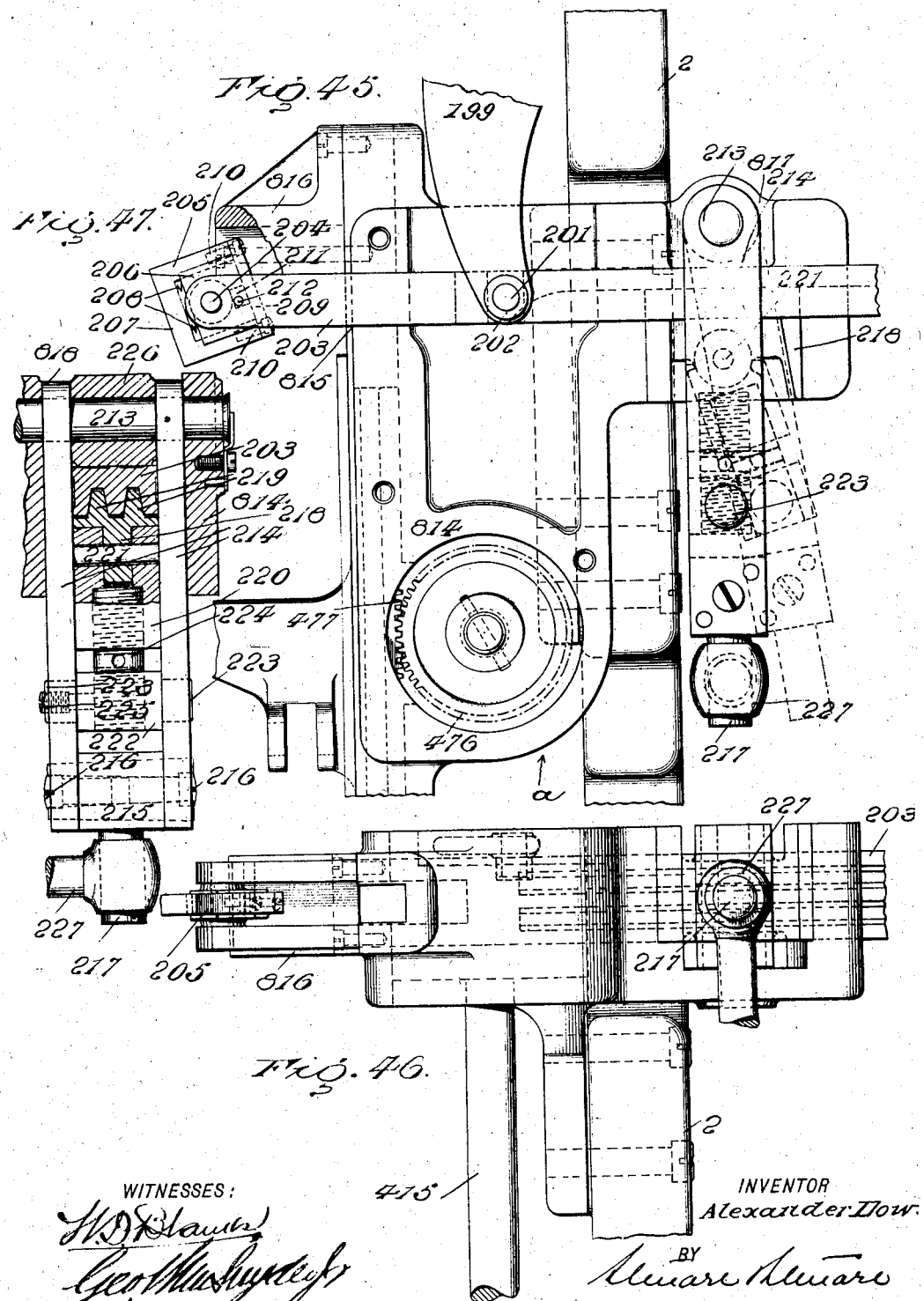

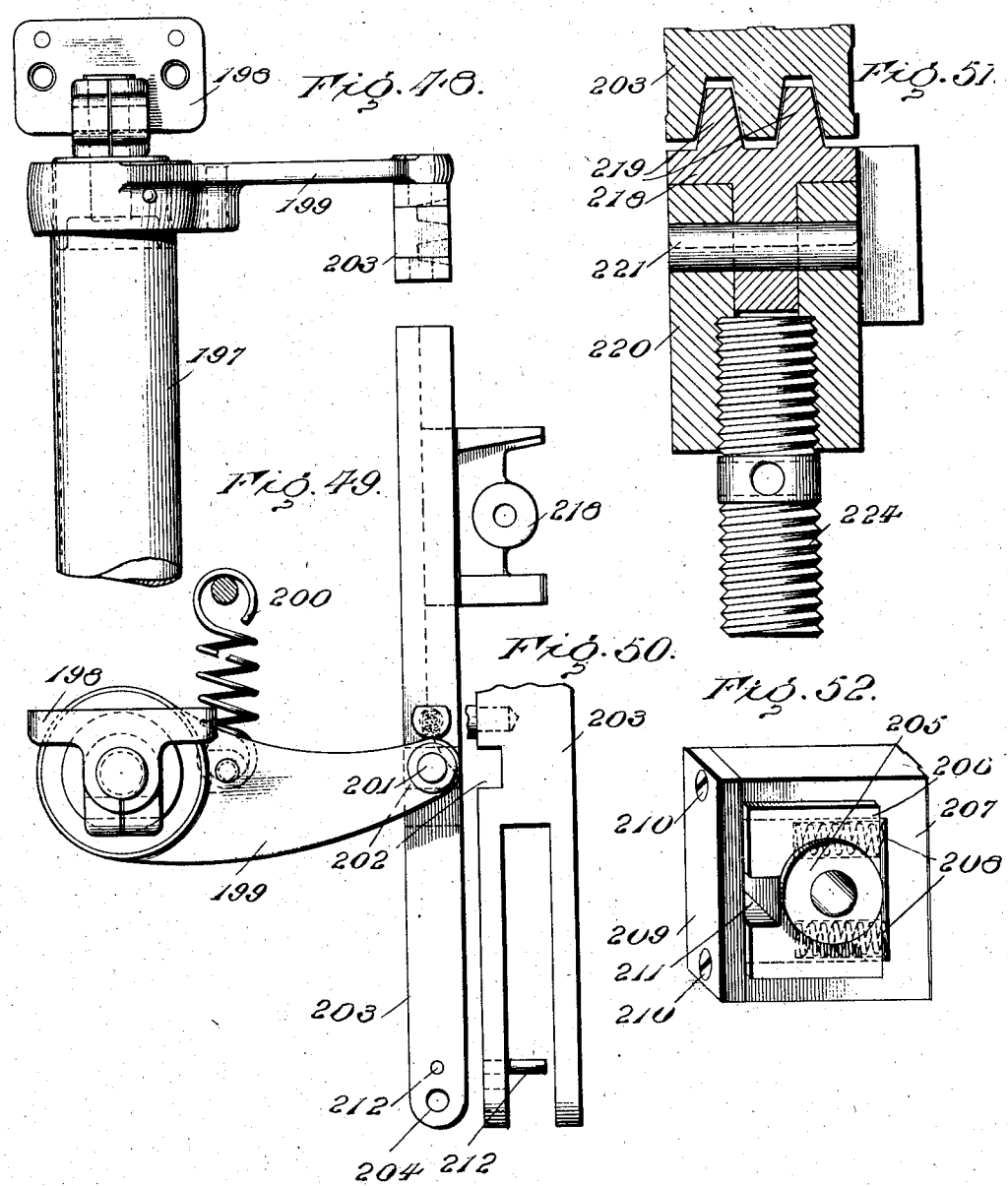

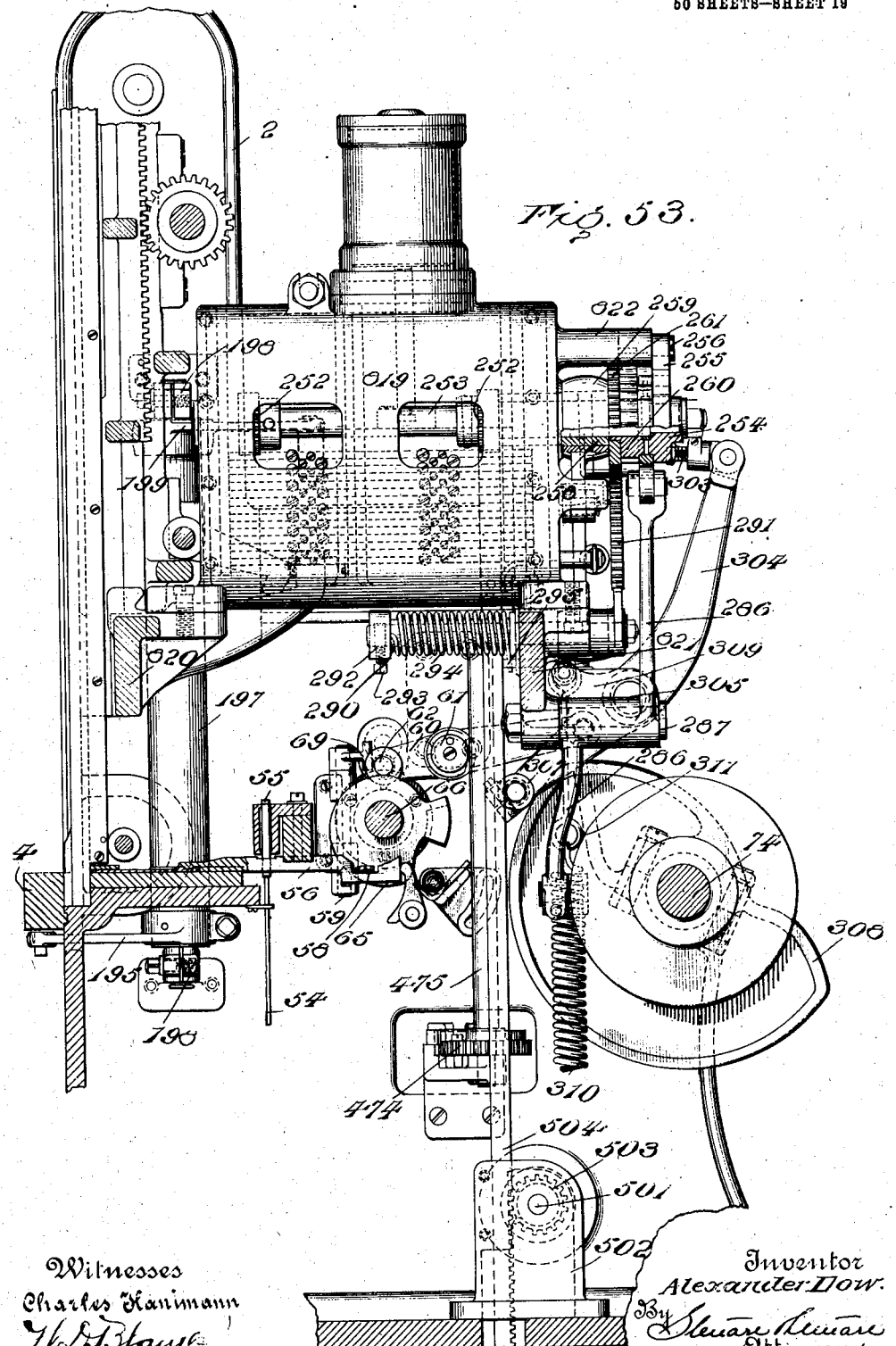

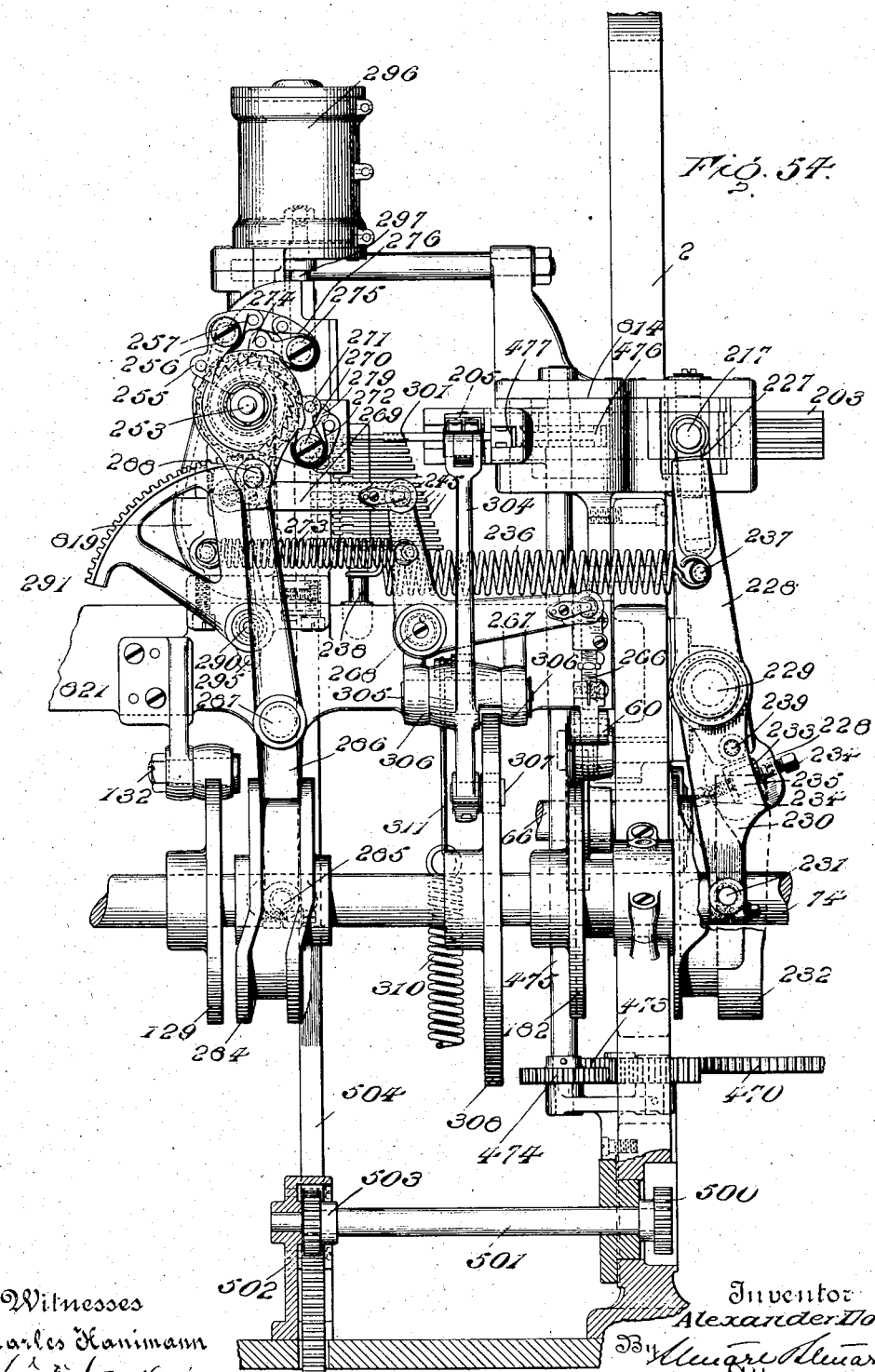

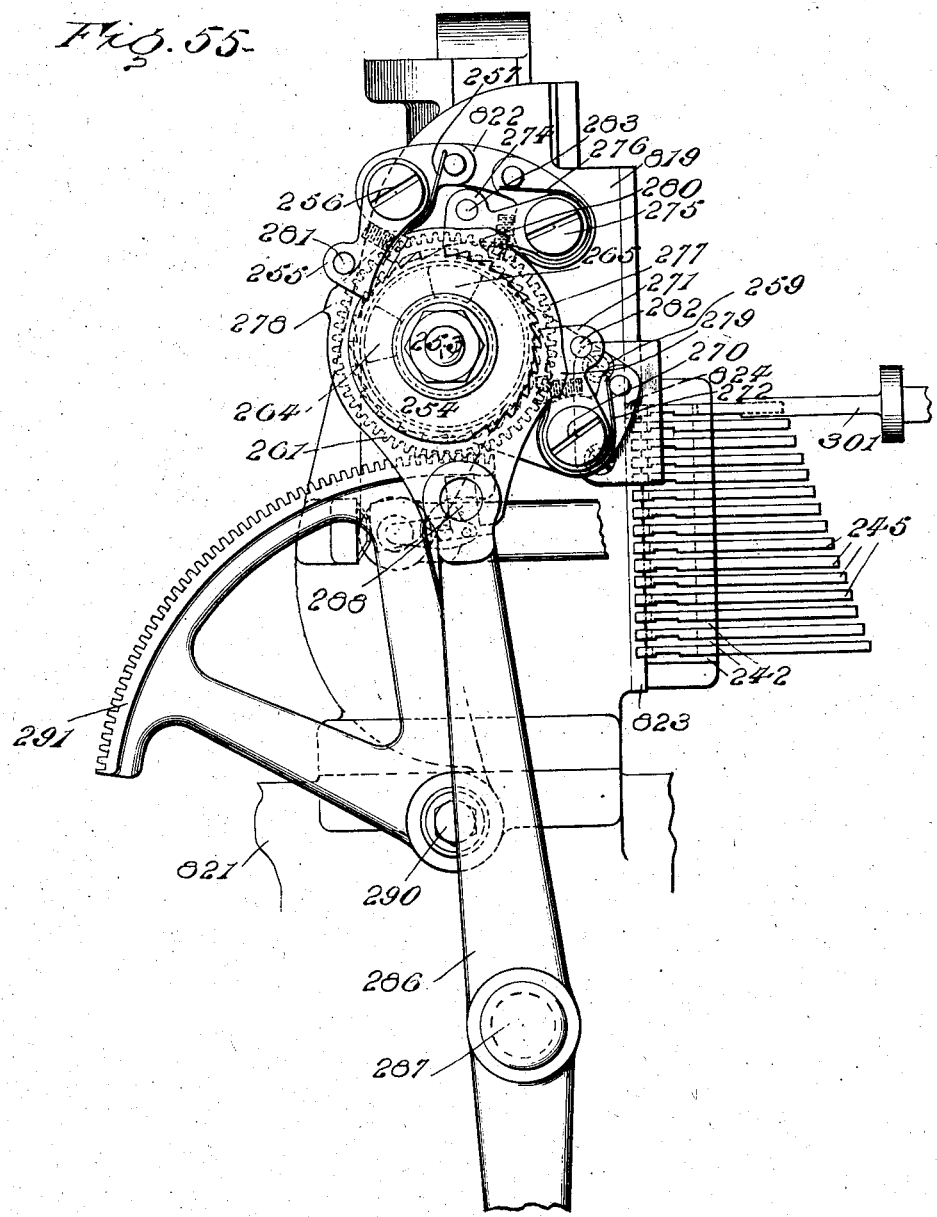

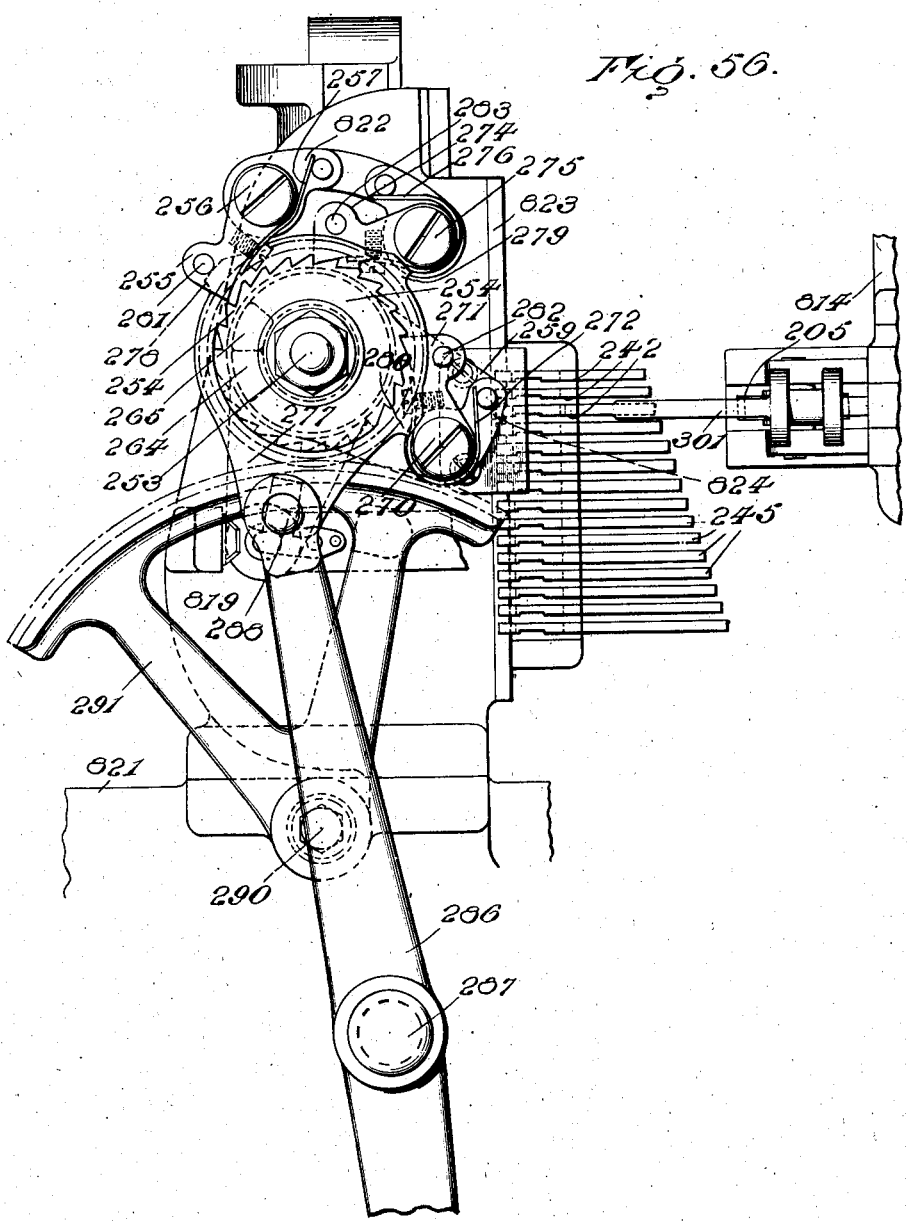

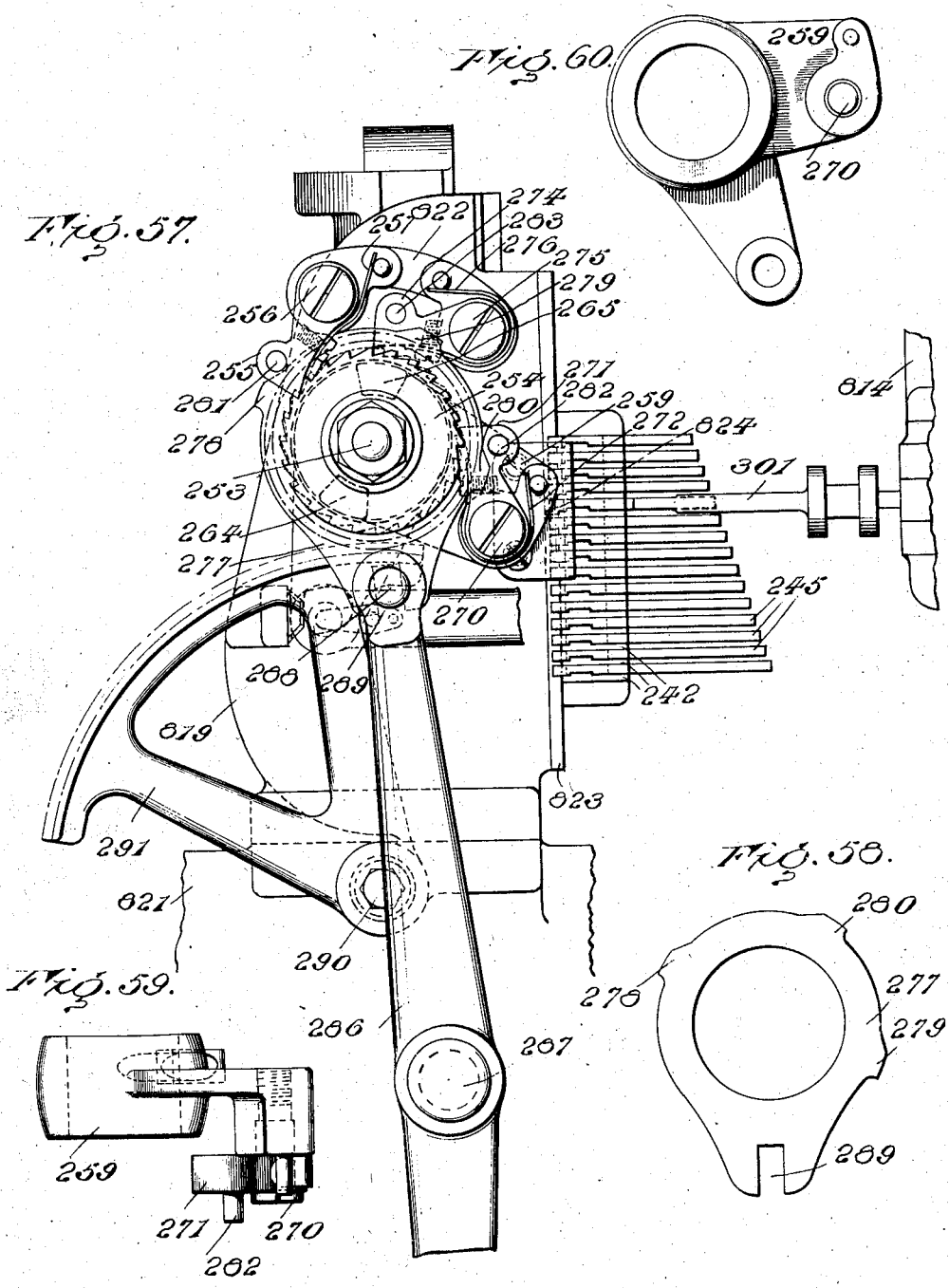

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 24.
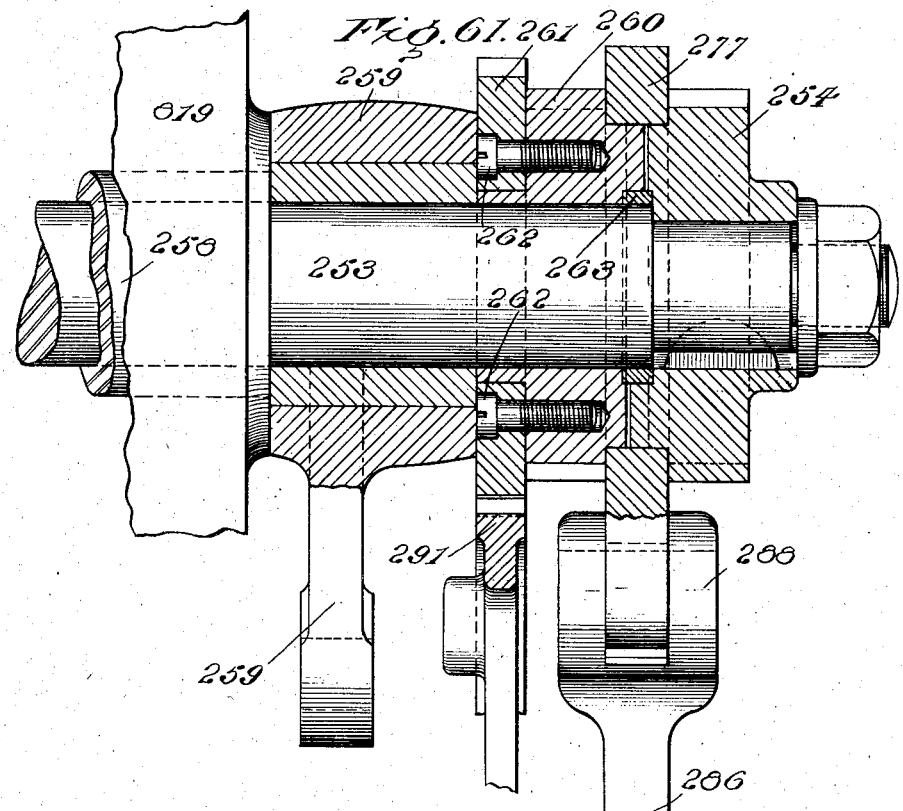
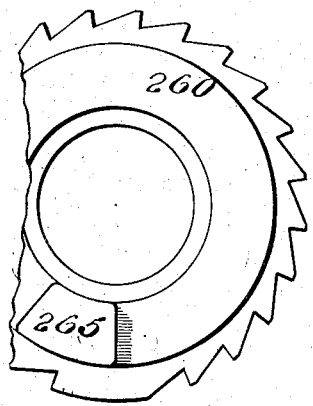
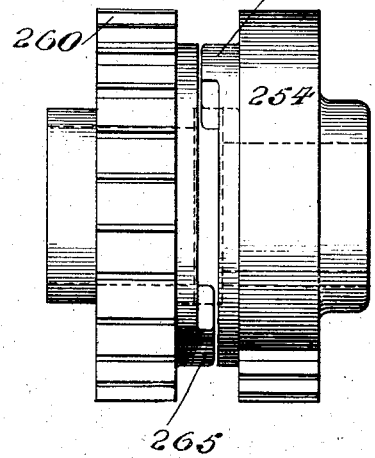
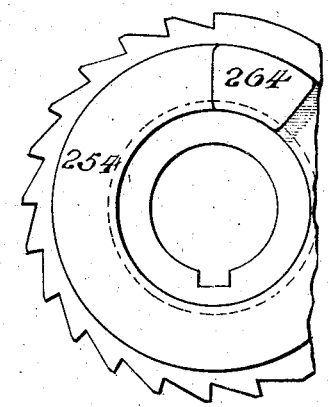
WITNESSES:
INVENTOR.
Alexander Dow.
BY
ATTORNEYS No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 25.
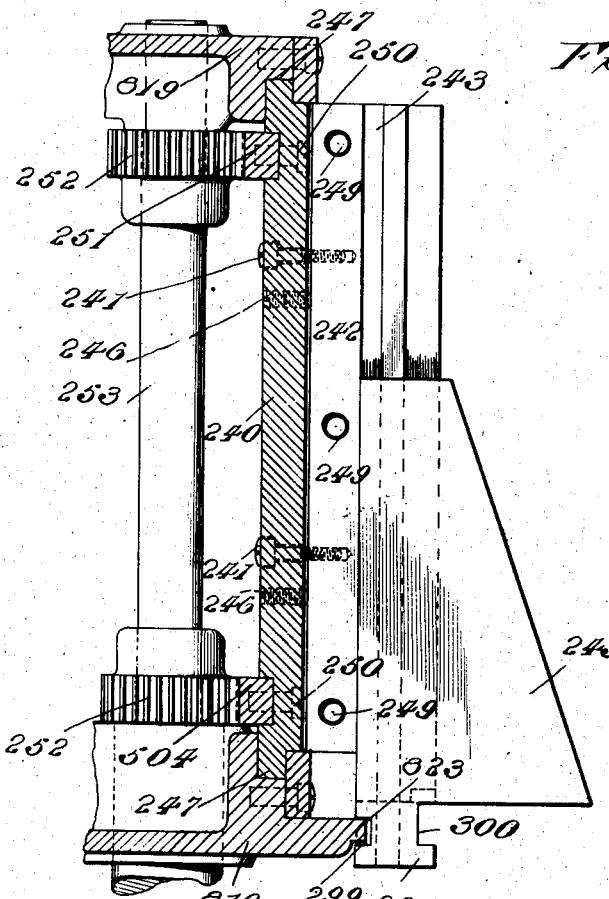
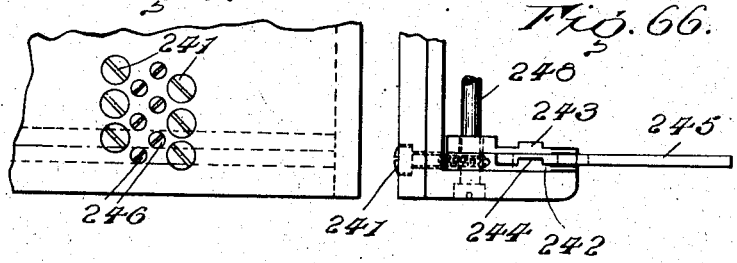
WITNESSES:
INVENTOR.
Alexander Dow.
BY
ATTORNEYS

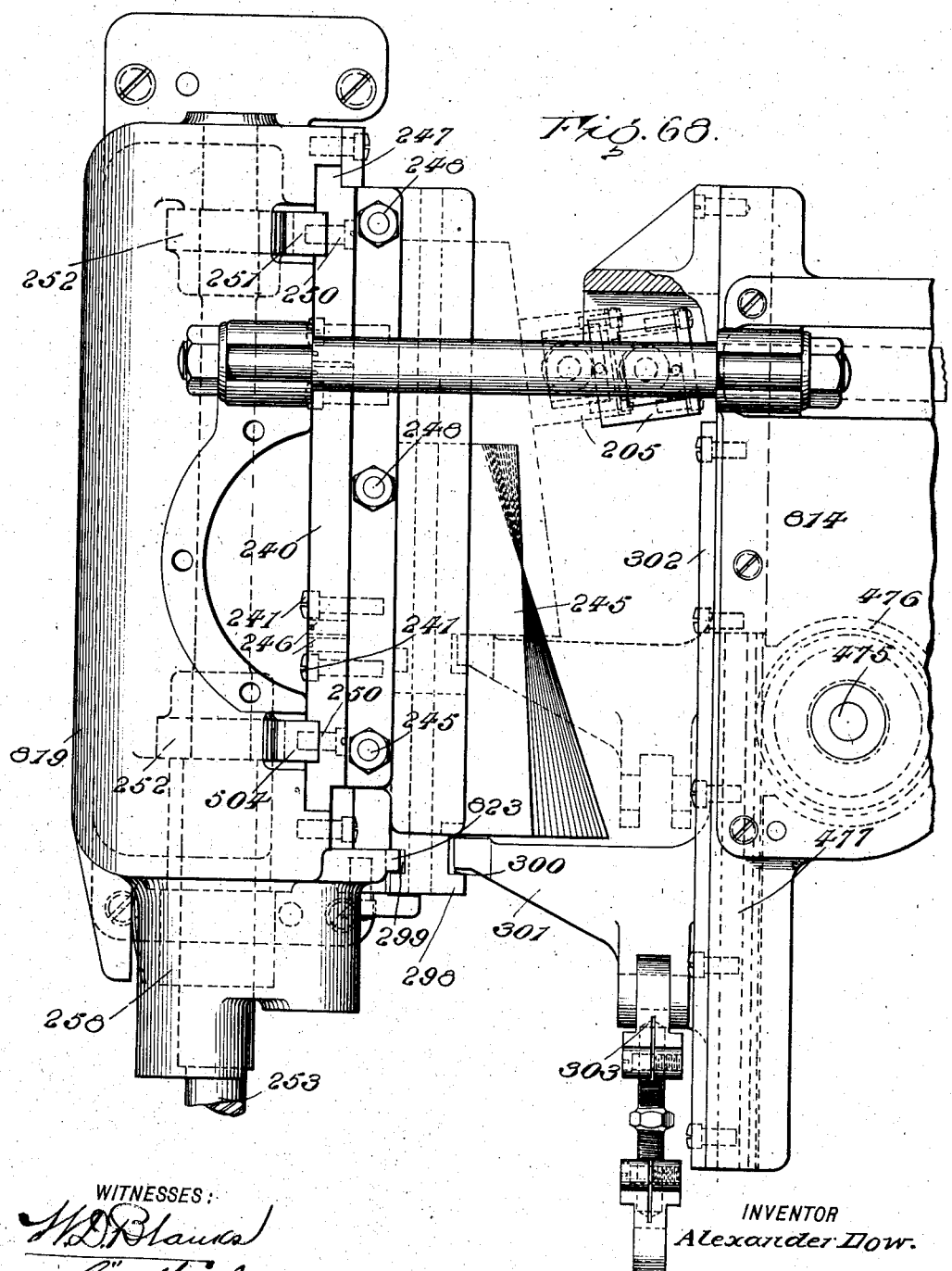

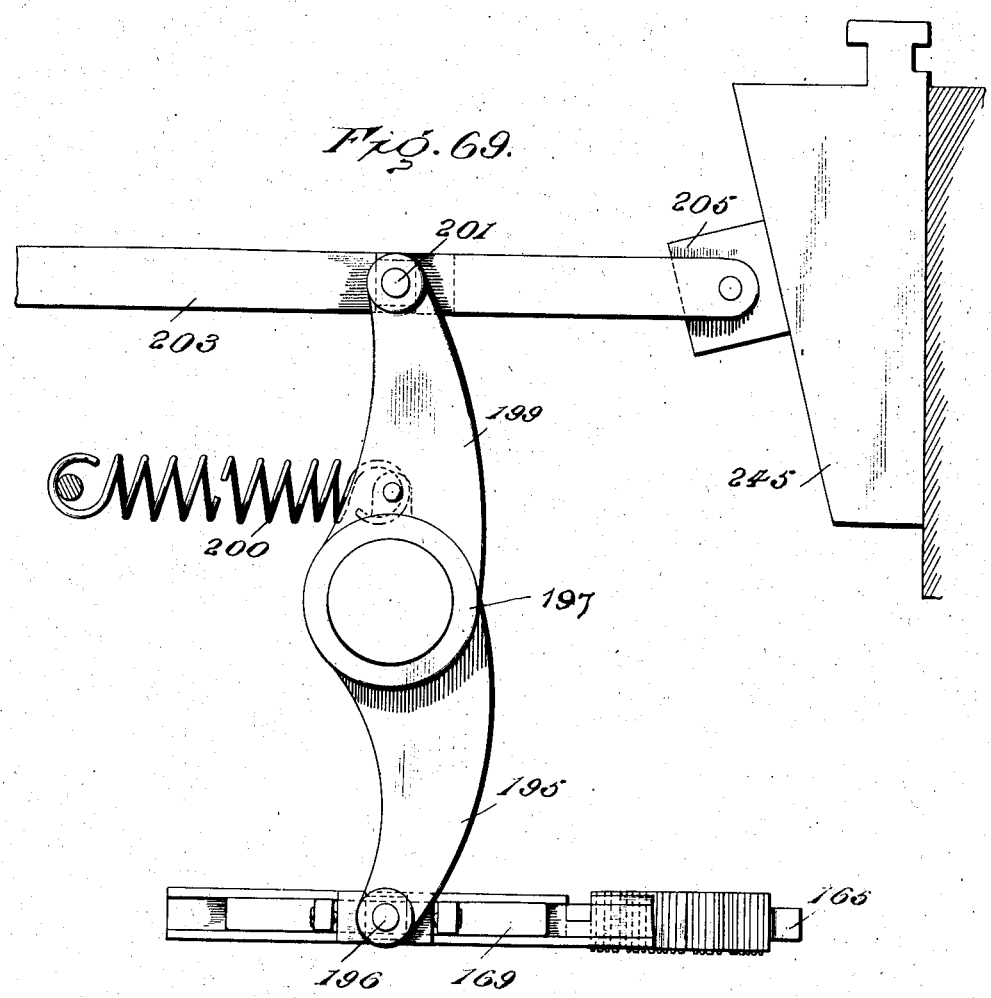

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 28.
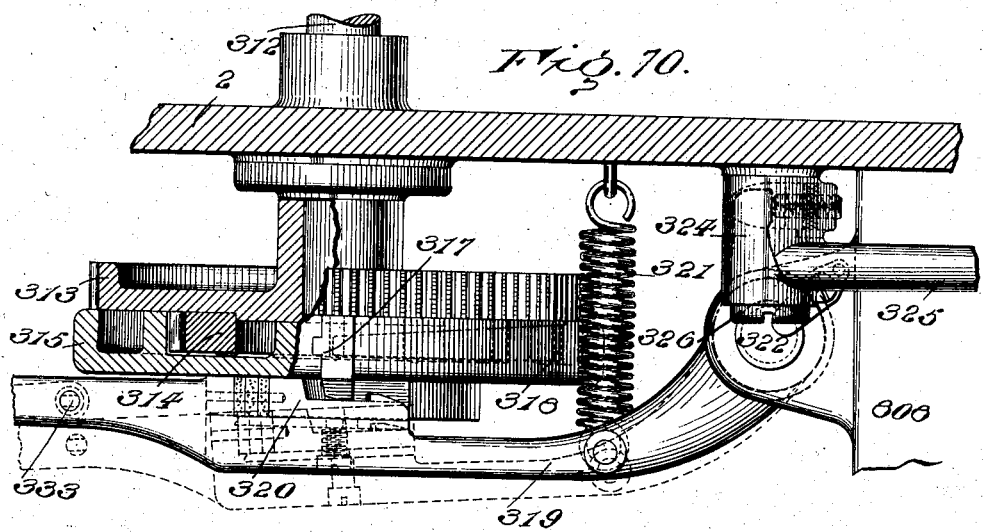
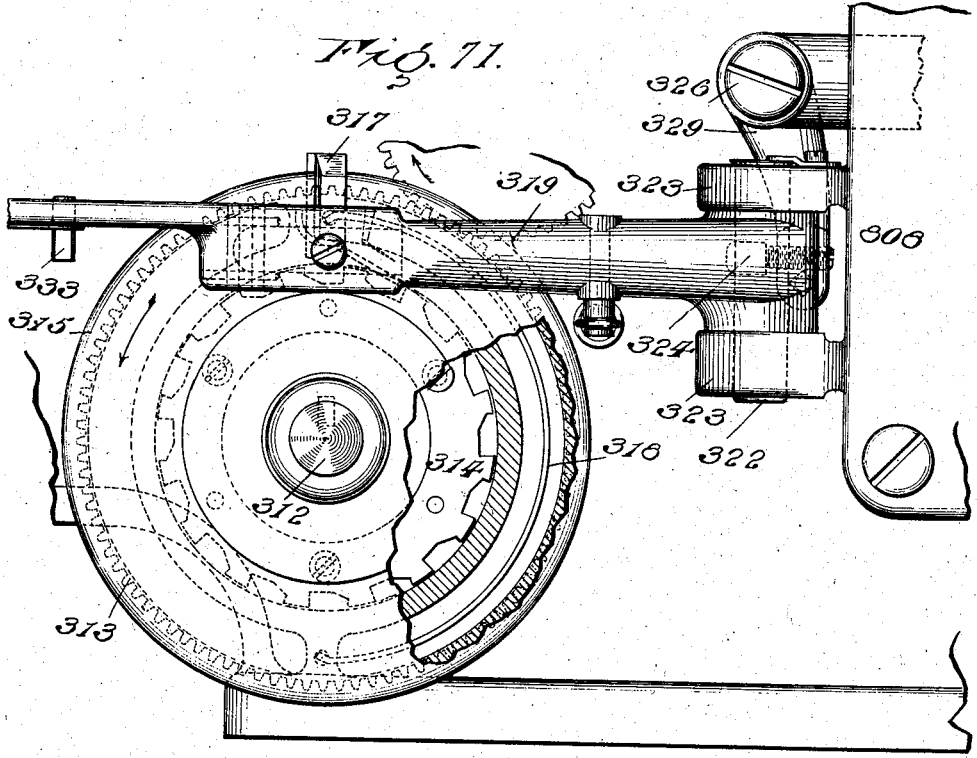
WITNESSES:
INVENTOR
Alexander Dow.
BY
ATTORNEYS

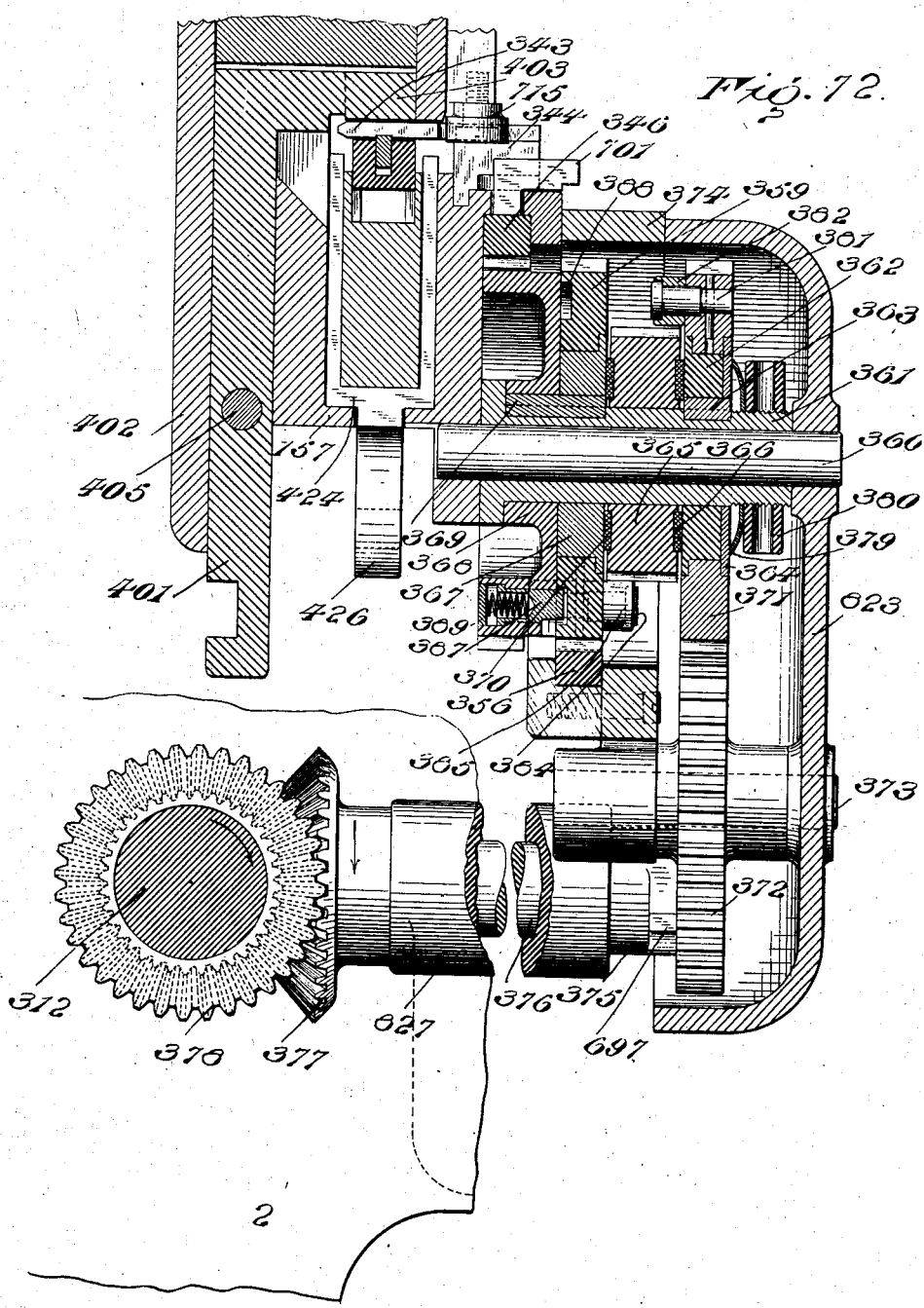

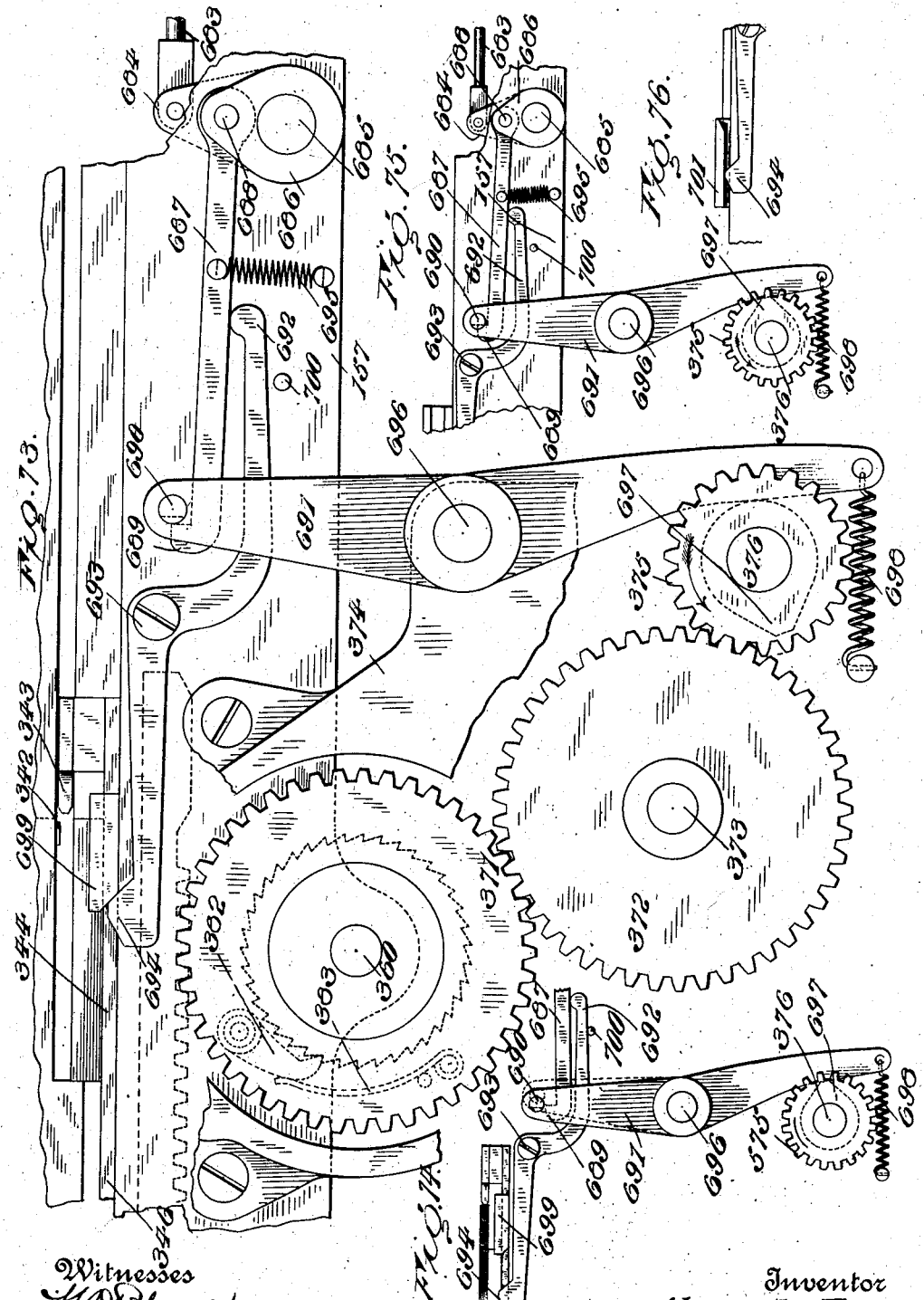

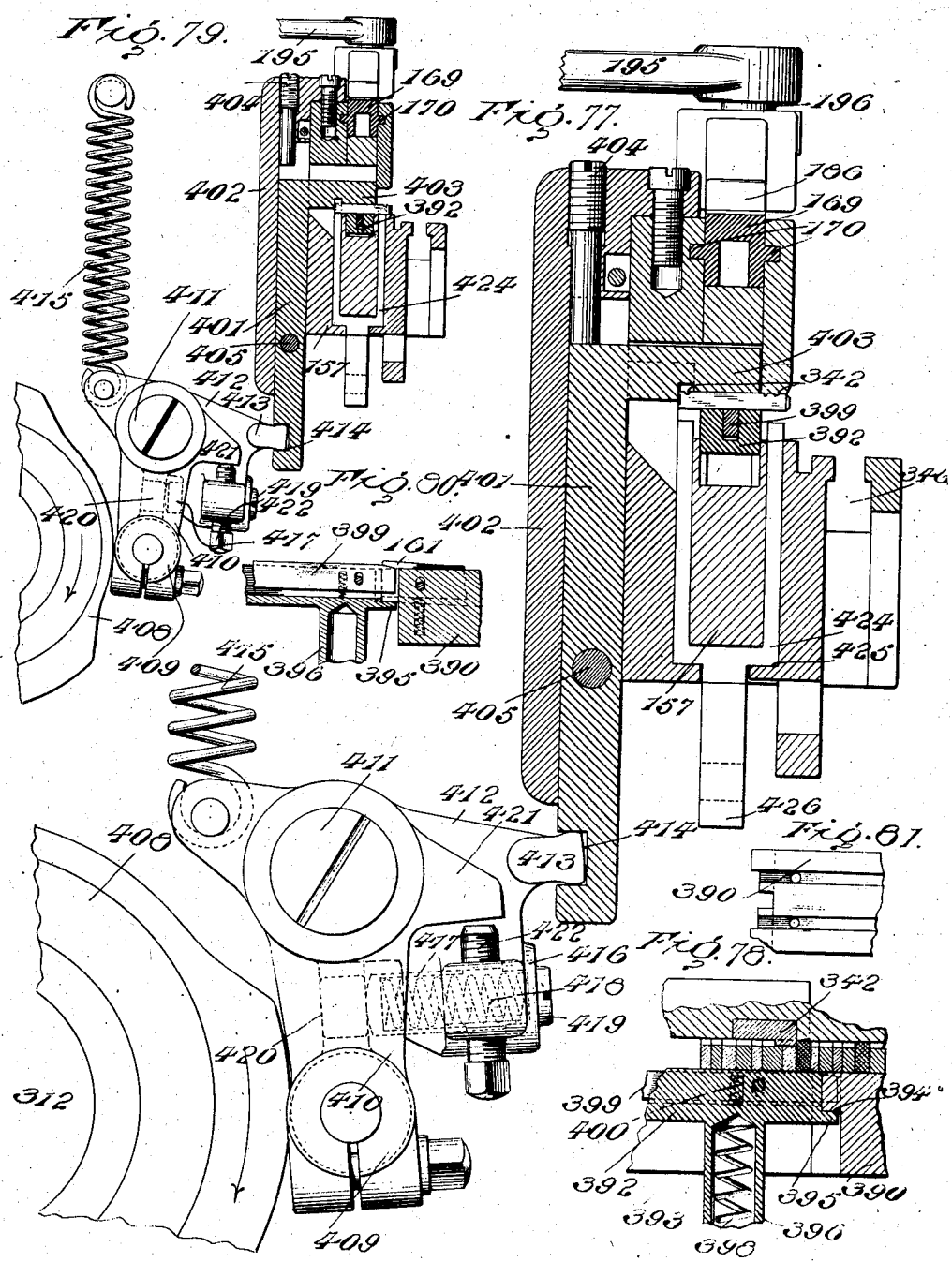

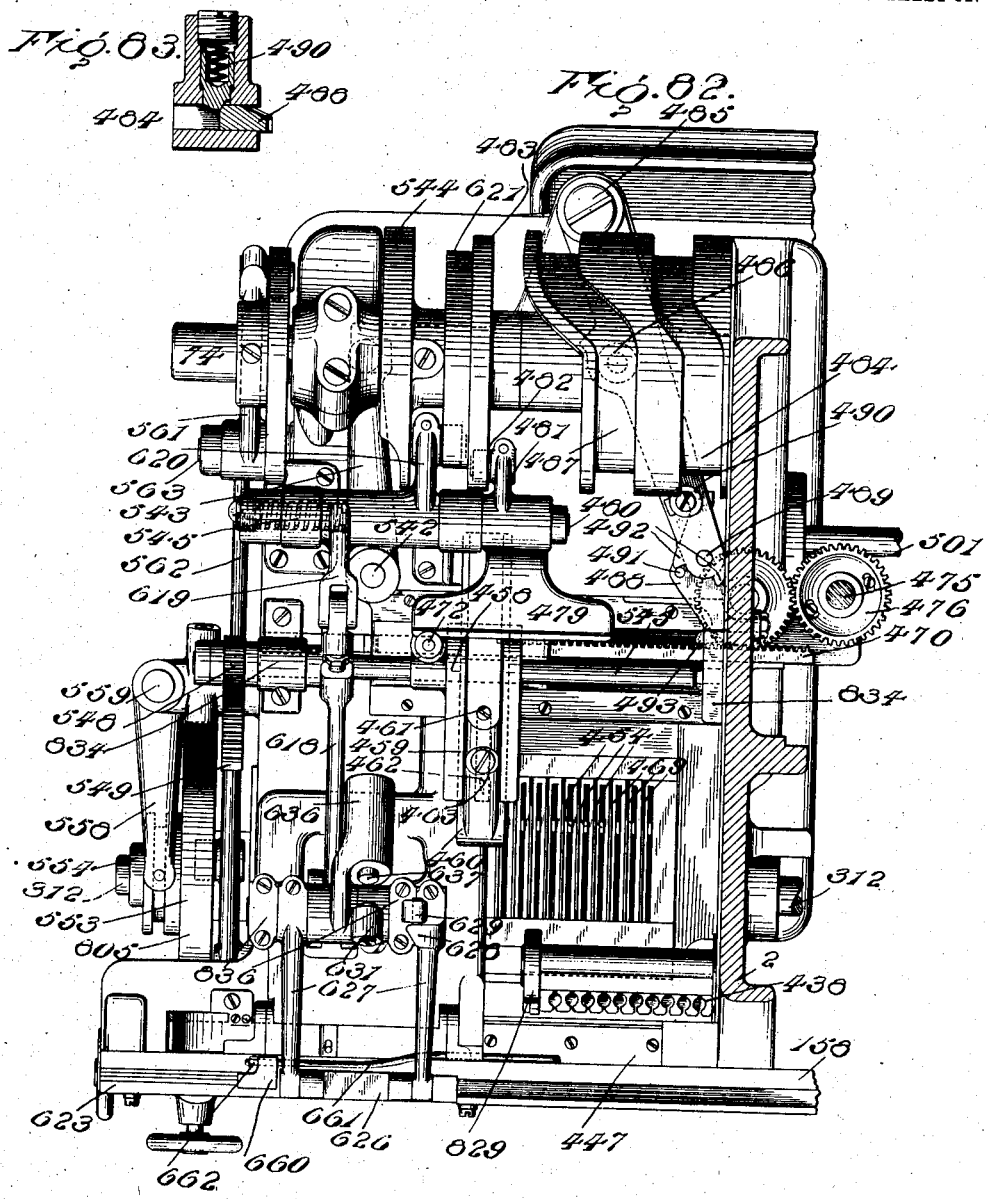

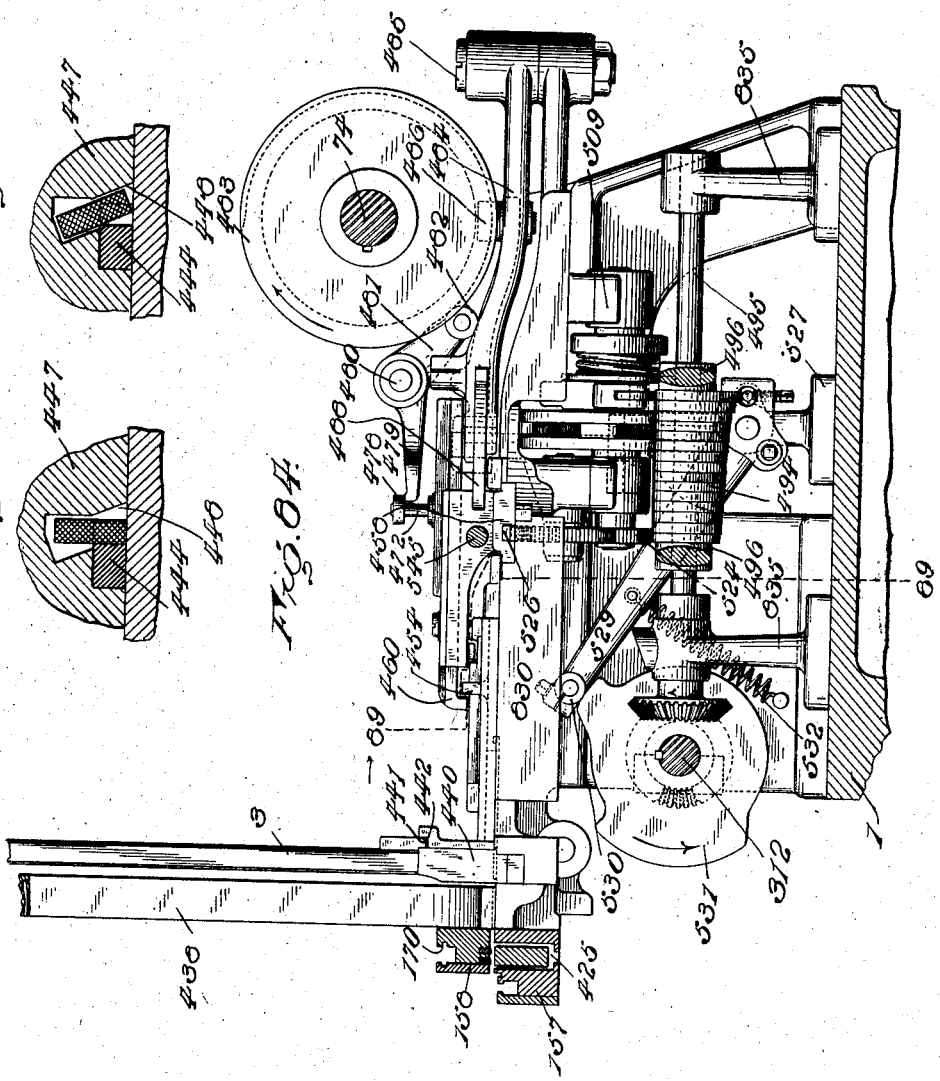

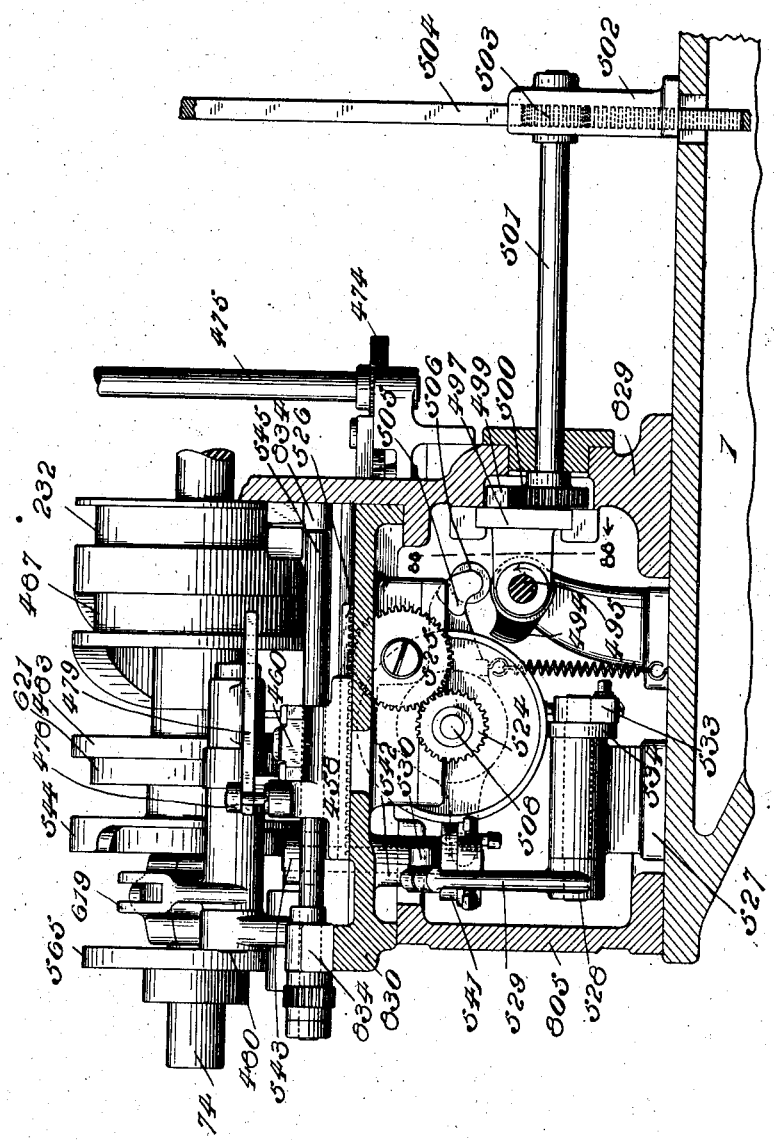

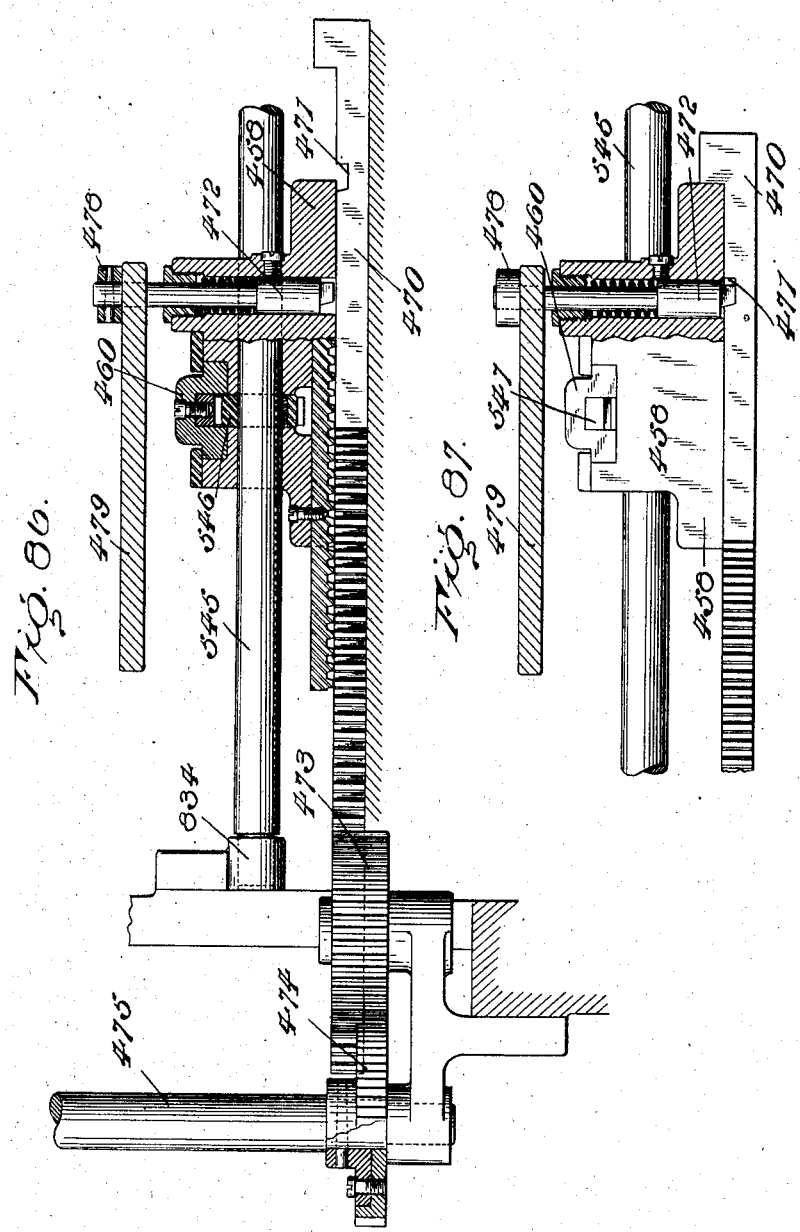

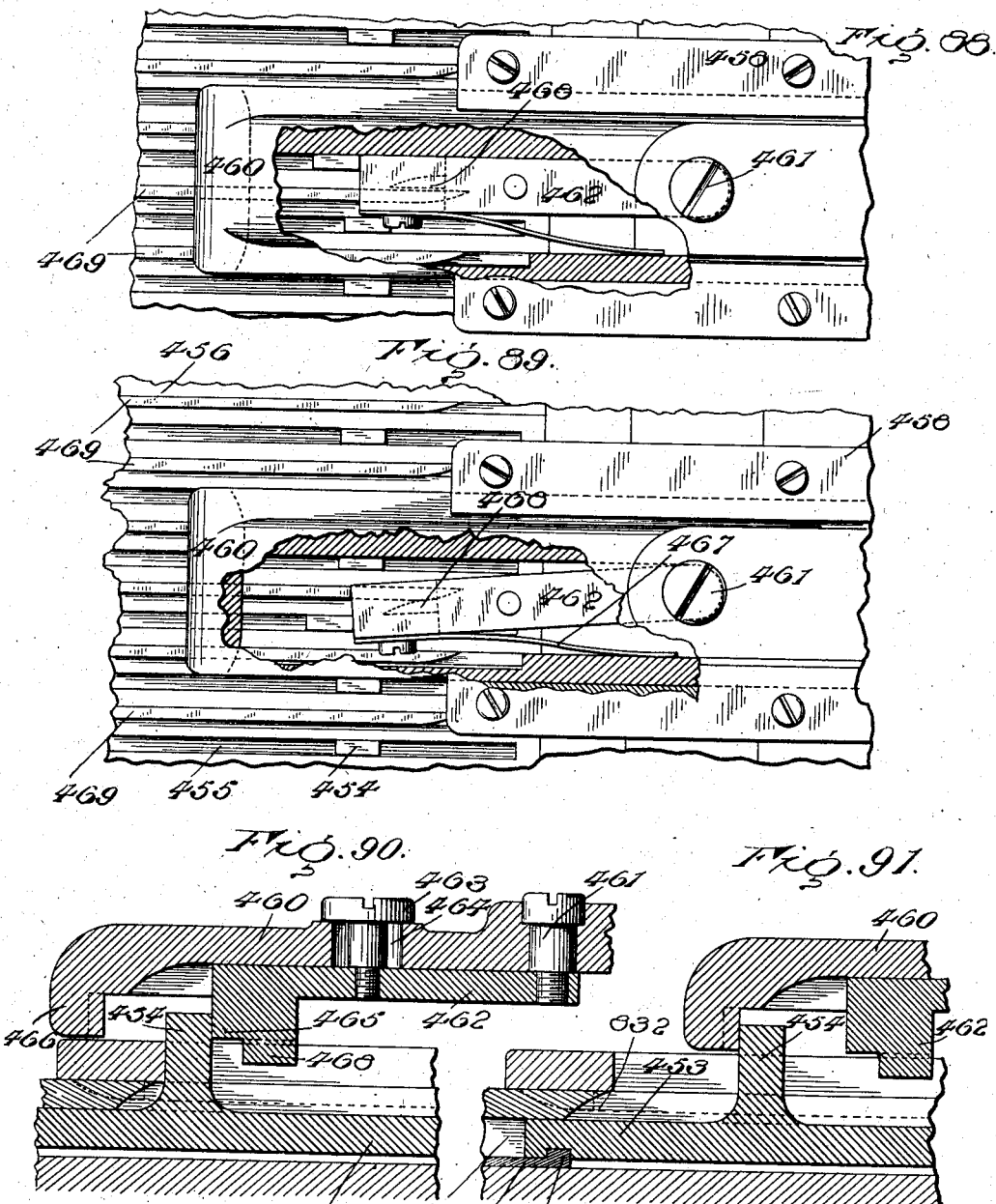

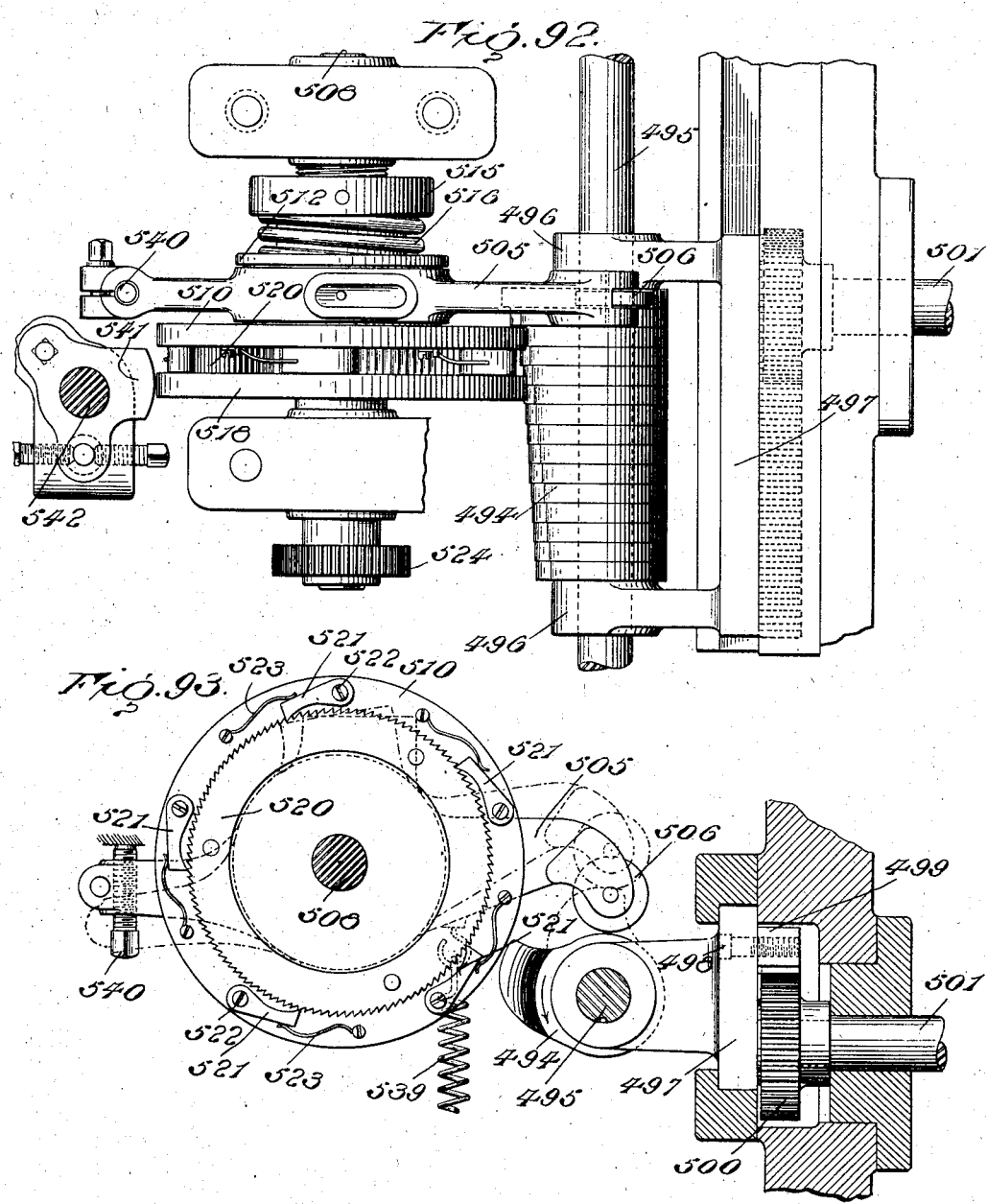

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 38.

Fig. 94.

Fig. 95.

WITNESSES:

INVENTOR.
Alexander Dow.
BY
ATTORNEYS

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 39.
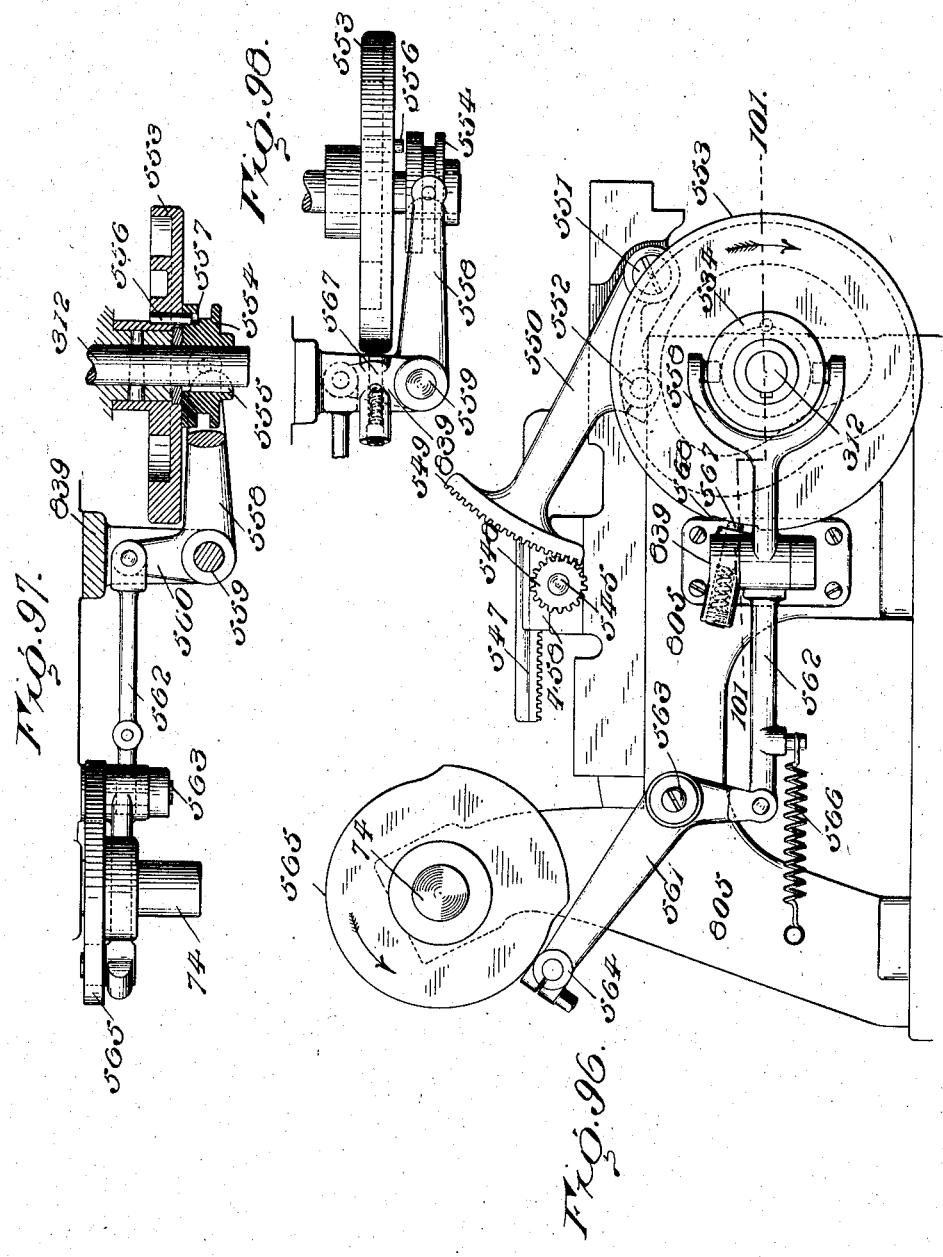
WITNESSES:
INVENTOR
Alexander Dow.
BY
ATTORNEYS No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 40.
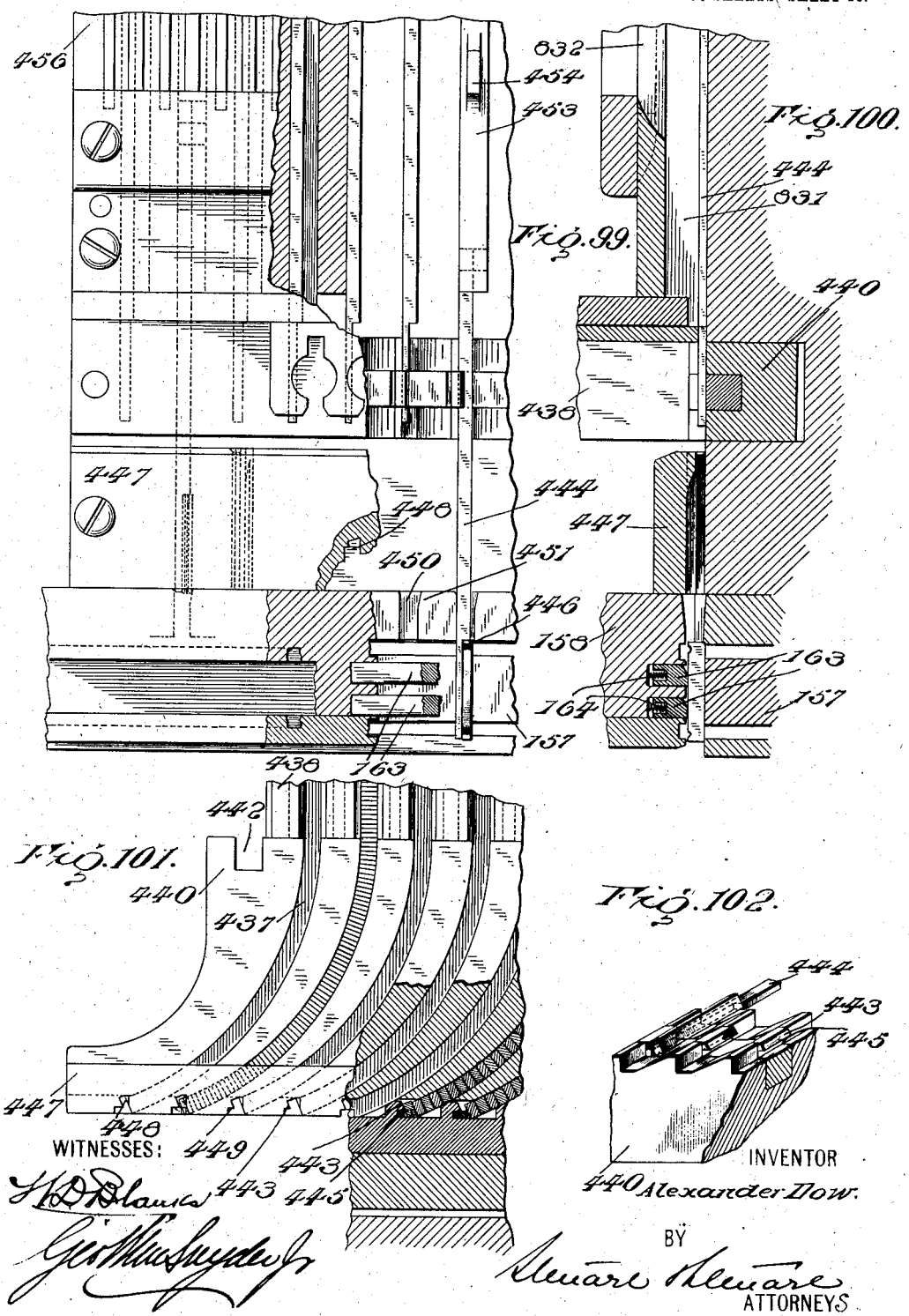

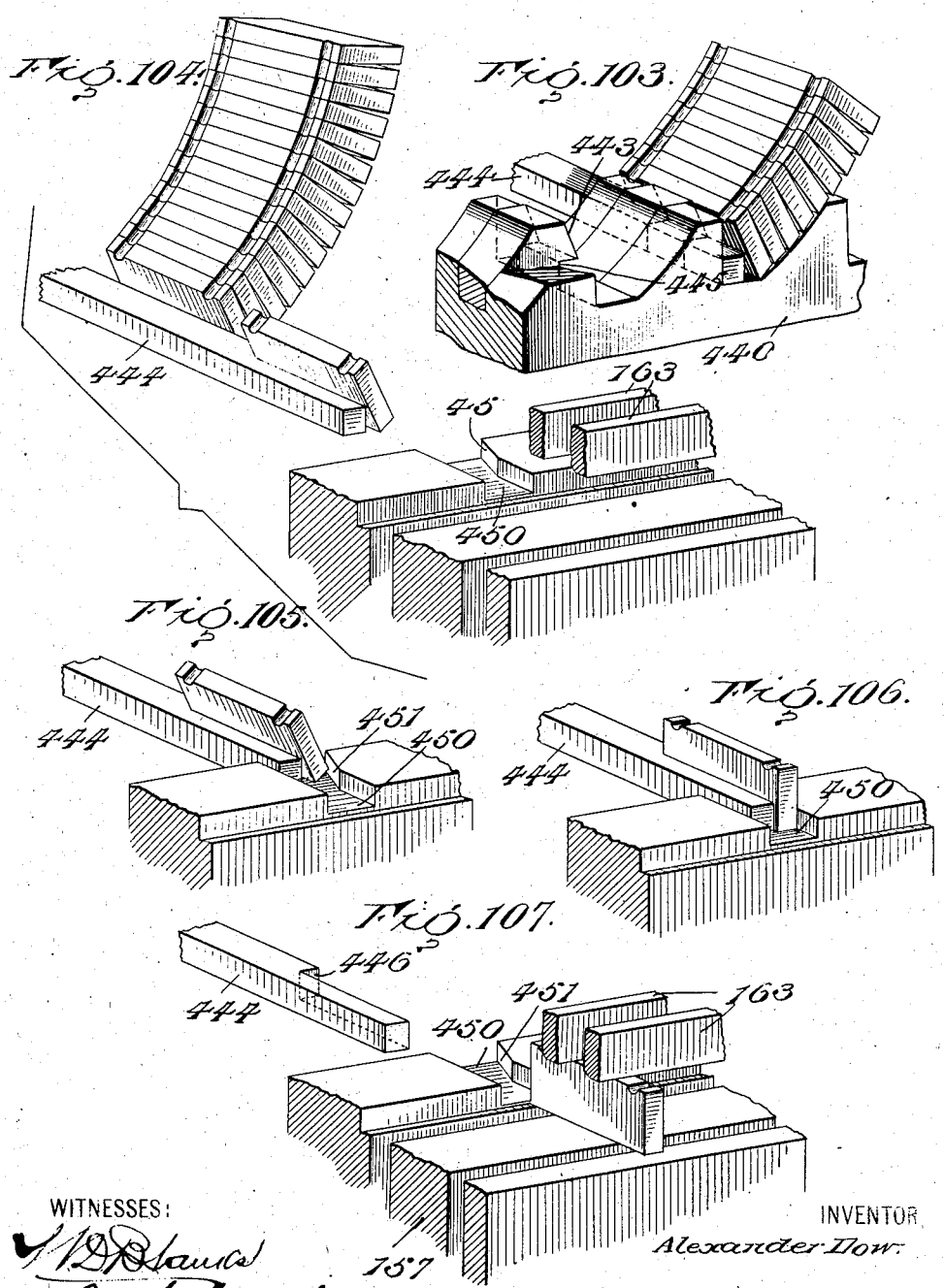

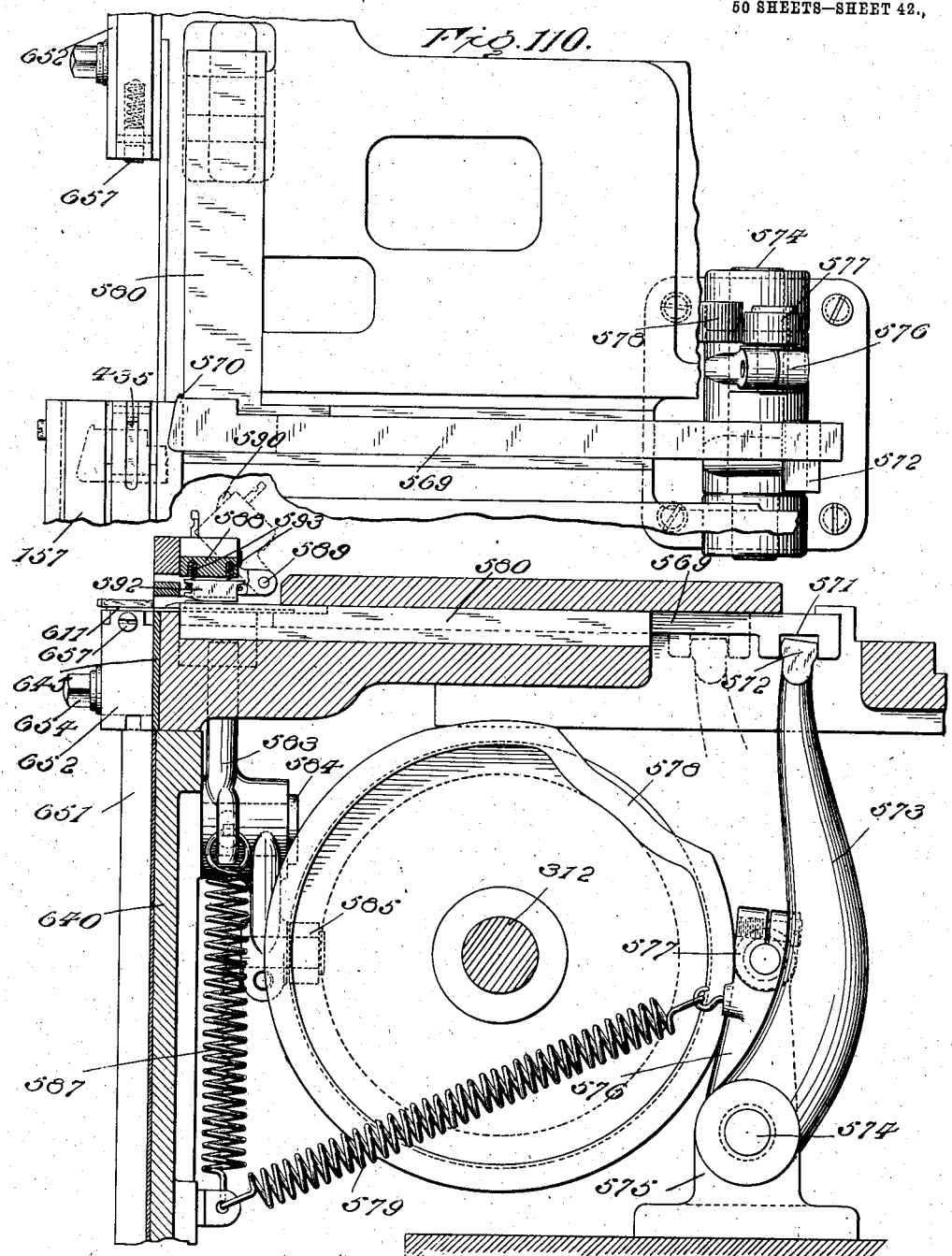

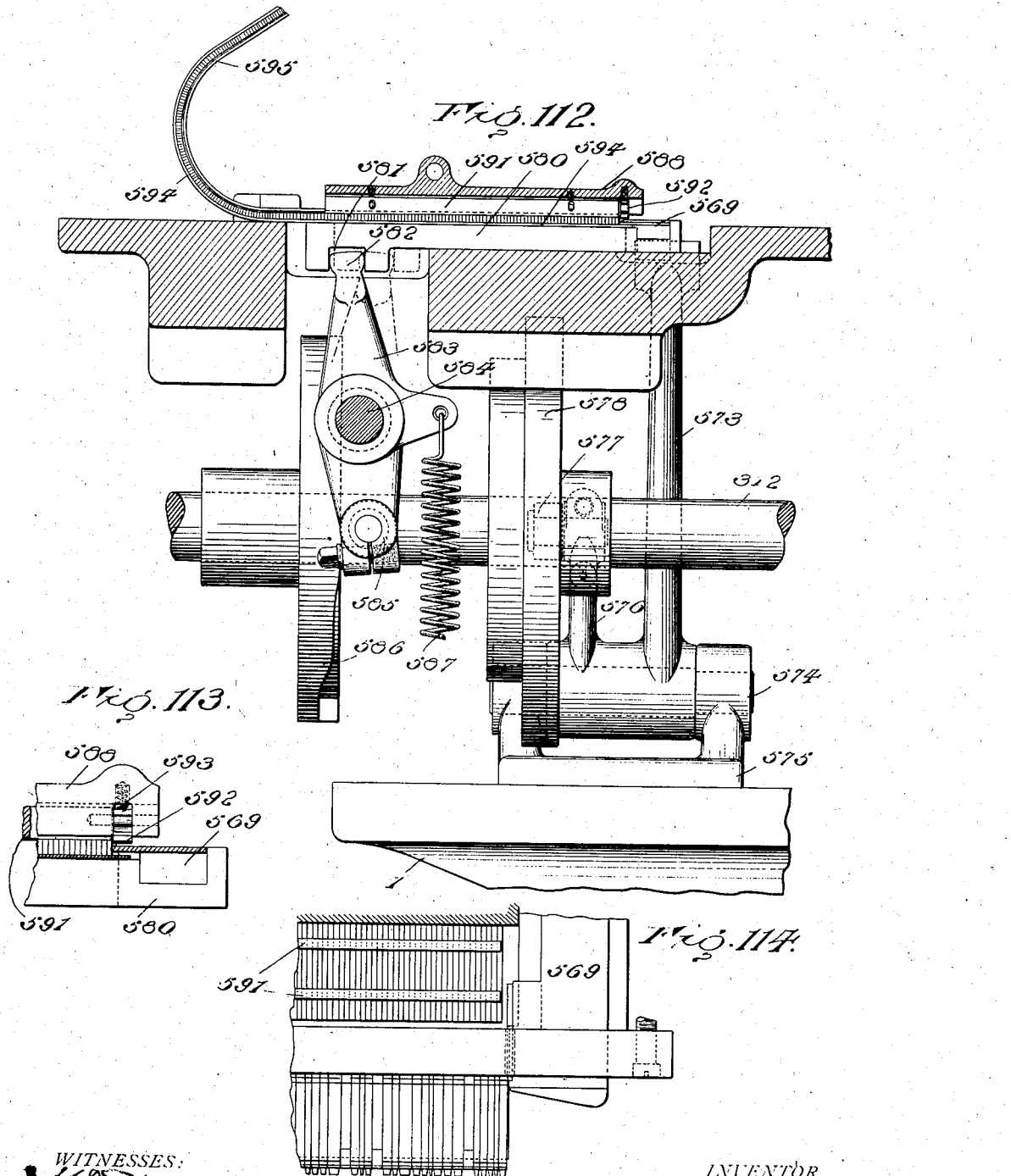

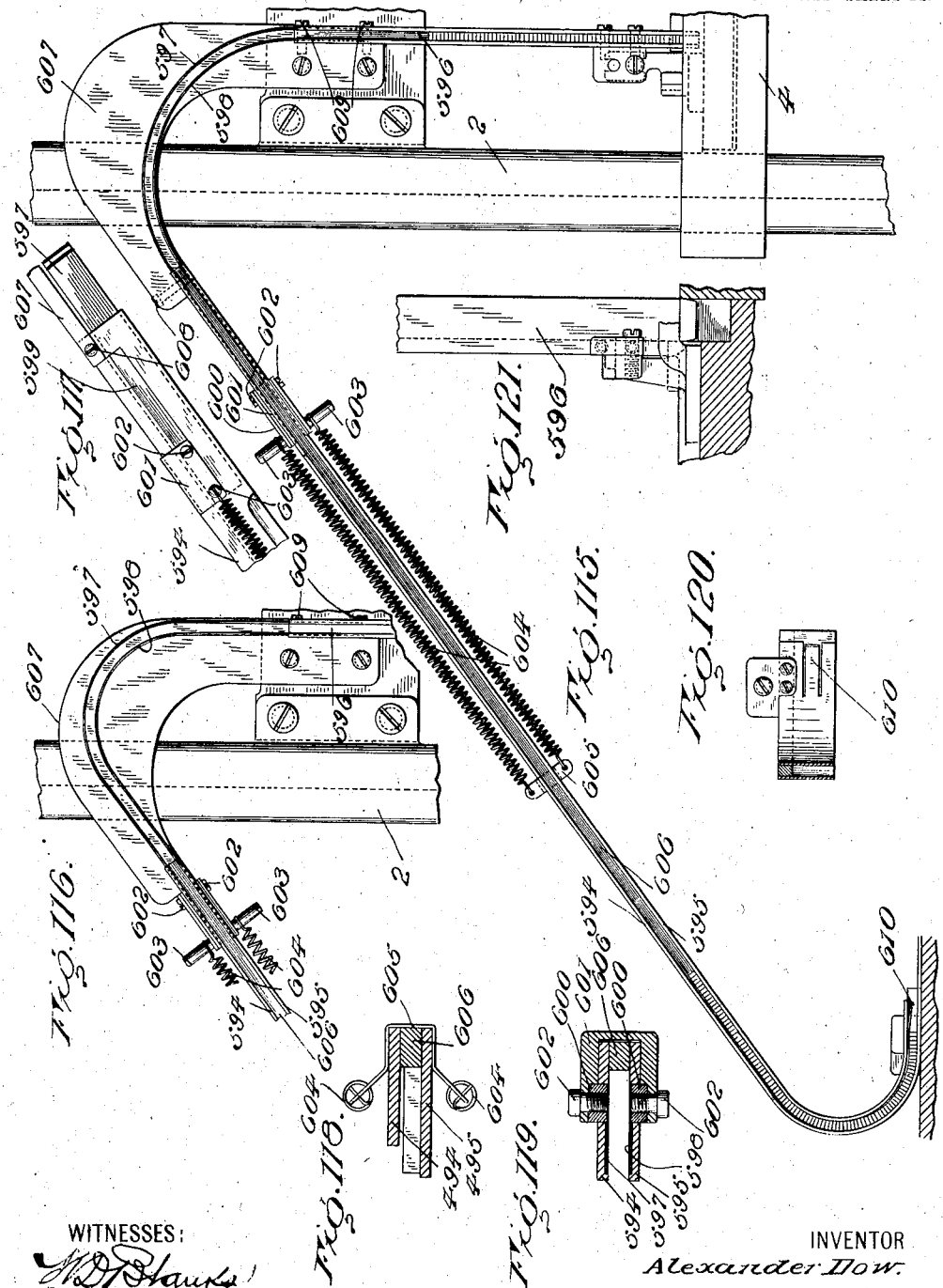

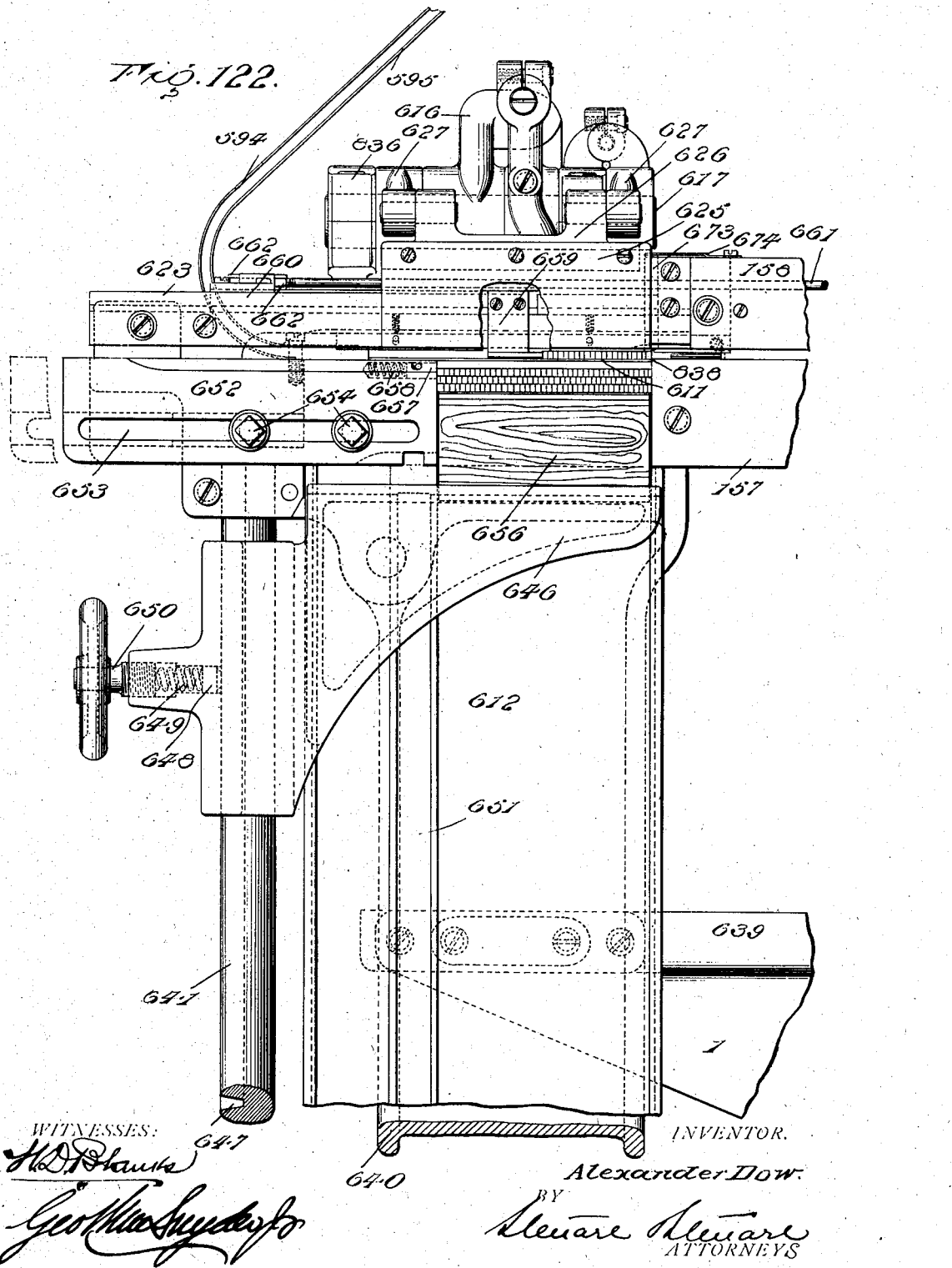

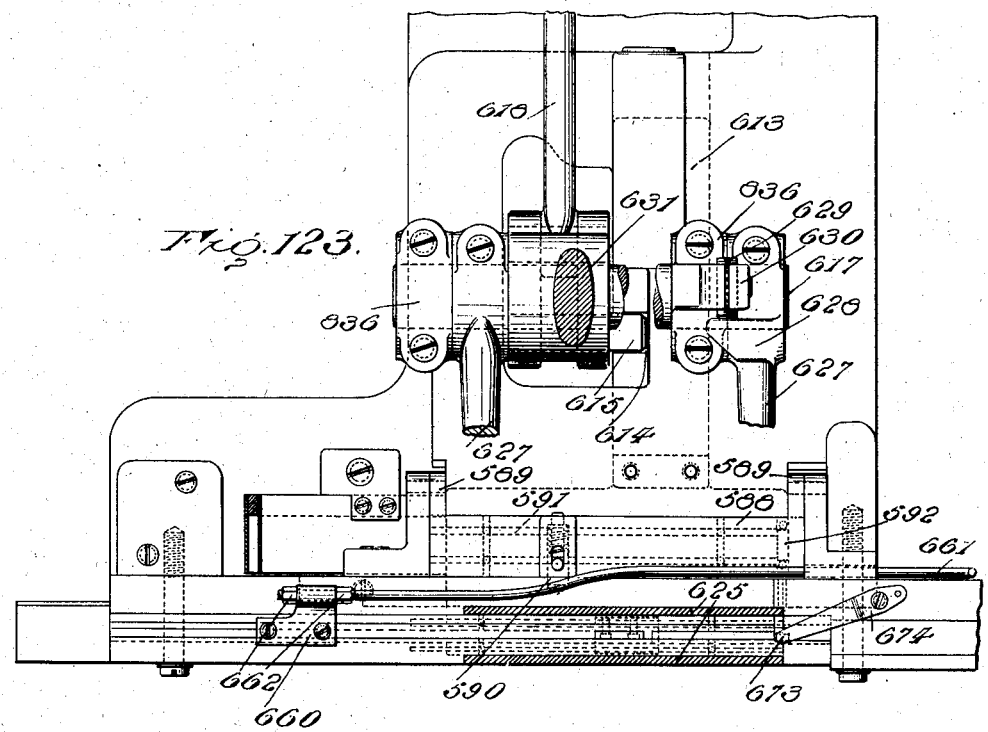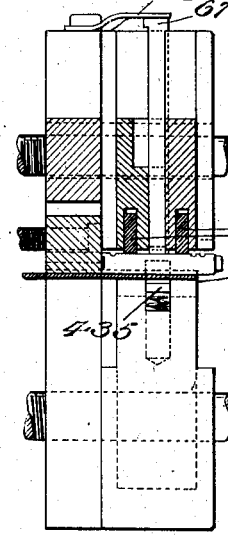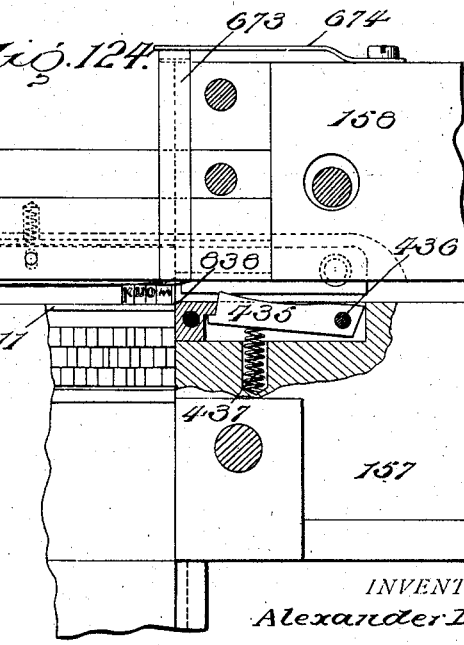

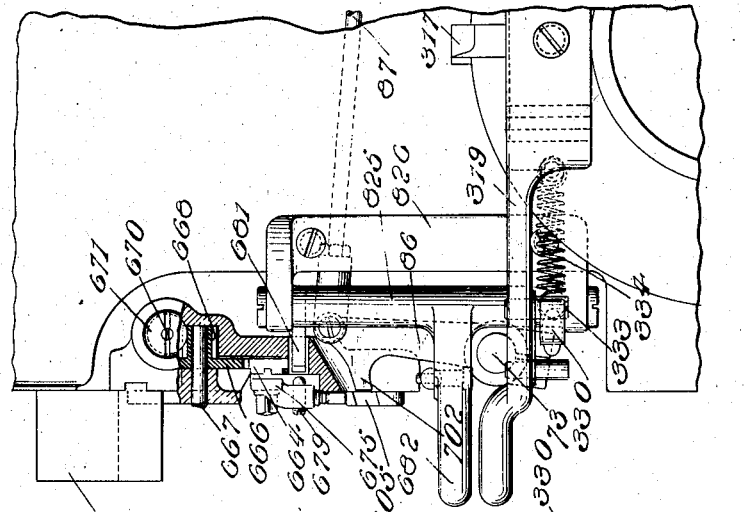

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 48.
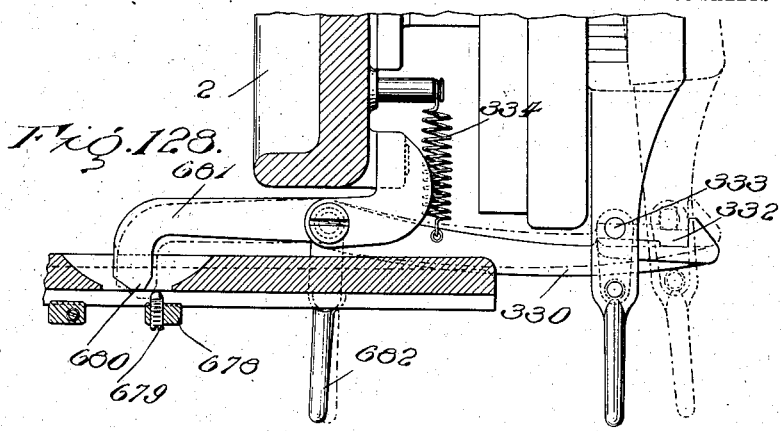
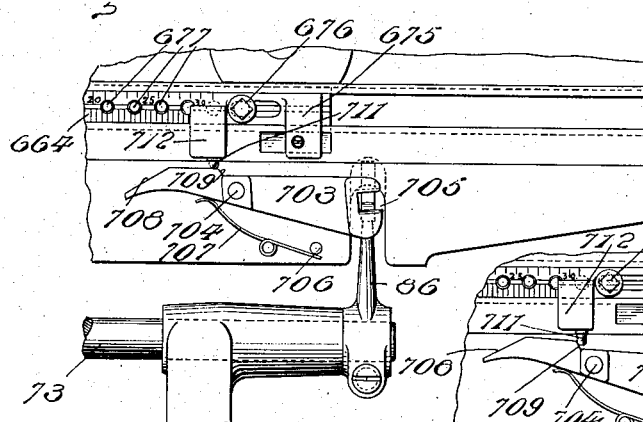
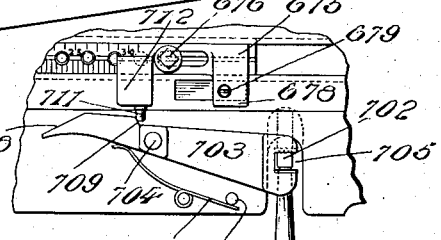
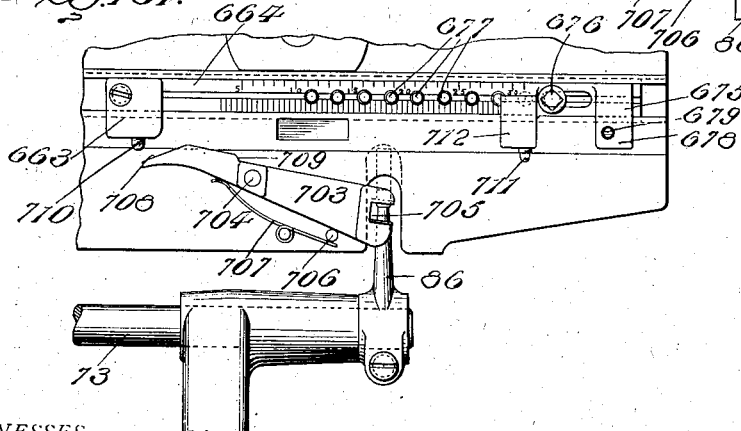
WITNESSES:
INVENTOR.
Alexander Dow.
BY
ATTORNEYS

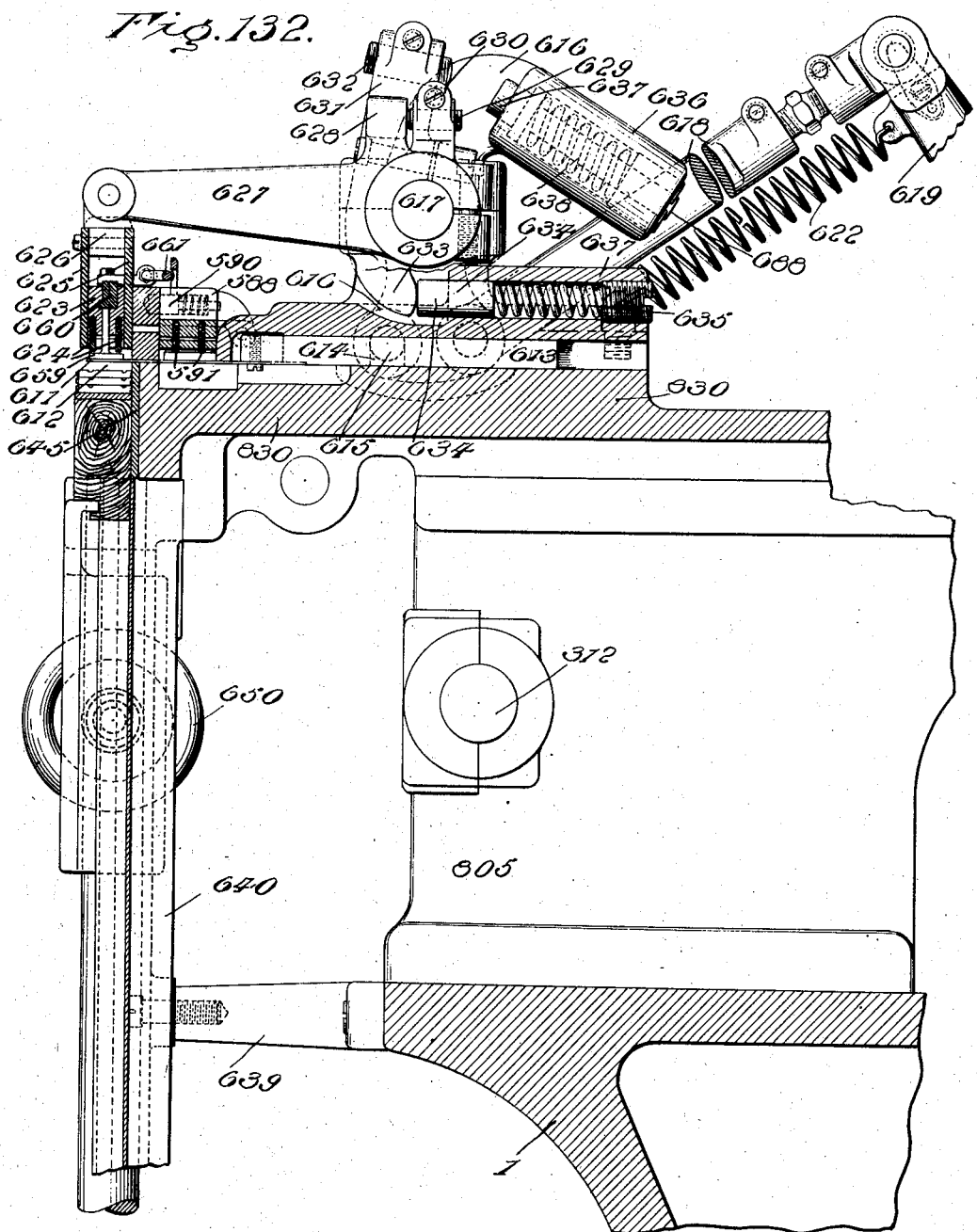

No. 833,956. PATENTED OCT. 23, 1906.
A. DOW.
TYPE COMPOSING AND JUSTIFYING MACHINE.
APPLICATION FILED JULY 2, 1902.
50 SHEETS—SHEET 50.
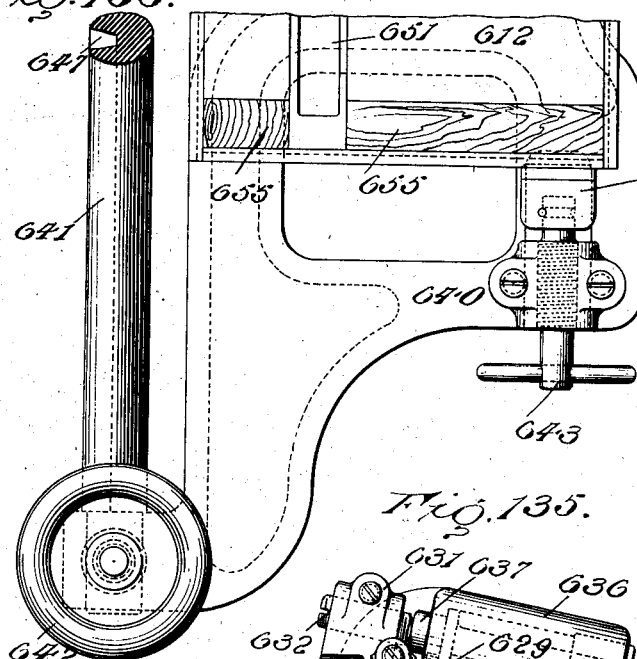
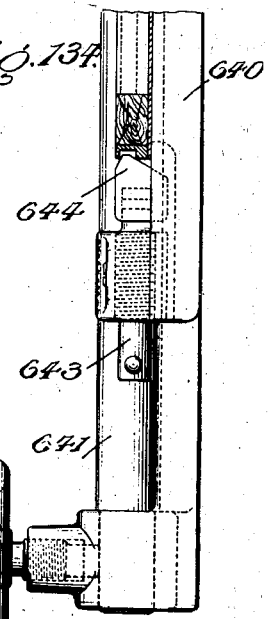
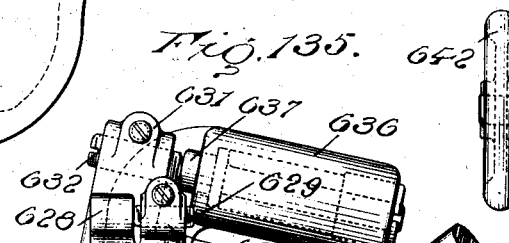
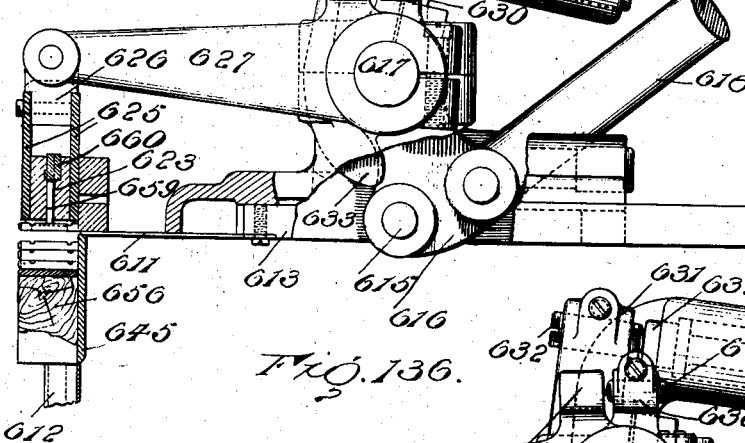
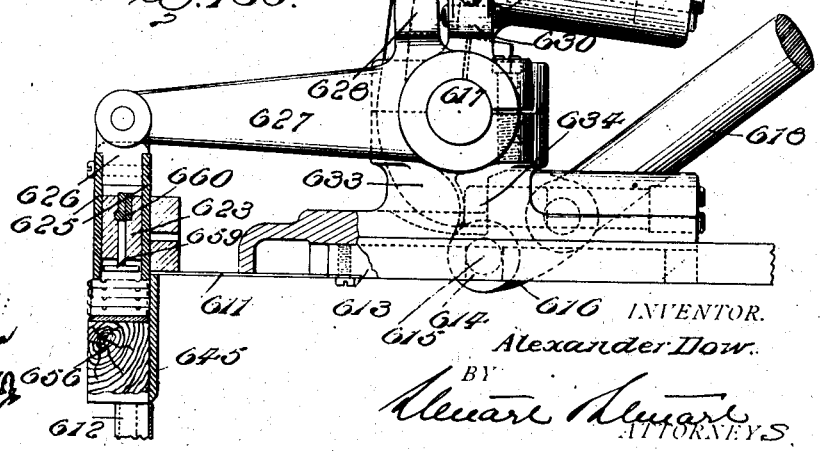
WITNESSES:
INVENTOR.
Alexander Dow.
BY
ATTORNEYS

UNITED STATES PATENT OFFICE.

ALEXANDER DOW, OF NEW YORK, N. Y.

TYPE COMPOSING AND JUSTIFYING MACHINE.

No. 833,956.  Specification of Letters Patent.  Patented Oct. 23, 1906.

Application filed July 2, 1902. Serial No. 114,152.

*To all whom it may concern:*

Be it known that I, ALEXANDER DOW, a citizen of the United States of America, and a resident of the city of New York and State of New York, have invented certain new and useful Improvements in Type Composing and Justifying Machines, of which the following is a specification.

My invention relates to a justifying mechanism which is especially adapted to be used in connection with a type-setting machine; but the invention is not limited to such a use, as it is capable of use in connection with any other form of machine wherein it is desirable to bring printing-lines to a uniform length.

The machine herein shown and described is in the nature of an improvement upon the machine shown and described in my pending application, Serial No. 10,949, March 31,
1900. In the application above referred to a justifying-machine is shown and described whereby by the manipulation of selecting-keys alone certain mechanism is set which when the line has been completed is put in operation, and this mechanism performs automatically and harmoniously all the operations necessary to the perfect justification of lines of type of any desired length.

The machine shown in the present application operates upon the same principles and in the same general way as the machine shown in my prior application, and as in that application I have set out in great detail the principles of my invention and the theories upon which a machine carrying out my invention operates I deem it unnecessary to restate these principles and theories in this application, and I hereby refer to said application for such descriptions.

The operation of the machine shown in the present application may be briefly stated as follows: By the manipulation of the keys of the keyboard the type to form the line is e set in what I term a "stick," the words of the line being separated by temporary or false spaces, one of which is inserted every time the space-key is struck. Whenever the space-key is struck and a temporary space is inserted, a suitable mechanism is actuated which controls what I term the "dividing-plates," which plates operate to determine the size of what I term "ideal" spaces, which are necessary to bring the line to standard length. When the line as set has attained approximately the proper length, the line-key is struck and the justifying mechanism set in motion. The first operation of the machine on the striking of the line-key is to transfer the type which have been set up in what I term the "stick" to the justifying mechanism. Here the line is measured and by means of the dividing-plates hereinbefore referred to the difference in length between the set line and the standard is determined and this difference is divided into as many parts as there are word-spaces in the line, the mechanism which determines the size of the spaces which will justify the line being controlled by this measuring mechanism. After the proper-sized spaces have been determined the line is separated into words and a true space of the proper size is ejected from the space-case onto the word-raceway, and as the words are swept along this word-raceway by a suitable carrier they pick up and carry before them a true space.

As there should be no space before the first word, I have devised means whereby when the first word is being swept past the space-supplying device no space will be ejected, the space-ejector for this purpose being thrown out of operation during this time; but the space-ejector is immediately thrown back into operation, and for each of the succeeding words in the line a space is inserted before each word as the same are swept along the word-raceway. As the line is separated into words the false spaces separating the words are carried along behind each word, and by a suitable extractor these false spaces are withdrawn as the last letter of the words reach a position over the galley. The words are there assembled into the completed line and by suitable mechanism are afterward forced down into the galley.

Preferably I use a setting mechanism of the character shown and described in my application, Serial No. 114,153, filed July 2, 1902, and I hereby refer to said application for a description of the setting mechanism. Parts of this setting mechanism are, however, shown in the drawings of this application for the sake of clearness and completion.

Referring to the drawings, in which the same reference characters indicate the same parts throughout the specification, Figure 1 is a front elevation of a machine embodying my invention. Fig. 2 is a rear elevation of the same. Fig. 3 is an elevation of the galley end of the machine. Fig. 4 is a sectional view of the setter mechanism, taken on line 4 4 of Fig. 1. Fig. 5 is a vertical section of the mechanism for registering the number of spaces, detached, looking toward the galley end. Fig. 6 is a plan view, partly in section, of the mechanism shown in vertical section in Fig. 5. Fig. 7 is a rear view of the mechanism shown in Figs. 5 and 6. Fig. 8 is a view of a detached detail, showing the pin and part of the lever which forms part of the space-registering mechanism. Fig. 9 is a front elevation of the clutch, detached, for the line-shaft in its normal position with parts broken away. Fig. 10 is a side view of the mechanism shown in Fig. 9, with parts broken away, looking toward the driving end of the machine. Fig. 11 is a front view of the line-clutch lever, showing the position of the lever at the time the clutch is thrown in. Fig. 12 is a view similar to Fig. 11, showing the lever after it has been returned to its normal position. Fig. 13 is a view similar to Fig. 11, showing the lever in its position when the clutch is being thrown out. Fig. 14 is a perspective view of the clutch-lever block. Fig. 15 is a perspective view of the clutch-bolt. Figs. 16 to 25, inclusive, show the clutch-bolt and lever-block in the different positions which they assume with relation to each other. Fig. 26 is a vertical longitudinal section of the stationary and movable parts of the transferring-stick. Fig. 27 is a vertical longitudinal section of the stationary and part of the movable parts of the stick, showing a line being forced into the movable part of the stick. Fig. 28 is a cross-sectional view taken on line 28 28 of Fig. 26. Fig. 29 is a front view of a detached detail, showing the bell-ringing mechanism, parts being removed to more clearly show the construction. Fig. 30 is a plan view of the mechanism shown in Fig. 33 with the parts in section. Fig. 31 is a view similar to Fig. 29, showing a line of type in the position where it has tripped the bell-hammer. Fig. 32 is a view similar to Fig. 30, showing the bell-hammer tripped. Fig. 33 is a front elevation of the right-hand or driving end of the machine, the setter mechanism being removed to more clearly show the construction. Fig. 34 is a plan view of the mechanism shown in Fig. 33. Fig. 35 is an end elevation of the mechanism shown in Fig. 33. Fig. 36 is a plan view of the beds of the line-raceway and of the word-raceway, showing a line of type on the bed of the line-raceway in position to be measured. Fig. 37 is a plan view similar to Fig. 36, showing a line of type partially on the bed of the line-raceway and partly on the bridge, being separated into words. Fig. 38 is a view similar to Fig. 36 with no line in the raceway and the parts in their normal position. Fig. 39 is a front elevation of the line and word raceways with the front removed. Fig. 40 is a longitudinal vertical sectional view through the center of the line and word raceways, showing the stop which forms a gage-point, the caliper-head, the bridge and its actuating mechanism, the word-driver and its actuating mechanism, the space-channels, and the latch beyond which the words are left by the word-driver. Figs. 41 and 42 are detail vertical sectional views of the bridge and its surroundings, showing how the line is divided into words by the bridge. Fig. 43 is a detail plan view, partly in section, showing the caliper-bar, the caliper-head, and the means for raising and lowering the caliper-head. Fig. 44 is a section of the mechanism, Figs. 39, 43, taken on line 44 44. Fig. 45 is a plan view showing the gage-block and the gage-block bar-lock. Fig. 46 is an elevation of the mechanism shown in Fig. 45 looking in the direction of the arrow a. Fig. 47 is a detail sectional view of the bar-lock. Fig. 48 is a side elevation of the gage-block lever and bar and a part of the tube-shaft. Fig. 49 is a plan of the gage-block lever and bar and also of the locking-block. Fig. 50 is a side view of one end of the gage-block bar. Fig. 51 is a vertical transverse section of the gage-bar and lock. Fig 52 is a perspective view of the gage-block. Fig. 53 is a side elevation, partly in section, of the dividing-plate mechanism viewed from the driving end of the machine. Fig. 54 is a rear elevation of the dividing-plate mechanism with parts broken away. Fig. 55 is a rear elevation of the plate-raising mechanism, showing the plates and raising mechanism in zero position. Fig. 56 is a view similar to Fig. 55, showing the plate-holding mechanism released to allow the plates to assume the position determined by the space-key. Fig. 57 is a view similar to Figs. 55 and 56 with the selected plate in position to be forwarded and the raising mechanism returned to zero. Fig. 58 is a detail view of the cam for throwing out the holding and stepping-up pawls. Fig. 59 is a plan view of the stepping-up-pawl lever and pawl. Fig. 60 is a side elevation of the stepping-up-pawl lever. Fig. 61 is a central longitudinal section of the plate raising and the holding ratchet mechanisms. Fig. 62 is a detail side elevation of the raising and holding ratchet-wheels, showing their position in relation to each other. Fig. 63 is a detail face view of the raising ratchet-wheel. Fig. 64 is a detail face view of the holding ratchet-wheel. Fig. 65 is a horizontal sectional view of the plate-carriage, showing how the plates are secured to the same. Fig. 66 is a rear elevation of the lower end of the plate-carriage, showing but one plate in position. Fig. 67 is a back view of the lower end of the carriage, showing the screws by which the plate-guides are held and adjusted. Fig. 68 is a plan view of the dividing-plate mechanism with parts removed. Fig. 69 is a diagrammatic view showing the relation of the caliper-head, gage-block, and dividing-plates. Fig. 70 is a plan view, partly broken away, of the word-shaft clutch. Fig. 71 is a side view of the word-shaft clutch viewed from the driving end of the machine with parts broken away. Fig. 72 is a vertical transverse section of the line-forcer-actuating mechanism. Fig. 73 is a detail view showing one of the word-shaft-clutch tripping mechanisms and also part of the driving mechanism for the line-forcer. Fig. 74 is a detail view of the word-shaft-clutch trip, showing the parts in position before the trip is actuated. Fig. 75 is a similar view showing the trip after it has been actuated. Fig. 76 shows a dog operating the trip-lever. Fig. 77 is a vertical transverse section of the bridge, the word-depressor, and its actuating mechanism, the parts being shown in an elevated position. Fig. 78 is a detail longitudinal section of the bridge and part of the line-raceway, showing how the line is divided into words. Fig. 79 is a view similar to Fig. 77, showing the line-depressor and bridge depressed. Fig. 80 is a longitudinal section of a part of the line-raceway and bridge, showing the friction-plates. Fig. 81 is a plan view of the bridge end of the line-raceway. Fig. 82 is a plan view of the galley end of the machine. Fig. 83 is a vertical section of the spring safety device adapted to permit the carriage-return arm to yield if it meets abnormal resistance. Fig. 84 is a transverse section taken on line 88 88 of Fig. 85 looking in the direction of the arrow b, the other parts being removed. Fig. 85 is a cross-section on line 89 89 of Fig. 84 with parts removed. Fig. 86 is a detail sectional view of the actuating mechanism for setting the space-ejector carriage, the carriage being shown out of engagement. Fig. 87 is a view similar to Fig. 86, showing the ejector-carriage in engagement with its actuating mechanism. Figs. 88 and 89 are plan views, partly broken away, of the space-ejector, showing the manner in which the space-ejector is caused to select the different sizes of spaces. Fig. 90 is a vertical transverse section of the space-ejector in its forward position. Fig. 91 is a similar view showing the space-ejector in its retracted position. Fig. 92 is a detached plan of the space-ejector-carriage stepping mechanism. Fig. 93 is a side view, partly in section, of the mechanism shown in Fig. 92 with one of the disks removed. Fig. 94 is a detached detail view, partly in section, of the ejector-carriage-stepping mechanism and the lock therefor. Fig. 95 is a detached detail view, partly in section, of the lock. Fig. 96 is an end view showing the space-ejector-actuating mechanism viewed from the galley end of the machine. Fig. 97 is a plan view, partly in section, of the mechanism shown in Fig. 96, the section being taken on line 101 101 of Fig. 96. Fig. 98 is a plan view of a part of the mechanism shown in Fig. 96 with the clutch thrown out. Fig. 99 is a plan view, partly in section, of the forcers, space-case, space-turning block, and word-raceway. Fig. 100 is a longitudinal section of the mechanism shown in Fig. 99. Fig. 101 is a front view, partly broken away, of the lower part of the space-case. Fig. 102 is a perspective view of a detached part of the bed of the space-case. Figs. 103 to 107 are diagrammatic views showing how the spaces are ejected and straightened up. Figs. 108 and 109 are vertical sections of the space-guide block, showing a space in the two positions it occupies while passing through the guide. Fig. 110 is a plan view of the mechanism for extracting the false spaces. Fig. 111 is a vertical transverse section of the mechanism shown in Fig. 110. Fig. 112 is a vertical longitudinal section of the mechanism shown in Fig. 110, taken at right angles to Fig. 111. Fig. 113 is a detail view showing the gate by which the false spaces in the receiving-channel are prevented from being forced out of the channel when the extractor moves forward. Fig. 114 is a diagrammatic view showing the extractor removing a false space from the word-raceway. Fig. 115 is a front elevation of the false-space channel. Fig. 116 is a view showing a portion of the false-space channel elongated. Figs. 117 to 121 are detail views showing the construction of parts of the false-space channel. Fig. 122 is a front elevation of the galley mechanism, parts being broken away. Fig. 123 is a plan view, partly in section, of the galley end of the machine. Fig. 124 is a detached detail, partly in section, of the end of the word-raceway and part of the galley. Fig. 125 is a vertical transverse section of the mechanism shown in Fig. 124. Fig. 126 is a front elevation, partly in section, of parts of the word-shaft-clutch tripping mechanism and the line-shaft-key lock. Fig. 127 is an elevation of the right-hand end of the mechanism shown in Fig. 126 with parts shown in section. Fig. 128 is a plan view of a part of one of the word-shaft-clutch tripping mechanisms. Figs. 129, 130, and 131 are detail views showing the lock for the line-shaft key in its different positions. Fig. 132 is a sectional view showing the galley mechanism. Figs. 133 and 134 are detail views showing the means for holding the removable part of the galley. Figs. 135 and 136 are detail views showing the mechanism for depressing a line into the galley in two different positions.

1 indicates the base of the machine. Secured to this base are the uprights 2 2, on which the mechanism is carried. Mounted between the uprights 2 2 are the type-cases 3.

4 indicates the raceway along which the type are carried by the drivers 5 to the centrally-located channel 6, where they are assembled into a line.

For a detailed description and illustration of the setter, parts of which are shown in this application, reference is made to my copending application, Serial No. 114,153, filed July 2, 1902, and I will not further describe the setting mechanism in the present application.

*Stick mechanism.*—When the type are assembled into a line in the assembling-channel 6, they gradually pass down into a swinging stick 7, secured to the shaft 8, by which it is oscillated. This stick is preferably and as shown (see Figs. 26 to 32, inclusive) constructed in the following manner: 9. is a right-angle block having two faces, one on each side of the right angle, one forming one of the sides of the type-channel and one the bottom of the channel. In the face which forms the side of the channel is cut a longitudinal channel, into which is fitted two plates 10 10, one above the other. These plates are friction-plates and are for the purpose of holding the line of type frictionally in the stick. These plates are provided with elongated holes 11, through which are passed pins 12 to allow the plates to move forward under the influence of springs 13. 800 is a block provided with a longitudinal channel in one face and secured to the block 9 by the pins 12 in such a position that its face having the channel will be in the same vertical plane as the slotted face of the block 9, and together these faces form one side of the channel. In the channel cut in the block 800 are mounted two friction-plates 801 801, one above the other, and at the top a hook 20. The plates 801 801 are provided with the elongated holes 802 802, through which the pins 12 also pass to allow the plates to move forward under the influence of the springs 803. The friction-plates 10 801 are preferably slightly concave on their front bearing edges in order that they may more securely grip the bottom type of a line in the channel. By slightly concaving the bearing edges of the friction-plates 801 the ends of the plates toward the delivery end of the stick will be nearer the stationary side of the stick, and consequently the type-receiving channel will gradually become narrower toward the delivery end, and the distance between the stationary and yielding sides of the stick will vary at different points in the channel. The advantage of this construction is that the stationary side of the stick in which the blade 145, to be hereinafter described, reciprocates for the purpose of forcing the line out of the stick is straight, so that the blade bears squarely upon the type and has no movement in relation to the type. If the plates 801 were straight, a type after it has passed the center of a plate would only be held by the friction between the side of the type and the side of the plate and there would be no clamping action on the bottom of the type; but by curving the bearing-face of the yielding plate in the manner shown the bearing-face will approach the stationary side of the stick, and consequently will always tend to grip the bottom type of a line in the stick and securely hold the same. The plates 801 801 are beveled on the forward longitudinal edge, as best shown in Fig. 28, in order that the type in the stick may be readily taken out and inserted for the purpose of making corrections. 14 is a block which is secured to the right-angled block 9 by means of screws 15 passing through enlarged holes in the block 14, the screws having heads larger than the holes, whereby said block may be moved on the right-angled block 9 in order to vary the width of the channel for different sizes of type, said block being held by the screws 15, clamping it in its adjusted position. The block 14 has two faces at right angles with each other, one in contact with the surface of block 9, and the other stands opposite to and parallel with the slotted faces of blocks 9 and 800 and forms one of the sides of the type-channel. The type-channel face of the block 14 is slotted longitudinally to receive a hook 21. In order to provide means for accurately setting the width of the channel to correspond to the various sizes of type to be set in the machine, I provide the right-angled block 9 with a projecting pin 16, said pin being provided with a flat surface 17 on its projecting end. The end of the pin passes through a large hole 18 in the block 14. 19 is a screw which passes through the side of the block 14 into the enlarged opening 18, the relation of the end of the screw to the flat surface 17 of the pin being so adjusted that when it is desired to adjust the size of the channel for a given size of type one of the type of that size is placed between the flat surface of the pin 16 and of the end of the screw 19, when by moving the block 14 so that the screw and flat surface on the pin contact with opposite edges of the type the channel will be of the proper width for that size of type. The screws 15 may then be tightened up, and the block 14 thus held in the set position. Mounted in the blocks 800 and 14 at the upper end of the type-channel are the hooks 20 21, the hooks 20, which are in the block 800, being pivoted at their lower ends next to the upper one of the pins 12, the hooks 21 being pivoted on the pin 22 at its lower end. Near the upper end of these hooks are the elongated slots 23, through which pass the guiding-pins 12 and 24. 25 represents springs normally pressing the upper ends of the hooks toward each other in position to engage in back of the last type in a line, as shown in Fig. 26, when the line has been depressed into the movable stick by means to be hereinafter described.

In order to notify the operator when the line is nearly full, I provide means connected with the stick which will sound a bell or other signal, this means being adjustable for different lengths of lines.

26 is a bell or any other suitable alarm device mounted on the frame, and 27 is the hammer for this bell carried on an arm 28, mounted in an arm 29, pivoted on the stud 30. Secured on the opposite end of the arm from that on which the bell-arm 28 is secured is a spring 31, the other end of this spring being suitably secured to any suitable part of the frame, as at 32.

33 is a stud against which the hammer-arm 28 is adapted to strike and limit the upward movement of said arm under the tension of the spring 31.

Mounted in brackets 34, secured to the stick, is the shaft 35, provided with a wing 36, parallel to its axis, and a pin 37, said pin being so positioned that when the parts are in their normal position the pin will be in the path of the arm 29 and hold the parts in the position shown in Fig. 29.

38 is a block guided in a way in the back of the block 800.

39 is a plate having a flange on its rear edge which, with the plate, forms an angle. The plate is perforated at its side through the flange and is mounted and slides upon the edge of the block 800. Through the perforation on the side of the plate passes a clamping-screw 40, which is threaded into the block 38, and by the screw the block 38 and the plate 39 may be clamped together and onto the edge of the block 800 at any desired point to determine the length of the line to be set.

Pivoted to the block 38 at 41 is an elbow-lever 42. This elbow-lever at its elbow carries a pin 43 and is provided at its free end with a circular head 44. 45 is a second lever provided with a circular head 46 and pivoted at 47 to the block 38.

48 is a plate which is guided in a suitable way cut in the adjacent sides of the blocks 9 and 800. This way is cut through from the type-channel to the rear of the blocks 9 and 800, and in it are guided the plate 48 and the levers 42 and 45. The end 49 of the plate 48 normally projects into the path of the line in the type-channel of the stick. This plate is mounted on the heads 44 46 of the levers 42 45 and will be moved down when the end of the line strikes the end 49 of the plate and by the levers 42 and 45 will be drawn back as it descends by the levers 42 and 45. This movement will swing back the lever 42, carrying the pin 43, and this pin, by contact with the wing 36 of the shaft 35, will oscillate this shaft against the tension of the spring 50. The movement of the shaft 35 will move the projecting pin 37 out of the path of the arm 29 and allow the spring 31 to pull the arm 29, and thus strike the bell. The wing 36 extends for a considerable distance on the shaft 35, and the pin 43 is vertically adjustable with its connected parts for lines of various length; but no matter what the position of the pin may be it will always remain in operative relation to the wing. When the stick is swung around its pivot for the purpose of delivering the line to the justifying mechanism and the line is pushed out of the stick and delivered to the justifying mechanism in a manner to be hereinafter described, then the plate 48 and the other mechanism, including the pin 37, will by the action of the spring 50 be returned to their normal positions, so that when the stick swings back to the position shown in Fig. 1 the pin 37 will strike the side of the arm 29 and move the parts back to their set position, which is shown in Fig. 29.

*False-space-inserting mechanism.*—I will next describe the mechanism whereby every time a temporary or false space is inserted in a line a mechanism is thrown into operation which will operate suitable devices, to be hereinafter specifically described.

Referring to Figs. 4 to 8, inclusive, 51 is a space-key pivoted at 52 and connected to a suitable lever 53. This lever 53 through the upright rod 54 and lock 55 controls a forcer 56 in the manner described in my setter application above referred to. The space-forcer 56 is provided with a notch 57 at the bottom of the usual concave in the top surface of the forcer. 60 is a lever pivoted on a stud 61, secured to the frame of the machine. 62 is a bolt carried in a suitable hub on one end of the lever 60. This bolt is provided with a collar 63 and a friction-collar 64, which latter prevents the bolt from working too easily in the hub. 65 is a cam mounted on the driving-shaft 66, this shaft being the shaft which carries the wing-cams for operating the forcers, as fully described in my setter application above referred to. The cam 65 is provided with a high portion 67 and a wing portion 68, having a shearing face extending across the width of the cam. 59 is a stud suitably mounted in a vertical position, having the arm 58 secured to it at one end and the arm 69 at the other end. The free end of the arm 58 engages the notch 57 in the space-forcer 56, while the arm 69 engages the collar 63 of the bolt 62. When the forcer is in its normal or inoperative position, the bolt is in its retracted position and out of engagement with the cam 65. The construction of the parts is such that when the false-space forcer is actuated the lever 58 will be moved to the position shown in dotted lines in Fig. 6, which by its movement will move the arm 69 and force the bolt 62 into a position over the cam 65, whereupon the lever 60 will be actuated by the cam, and this lever will actuate suitable mechanism to be hereinafter described. Just after the raised portion 67 of the cam has passed the bolt 62 the wing portion 68 of this cam will come in contact with the end of the bolt and return the bolt to its normal position, whereby it will be seen that the lever 60 will be actuated once every time the space-key is operated. 70 indicates a projection on the hub on the end of the lever 60 to prevent the lever from dropping too far when the bolt is in its normal position.

*Line-shaft clutch.*—When a sufficient length of type has been set in the stick to form a line, the operator depresses the key 71, carried on the lever 72, which is fastened to the rock-shaft 73, and by the depression of this key starts the operation of the justifying mechanism, which accomplishes the justification of the line automatically in a manner to be now described.

74 is what I term the "line-shaft." This shaft is journaled in the main uprights 2 2, and its ends are supported and journaled in the brackets 804 805, secured to either end of the base 1, and upon the depression of the line-key 71 this shaft, by a clutch to be hereinafter described, is given one complete revolution and then stopped.

Fast on the driving-shaft 66 is a pinion 75, meshing with a gear 76, fast on the countershaft 77, and fast on the other end of this counter-shaft 77 is a pinion 78, which meshes with a gear 79, loose on the line-shaft 74, this gear 79 forming one part of the clutch, which I will now describe, the gear 79 running constantly. Referring now to Figs. 9 to 25, inclusive, wherein this clutch mechanism is shown in detail, 80 is a hub secured to the shaft 74, having on one end the disk 81 and on the other end the flange 114, which is cut away for about fifty degrees, and on the inner side the radial edge of the flange at one side of the cut is beveled to form a shearing-cam. The disk 81 carries a clutch-bolt 82, which when released is adapted to engage in one of the teeth of the toothed wheel 83 and throw the clutch into operation. The toothed wheel 83 is secured to the gear 79 by means of the dowel-pins 84 and screws 85. Secured to the rock-shaft 73, (see Fig. 4,) which is operated by the line-key, is an arm 86, connected, by means of a rod 87, to one end of a trip-lever 88, pivoted upon a bracket 89, the other end of the lever being provided with a notch 90, which is adapted to engage one end of an arm 91. 92 is a spring which tends to hold the trip-lever 88 in position to engage the end of the arm 91. 93 is what I term the "clutch-lever." This lever is pivoted at 94 and carries the clutch-block 95. This clutch-block, Fig. 14, is provided with pins 96, which engage holes bored into the lever 93. Between the block and a shoulder formed on the lever into which the pins project are placed the cushioning-pads, of leather or other suitable material 97, for the purpose of taking up the jar incident to stopping the line-shaft. The clutch-block 95 is held in the lever 93 by means of the dovetail 98. The back face of this dovetail is provided with a slot 99, which is adapted to be engaged by the end of the screw 100 to limit the movement of the block on the lever.

Referring now specifically to Figs. 14 and 15, which are detail views of the clutch block and bolt, respectively, the bolt 82 is formed with a beveled end 102 of a shape to engage notches between the teeth of the toothed wheel 83 to lock the parts of the clutch together. One of the sides of the bolt is provided with a tongue 101, which works in a suitable way and guides the bolt in its radial movement in the disk. From one of the edges of the bolt projects an extension on which several cam-surfaces are formed. The beveled faces 105 and 104 of the projection meet, and the corner is rounded to form a cam-surface 103. The face 104 and the end face of the projection meet to form another cam-surface 118, and the top face of the projection is beveled to clear other parts of the mechanism. The cam-surface 103 is adapted to engage the cam-surface 106 on the clutch-block 95 for the purpose of lifting the bolt 82 out of engagement with the toothed wheel 83 to disconnect the parts of the clutch. 107 is a continuation of the cam-surface 106, the cam-surface 107 being curved, so that after the cam-surface 103 has ridden up the surface 106 and reaches the surface 107 the increasing steepness of the surface 107 will gradually stop the bolt and the disk carrying the bolt without shock and jar to the mechanism.

Mounted in a suitable part of the frame is a plug 108, which is held against the end 109 of the lever 93 by the spring 110, the plug, as shown, being made hollow and one end of the spring being inserted in the bore of the plug, while the other end is held in the bore of a hollow screw 111. By means of this hollow screw the tension of the spring 110 may be adjusted as desired. As will be clearly seen from the drawings, the spring 110, acting through the plug 108, will when the trip-lever 88 is released swing the lever 93 out until the end 109 of the lever strikes the adjustable stop 112, which movement will swing the block 95 clear of the bolt 82 and allow the bolt to be forced, by means of the spring 113, into engagement with the teeth of the toothed wheel 83. The flange 114 on one end of the hub 80 has on its inner surface the shearing-cam, as described, which is adapted to engage a corresponding cam-surface 115, carried by the lever 93, and force the lever back into position to be engaged by the trip-lever 88 against the tension of the spring 110. The flange 114 is cut away, as most clearly shown in Fig. 10, to allow the lever to be thrown out and remain out until the clutch-bolt is entirely clear of the block and lever. The lever is then returned by means of the cam on the flange when the end of the lever is engaged by the trip-lever 88 in time for the block to catch the bolt and lift it out of engagement by the surfaces 106 and 107, as has been described. In order to hold the parts in position to prevent the bolt from engaging the toothed wheel 83 until the lever 93 is again thrown out, I provide the block with a catch or hook 116, and this hook is provided with a cam-surface 117, which is adapted to engage the edge 118 of the bolt 82. This will force the lever 93 away from the disk 81. In order to allow for this movement without disengaging the lever from the trip-lever 88, I have provided the end of the lever 93 with the arm 91, which is pivoted at 119 to the lever 93. The lever 93 is provided with a hub 120, in which there is guided a plunger 121, having a shoulder 122, against which rests one end of the spring 123, the other end of the spring 123 engaging the end of a screw 124, which passes into the hub. The screw 124 is bored out to allow the end of the plunger 121 to move therein. The head of the plunger 121 rests against the end 125 of the arm 91. By this construction it will be seen that when the lever 93 is forced back by the edge 118 of the bolt 82 striking the cam-surface 117 of the hook 116 the lever 93, carrying the block, will be moved away from the disk 81 and will allow the bolt to pass beyond the hook 116. The cam-surfaces 106, 107, and 105 are beveled off, as most clearly shown in Figs. 24 and 25, in order that when the block is forced clear under the bolt in the position shown in Fig. 25 there will be a sufficient clearance between the bolt 82 and the teeth of the wheel 83.

Having now fully described the construction of the clutch, I will, by reference to Figs. 16 to 25, inclusive, describe the operation and relative position of the clutch parts during the operation of disengaging the bolt from the toothed wheel. In Fig. 16 the cam-surface 103 of the bolt is shown as just starting up the cam-surface 106, and the cam-surface 118 has just made contact with the cam-surface 117, and the lever 93 has just started to move away from the face of the disk 81. In Figs. 17 and 18 the bolt is shown in the position it occupies just as it reaches the end of the cam-surface on the hook 116, and the parts are in position when they are ready to move to the position shown in Figs. 19 and 20, the parts being forced from the position shown in Figs. 17 and 18 to that shown in Figs. 19 and 20 by the spring 123, and by means of the bevel on the cam-surface 106 this movement will lift the bolt clear of the teeth of the wheel 83 in the manner shown in Figs. 24 and 25. Should the momentum of the parts be such that the shaft will not stop at the instant the bolt is disengaged from the teeth of the wheel 83, but the disk carrying the bolt move beyond this position, the parts may come to rest in the position shown in Fig. 21 and the bolt rest upon the part of the cam-surface 107, which has a very much less angle than the angle of the cam-surface 106. Should the momentum be sufficiently great to carry the bolt by this position, then the bolt will ride upon the part of the cam-surface 107 which is of increasing steepness and may come in contact with the vertical portion of said cam-surface and come to rest in the position shown in Figs. 22 and 23 or somewhere between this position and the position shown in Fig. 21. Should, however, the momentum be so great that the increasing steepness of the cam-surface 107 will not be sufficient to stop the rotation of the shaft and the bolt come in contact with the vertical portion of the cam-surface 107, as shown in Figs. 22 and 23, with sufficient force to rebound, the parts will be prevented from rebounding too far by means of the hook 116.

When the type are being assembled in the channel by the setting mechanism in the manner fully described in my setter application, above referred to, they are brought over the channel and are depressed into the channel by means of the depressor 839, which is carried on the arm 126 and pivoted at 127, the arm being oscillated for the purpose of depressing the type into the channel by the cam 128, carried on the main driving-shaft 66. This cam oscillates the arm 126 just sufficiently to depress the type into the assembling-channel, but not enough to force the line of type into the transferring-stick. In order to accomplish this, I have placed on the line-shaft 74 the cam 129, which engages with a roller 130, carried on one arm of a bell-crank lever 131, which is pivoted at 132. The other arm 133 of this lever stands under an adjusting-screw 134, carried by the end of the arm 126. It will be seen by this construction that when the line-shaft 74 makes its revolution the arm 126 is given a movement sufficient to depress all the type in the line into the transferring-stick. As soon as the depressor has forced the line of type down into the stick the stick is swung to bring the channel in the stick in line with the raceway in order that the line may be transferred from the stick into the raceway.

The shaft 8 (see Fig. 34) is journaled in a suitable bearing in the frame of the machine and is located transversely of the frame. Near the front end of the shaft 8 is an integral collar 806, which is seated in a recess surrounding the front end of the journal. The front end of the shaft protrudes through the frame, and to it is frictionally secured the stick 7, which is held between the collar 806 and the clamping-nut 807. The rear end of the shaft 8 protrudes through the frame, and upon this rear end is secured the gear 135. Meshing with the gear 135 is a rack on the bar 136, guided in ways 137 137. Pivoted to the bar 136 at 138 is a connecting-link 139, the other end of the connecting-link being pivoted at 140 to the lever 141.

808 is a bracket secured to and extending out from the uprights 2 and braced to the bracket 804. The lever 141 is pivoted at 142 to the bracket 808, and this lever carries at the end opposite the pivot 140 the roller 143, working in the groove of a cam 144, this cam being carried by the line-shaft 74. The groove in this cam is so timed that the lever 141 and, through the connections described, the stick 7 will be operated immediately after the cam 129, Fig. 4, has, through its connections, forced the type down into the stick, when the stick will be swung from the position shown in Fig. 1 to a position in which the channel in the stick will coincide with and form a continuation of the line-raceway, as shown in Fig. 40.

Referring, again, to Fig. 34, the line is transferred from the stick to the line-raceway by means of the blade 145, guided in suitable ways 809. 146 is a cam secured on the line-shaft 74 for the purpose of operating the blade 145. 147 is a lever pivoted at 148 on the bracket 808 and provided with a roller adapted to run in the groove in the cam 146. To the other end of this lever is pivoted the link 149, the other end of said link being pivoted at 150 to the blade 145. In order to prevent any liability of breaking of parts, should the blade for any reason meet with any abnormal resistance, I prefer to make the lever 147 in two parts which may yield in relation to each other. Pivoted to the lever 147 at 151 is the arm 152, the outer end of which is pivotally connected to the link 149. Attached to the projection 153 of the arm 152 is the spring 154, the other end being suitably secured to the lever 147. 155 is a set-screw carried by the arm 152 and adapted to make contact with the stop 156 and hold the arm in proper relation to the lever 147. By this construction it will be seen that should the blade meet with any abnormal resistance the spring will allow the lever 147 to continue its motion under the influence of the cam 146 without moving the blade. Attention is called to the fact that by means of the set-screw 155 the distance which the blade will force the line into the raceway may be varied, so that it will leave the line at the proper point in the raceway.

When the line is transferred from the stick into the raceway, it is forced by the blade into the position shown in Figs. 36 and 40, and while the line is in this position it is measured to determine the sized spaces necessary to bring the line to standard.

*Line-measuring mechanism.*—The raceway is composed of the bottom bar 157 and the top bar 158, which are held separated a suitable distance to provide a channel for the type to pass through. The bar 158 is channeled out on its top to form flanges 810, on the interior faces of which are cut the ways 170, and through a portion of its length it is slotted vertically and longitudinally through its center, and the rear wall formed by this longitudinal slot is also slotted longitudinally at 811. The lower bar of the raceway is held in a fixed position by means of the screws 159, while the upper bar of the raceway is held in position by means of the screws 160, the holes through which the screws 160 pass being larger than the screws, but smaller than the heads of the screws, whereby the bar 158 may be adjusted toward and away from the bar 157. The bar 157 is provided with friction-plates 161, which are normally pressed upward by means of the springs 162. These plates are for the purpose of holding the line in position in the raceway and preventing the type from falling over. The set of plates 161 extend from the receiving end of the raceway to the bridge, to be hereinafter described. That part of the raceway extending from the receiving end of the raceway to the bridge I term the "line-raceway" and that part extending from the bridge to the galley I term the "word-raceway." From the bridge to the galley I provide the upper bar of the word-raceway 158 with the friction-plates 163, which are pressed down upon the top of the type by the springs 164. (See Fig. 100.) 165 is a stop which is normally pressed up into the path of the line by the spring 166 and forms a gage-point, between which and the caliper-head, to be hereinafter described, the line is measured. Preferably and as shown in Fig. 40 the lower end of this stop is bored for the reception of the spring 166, the other end of the spring being supported by the plate 167. Preferably the top of the stop 165 is beveled, as shown at 168, in order that when the type are forced into the raceway by the blade 145 the type will force down the stop 165 and pass over the same. As soon as they have passed over the stop the stop will be forced up behind the type by means of the spring 166.

169 is a caliper-bar which is guided in the ways 170 in the sides of the flanges 810 and has a depending portion 812, which projects into and travels in the vertical slot in the bar 158. Its lower end extends down to the level of the under side of the bar 158. The depending portion of the bar has a vertical hole therein, square in cross-section, and the depending portion also has a transverse slot on its rear surface which cuts into the vertical hole.

171 is a caliper-head, which is adapted to reciprocate in the vertical hole and has a lateral projection 813 at its lower end. The caliper-head is moved up and down in the caliper-bar by mechanism to be hereinafter described, being lowered when the line is to be measured and raised after the line has been measured in order to allow the line to be carried on through the raceway. It is this head which presses the type against the stop 165, and between it and the stop the line is calipered. The caliper-head 171, the caliper-bar 169, and the parts connected thereto form what I term the "calipering mechanism." The caliper-head 171 is provided with a transverse groove 172 in its rear side, and engaging this groove is a plate 173, which is mounted on the pivots 174. The plate 173 passes through the slot 811 in the rear wall of the vertical slot formed in the bar 158 and also through the transverse slot in the depending portion 812 and into the groove 172 in the caliper-head, the slot 811 and the slot in the depending portion 812 being of sufficient width to allow of the movement of the plate on its pivot while the groove 172 fits the head of the plate. Secured to the plate 173 and forming a part of said plate is the arm 175. Pivoted to this arm at 176 is the adjustable link 177, pivoted at 178 to the arm 179, pivoted at 180 to one of the uprights 2 and carrying the cam-roller 181, engaging the cam 182 on the line-shaft 74. 183 is a spring which holds the cam-roller 181 in constant contact with the cam 182. 184 is a screw, the opposite ends of which are reversely threaded, whereby the length of the link 177 may be varied. By this mechanism the rotation of the cam 182 raises and lowers the caliper-head.

The upper face of the caliper-bar 169 is provided with teeth 185, and 186 is a block, which is provided with teeth adapted to engage the teeth 185. 187 represents slots cut in the block 186, through which are passed screws 188, adapted to engage holes 189, tapped into the bar 169. The purpose of this construction is to give an approximate adjustment to the calipering-head for various lengths of lines.

190 is a block which is set in an opening cut in the top of the block 186. This block is provided with elongated holes 191, through which pass the headed screws 192, said screws passing to holes tapped into the block 186. 193 represents set-screws passing through the sides of the block 186 and engaging the sides of the block 190, by which the block 190 may be adjusted in relation to the block 186 by the adjusting-screws 193 and then secured in such adjusted position by means of the screws 192.

194 is a pivot-block mounted and sliding in a transverse slot cut in the top of the block 190, which is at right angles to the axis of the caliper-bar.

195 is an arm carrying the pivot 196, which engages the pivot-block 194. The other end of this arm is secured to the vertical shaft 197. I prefer to make this shaft in the form of a tube-shaft in order that it may be light, and yet not yield to torsional strain. This shaft is mounted in suitable bearings 198, secured to the inside of one of the uprights 2 of the frame of the machine. Fast to the upper end of the tube-shaft is an arm 199, Figs. 48, 53, and 69.

200 is a spring, one end of which is secured to the arm 199, the other end of this spring being secured to the frame of the machine. This spring is for the purpose of pressing the caliper-head against the end of the line when the line is to be calipered, the other end of the line being at this time against the gage-point 165.

814 is a bracket secured to the inside of the left-hand upright 2 and resting upon a rearwardly-extending offset of the upright. In one side of the bracket is mounted the gage-block-bar lock and on the other side the dividing-plate forwarding-arm. In the rear end of the bracket is mounted the mechanism by which the forward movement of the operated dividing-plate is communicated to the space-ejector mechanism. In the top of the bracket and transversely of its forward end is cut a way 815, in which is seated the gage-block bar 203. To the front interior corner of the bracket is secured a slotted extension 816, against which the gage-block bar bears and by which it is supported against the thrust of the plates. The arm 199 carries at its free end the pivot 201. This pivot works in a pivot-block 202, which is guided in a transverse slot cut in the top surface of the gage-block bar 203. This bar 203 is guided in the ways 815 cut in the bracket 814. The end of the bar 203 is bifurcated, and between the legs of the bar pivoted at 204 is the gage-block 205. The gage-block 205 is preferably constructed as follows: 206 is a block through which the pivot 204 extends. Cut in the side edges of this block are ways, and working in these ways are the sides of the yoke 207. Interposed between the yoke and the end of the block 206 are the springs 208. 209 is a plate secured to the ends of the yoke by screws 210 to limit the movement of the yoke on the block 206 under the influence of the springs 208. 211 is a slot cut in the rear side of the block 206 and 212 is a pin carried by the bar 203, passing through the slot 211 to limit the pivotal movement of the gage-block.

In order to hold the gage-block bar 203 securely in position after it has been set by the measuring-head coming in contact with the end of the line under the influence of the spring 200, I provide a lock which will lock the bar 203 in its set position. This lock is preferably constructed as follows. (See Figs. 46 and 47:) 213 is a pin secured in the bracket 814 adjacent to the way 815. On the pin is pivoted a pair of lever-arms 214. The pin 213 is set in the bracket 814 adjacent to the way 815 and passes through two openings 817 818 in the forward edge of the bracket, having a web 226 between the openings, the rear surface of which is part of the way in which is located the gage-block bar. The lever-arms 214 214 pass into the openings 217 218, and through their ends is passed the pin 213. The arms 214 are united at their outer ends by the block 215, which is held in position by means of the screws 216. This block is also provided with the pivotal pin 217. 218 is a block guided in ways in the top surface of the bracket 814 opposite the pivot-pin 213 and is provided on its face with teeth 219, which correspond with grooves cut in the face of the bar 203. 220 is a block which is connected to the block 218 at 221 by a hinge-joint. 222 is a block located between the arms 214 and pivoted at 223 to the arms. The blocks 220 and 222 are connected together by the differential screw 224. 225 is a set-screw passing down through one of the pivots 223 to hold the screw 224 in its adjusted position. By the construction above described a toggle is formed which will operate to lock the bar 203 when the toggle is in the position shown in full lines in Fig. 49 and unlock the bar when it is in the dotted-line position. The web 226 is a support against which the gage-block bar is locked to prevent the gage-block bar from springing when locked by the toggle mechanism. Referring to Fig. 54, 227 is a swivel carried in the upper end of a lever 228, the swivel engaging the pivotal pin 217 on the locking-lever, the lever 228 being pivoted at 229. Also pivoted on the pivot 229 is the second lever 230. This lever at its lower end carries a roller 231, engaging a groove in the cam 232, carried on the line-shaft 74. The lever 228 below the pivot 229 has an opening 233 cut therein, and into the opposite sides of this opening pass the set-screws 234. 235 is a projection carried by the lever 230 and extending into the opening 233 between the set-screws 234. 236 is a spring, one end of which is attached to the lever 228 at 237 and the other end of which is attached to the pin 238, carried by the frame of the machine. By this spring the lever 228 will be thrown over to operate the locking-bar to lock the gage-bar in its position whenever the spring is allowed to move the lever by the cam 232. The adjustable connection between the levers 228 and 230 is for the purpose of adjusting the cam-roller 231 in such relation to the lever 228 that the lock may lock the bar and hold it locked so long as the straight surface of the cam is opposite the roller. 239 is a screw passing through a hole tapped in one of the levers and a slot in the other to clamp the levers together when they are adjusted by the screws 234, the slot allowing such adjustment.

*Dividing-plates and setting mechanism.*—In the machine shown in this application I determine the sized spaces necessary to justify a line by the use of a series of inclined plates, each plate differing from its adjacent plate by the same arbitrarily-selected increment and each plate corresponding to a given number of spaces which there may be in a line in the same manner as in the machine shown in my prior application above referred to. In the drawings herein I have shown a set of plates which are used to determine the sized spaces necessary to justify lines containing from four to eighteen words, inclusive. It has been found in practice that with such a set of plates all lines varying in length from an inch and a half to five inches in length may be justified. It will be noted that a false space must be inserted between each word and also at the end of the line, so that as many false spaces are inserted as there are words. Since there is no permanent space inserted at the end of a line, there is one less permanent space inserted than there are false spaces in the line.

240 designates what I term the "dividing-plate carriage." (See Figs. 65, 66, and 67.) Secured to this carriage by means of the screws 241 are the guide-plates 242. These plates are each provided with a tongue 243 to engage with a groove 244 on each dividing-plate 245.

246 represents set-screws passing through the back of the carriage and abutting against the rear edges of the plates 242. By means of these set-screws and the screws 241 the guide-plates for the dividing-plates may be adjusted to bring the dividing-plates in proper relation to each other.

The sides of the carriage 240 are guided in vertical ways 247, formed in the sides of a bracket 819. The bracket 819 is supported upon two cross-braces 820 and 821, which extend across the center of the machine and are secured at each end to the uprights 2 2. In this bracket are mounted the dividing-plates and the mechanism for setting them. The carriage 240 works up and down in these ways for a purpose to be hereinafter described. The series of guide-plates 242 are mounted one on the top of the other in the carriage 240, and on its rear edge each plate is provided with a series of holes 249, which when the plates are superposed register with one another.

248 represents long screws which are adapted to pass through the holes 249 and clamp the guide-plates 242 in position after they have been adjusted by means of the screws 241 246, as described. When these guide-plates have been clamped together in the manner just described, the tongue and groove on the face of each forms, with the back of the next plate above, a guide in which the dividing-plates are guided.

Secured to the back of the carriage by means of the screws 250 are the racks 251 and 504, which are engaged by the pinions 252, fast to the shaft 253, whereby upon the rotation of the shaft 253 by mechanism to be hereinafter described the carriage carrying the dividing-plates may be raised and lowered to bring the proper plate into position to be pushed forward until it makes contact with the gage-block 205.

Referring to Figs. 54 to 64, fast on the shaft 253 is the ratchet-wheel 254, said ratchet wheel being engaged by the holding-pawl 255, pivoted at 256 on a projection 822 of the bracket 819 and pressed into engagement with the ratchet-wheel by means of the spring 257. Preferably and as shown the teeth of the ratchet-wheel 254 are spaced such a distance apart that the distance between them is equal to the amount which it is necessary to revolve the shaft 253 in raising the plate-carriage the distance from one plate to the next. Consequently it is only necessary to have as many teeth on the ratchet-wheel as there are plates in the plate-carriage, and therefore in the construction shown the teeth only extend about half-way around the wheel. As will be seen, by means of this pawl and ratchet the plates will be held in whatever position they may be set. 258 is a bushing set into the rear wall of the bracket 819, the interior of which forms a journal for the shaft 253 and the exterior of which forms a bearing for a pawl-lever 259. 260 is a ratchet-wheel loose on the shaft 253, and mounted on its hub is a gear 261, said gear being secured to the ratchet by suitable screws 262. 263 is a spacing-washer between the ratchets 260 and 254. 264 is a lug carried by the ratchet 254, and 265 is a similar lug carried by the ratchet 260. When the parts are assembled, the ratchets stand in the relation to each other shown in Fig. 62, so that the lugs may make contact with each other.

To the lever 60, Fig. 6, which, it will be remembered, is oscillated on each depression of the space-key, is connected, by means of the adjustable connecting-link 266, the bell-crank lever 267, pivoted at 268, the other end of this bell-crank lever being connected by the link 269 to the pawl-carrier 259. Pivoted to the pawl-carrier 259 at 270 is the pawl 271, which is adapted to engage the ratchet 260, the pawl being held in engagement with the ratchet by means of the spring 272. As has been heretofore described, the lever 60 is operated by the cam 65 at each depression of the space-key, and by means of the connecting-links and the bell-crank lever, just described, the lever 60 will oscillate the pawl-carrier 259 a sufficient distance to move the ratchet 260 one tooth, the pawl-carrier 259 and the lever 60 being returned to their normal positions by means of the spring 273.

274 is a holding-pawl pivoted at 275 on the projection 822 in the plane of the ratchet 260 and prevents the ratchet 260 from following when the pawl 271 is returned.

276 is a spring adapted to hold the pawl 274 in engagement with the ratchet 260.

Loosely mounted on hubs formed on the adjacent sides of the ratchets 254 and 260 is a cam-ring 277, provided with three cam-surfaces 278, 279, and 280, (see Fig. 58,) and the pawls 255, 271, and 274 are each provided with a pin 281, 282, and 283, respectively, projecting from their side into the path of the cam-ring 277, adapted to stand over the cam-ring 277 in a position to be operated by the cam-surfaces when the ring is oscillated in a manner to be now described.

Mounted on the line-shaft 74 is a cam 284, which is engaged by a roller 285, carried by a lever 286, pivoted at 287 on the cross-brace 821. The upper end of this lever is provided with a pin 288, which engages a yoke or slot 289, formed in the cam-ring 277. By the form of groove in the cam 284 the ring-cam 277 is rocked from its normal position (shown in Figs. 54 and 55) first to the position shown in Fig. 56, when the cam-surface 278 will by contacting with the pin 281 on the pawl 255 raise said pawl out of engagement with the ratchet 254, and then the cam-ring will be oscillated in the other direction and the cam-surfaces 279 and 280 will engage the pins 282 and 283, carried on the pawls 271 and 274 and lift these pawls out of engagement with the stepping-up ratchet 260.

Carried on the shaft 290, which is journaled in the cross-brace 821, is a segmental gear 291, which meshes with the gear 261, secured to the ratchet-wheel 260. Secured on the end of the shaft 290, opposite that which carries the segment, is a collar 292, which is held in position by a set-screw 293, and to this collar is secured one end of a spring 294, the other end of the spring being secured to the brace 821 at 295. By means of this spring the segment 291 is maintained under constant tension, and through the gear 261 the ratchet 260 is returned to the position shown in Fig. 50, when the pawls 271 and 274 are lifted out of engagement with the ratchet.

Since each plate is to be used to determine the sized spaces necessary to justify a line containing a certain number of words, it is necessary to bring the particular plate which corresponds to the number of words in the line which is to be justified into position, and the mechanism which I have just described is for this purpose. In usual practice the number of words in a line does not fall below four, and therefore I have constructed my mechanism to justify lines of not less than four words. I have arranged the dividing-plate of lowest altitude to justify a line of four words; but even for a line of so few words four spaces must be inserted and all of the setting mechanism operated by the space-key must be operated and set. I have therefore arranged my dividing-plate carriage so that it will not respond to the space-inserting mechanism to step up until four spaces have been inserted. The first four motions of the space-key will be idle so far as the plate-carriage is concerned, and not until the fifth space is inserted will the plate-carriage take its first step. This idle motion of the false-space-inserting mechanism is accomplished as follows: Starting first with the plates in what I term their "zero" position, which is the position shown in Fig. 55, and the stepping-up or actuating mechanism in its initial position, which is also shown in Fig. 55, the lug 265, carried by the stepping-up or actuating ratchet 260, will be in this machine four steps behind the lug 264, carried by the ratchet 254. The reason for this is that the first plate of the set is constructed for the purpose of measuring a line containing four words, and in the machine shown it is not possible to justify a line having less than four words; but the actuating-ratchet is moved one tooth each time the space-key is struck, so that when the space-key has been struck four times and four false spaces have been inserted in the line the lug 265 will be in contact with the lug 264, and upon the space-key being again struck both the ratchets will move together, and the second plate of the set will be in position to be actuated, and thereafter upon each actuation of the space-key and consequent stepping up one tooth of the actuating or stepping-up ratchet the holding-ratchet will be moved one tooth, and through the shaft and connections the plate-carriage will be moved a distance sufficient to bring the next plate in position. This operation continues until the line has been completed, whereupon upon the line-key being struck and the line-shaft 74 thrown into operation, as heretofore described, the cam 284 will, through the lever 286, oscillate the ring-cam 277 to the position shown in Fig. 56. This will raise the pawl 255 out of engagement with the ratchet 254 for a purpose to be hereinafter described. The cam 284, through the lever 286, then oscillates the ring-cam in the opposite direction, when the pawl 255 will drop back into engagement with the ratchet 254, and upon the continued oscillation of the ring-cam the cam-surfaces 279 280 will disengage the pawls 271 and 274 from the actuating-ratchet 260. As soon as these pawls are disengaged from the actuating-ratchet the ratchet will be moved back to its initial position (shown in Fig. 55) under the influence of the spring 294, acting through the segment 291 and the gear 261. It will thus be seen that the actuating-ratchet will be returned to its initial position ready to again be stepped forward immediately upon the actuation of the space-key for the next line, while the plates will be left in the position to which they were set, being held by the pawl 255, engaging the ratchet 254. As the plate-carriage was stepped up to correspond with the number of words in the line the lug 264 on the holding-ratchet 254 was carried as many steps beyond the four-word position as there were words greater than four in the line, and when the stepping-up mechanism was recovered and returned to its initial position space-carriage and the lug 264 were left in the position corresponding to the number of words in the line. If now upon the setting of a second line a greater number of false spaces should be inserted than in the preceding line, the actuating-ratchet will be stepped up first the four idle steps and then as many more steps as may be necessary until its lug 265 makes contact with the lug 264 of the holding-ratchet, when upon the further actuation of the space-key the plates will be stepped up in the manner just described. Should, however, the succeeding line contain a less number of false spaces than the line which preceded it, the lug 265 will not be carried far enough to engage the lug 264. The line will then have been set and false spaces inserted; but the dividing-plate corresponding to the number of words will not be in operative position. When the line has been fully set, the operator strikes the line-key and actuates mechanism by which the line-shaft is set in motion. The first motion of the line-shaft turns the cam 284, oscillates the cam-ring 277 to the position shown in Fig. 56, which raises the pawl 255 out of engagement with the holding-ratchet 254, and the plates will be allowed to drop by their own weight until the lug 264 comes in contact with the lug 265, when the proper plate will be in position. By the oscillation of the cam-ring in the other direction the holding-pawl 255 is allowed to again engage the holding-ratchet 254, and the plates will be held in the position to which they have been dropped, and the pawls 271 and 274 are raised by the cam-ring to allow the actuating-ratchet to return to its initial position.

It will be seen that the mechanism just described will reduce the requisite motion of the dividing-plate carriage to a minimum. If the carriage be set for a ten-word line and the next line be a twelve-word line, the plate-carriage will move up but two steps or the distance from the ten-word plate to the twelve-word plate, or if the carriage be set for a ten-word line and the next line contain but eight words the carriage will move from position of the ten-word plate to position of the eight-word plate, or down the distance of two plates, the action being that the motion of the plate-carriage shall be equal to the distance between the plate corresponding to the line last measured and the plate corresponding to the line to be measured and that the actuating means is returned to its initial position without returning the plates to their zero position.

296 is a dash-pot of ordinary construction, whose piston 297 is connected to the plate-carriage to prevent the plates from dropping too heavily, and consequently putting too great a strain on the lugs and ratchets.

The plates shown in this application bear the same relation to each other as the plates shown and described in my prior application above referred to—that is to say, each plate varies from its adjacent plates by the same arbitrarily-selected increment, and the calipering-head, when it measures an unjustified line, determines the difference between the length of that line and standard and sets the block a distance from a fixed point which is in the plane of contact of the plates, the distance between the block and this point being proportional to the difference between the set line and standard. When the block is so set, only the plate corresponding to the number of spaces in the line to be justified is moved forward till it makes contact with the block independently of all the other plates, the other plates at this time remaining stationary, and the amount of forward movement of this plate will determine the sized spaces necessary to bring the set line to standard. As was described in my prior application, should the set line happen to be of exact standard length the plates will all enter between the block and the fixed point an equal distance and register the same sized space.

The rear end of each of the plates 245 is provided with a projection 298, and the projection 298 is cut out on one side to form a notch 299, which is engaged by a rib 823, projecting out from the bracket 819. This rib 823 is cut away at 824 in line with the gage-block, so that the plate which is in position to be moved forward into contact with the gage-block to measure the line will be free to do so while the other plates will be prevented from moving forward by this rib. The other side of the projection 298 is cut away to form notches 300, the notches 300, when the plates are in their normal position, standing vertically one above the other and forming a continuous slot, and projecting into the slot formed by the notches 300 is the arm 301, the arm being in the notch of whatever plate is in position to be forwarded. The arm 301 is guided in ways 302 on the bracket 814, Fig. 68, and to the back of this arm is connected by link 303 the arm 304, which is pivoted on the pivot 305, carried between the brackets 306, extending out from the cross-brace 821. The lever 304 carries at its lower end the cam-roller 307, which is adapted to rest against the face of the cam 308, carried by the line-shaft 74. The lever 304 has projecting therefrom the arm 309, to which a spring 310 is connected, preferably by means of a link 311, the other end of the spring being secured to the bed of the machine. This spring holds the cam-roller 307 on the lower end of the lever 304 in contact with the cam 308. From the shape of the cam 308, which is most clearly shown in Fig. 53, it will be apparent that when the line-shaft 74 is rotated and the low part of the cam 308 brought opposite to the cam-roller on the lever 304 the spring 310 will force the arm 301 forward and carry whatever plates happen to be in front of this arm forward until it makes contact with the block 205, the plate which is in line with the arm and consequently carried forward being, of course, the plate which corresponds to the number of words in the line to be justified. The cams are so timed that the operation of the forwarding-arm takes place immediately after the plates have been set in their final position by the mechanism operated by the cam 284 on the line-shaft, and while the gage-block 205 is locked in position by the locking mechanism heretofore described. The plate is returned by the arm 301 engaging the rear side of the notch 300, when the arm is returned to its normal position by means of the high part of the cam 308.

The dividing-plates, as described, have for their object, as above stated, to divide the shortage of the line into a number of equal parts equal to the numbe rof word-spaces in the line and for this purpose are directly connected to a device for supplying to the line a number of true spaces equal in number to the number of word-spaces in the line and of a size which will justify the line. I have fully set forth in my prior application that if a scale be laid down and a pointer arranged to move along the scale this pointer may be connected to the dividing-plate, and when set by the dividing-plate will indicate on the scale the size of the true space to be used, or if a series of channels be set up at points of graduation of the scale, each containing spaces differing from one another and gradually increasing in thickness in regular order, and a suitable plunger be provided for forcing them out of their channel into the line, to replace false spaces, that the plunger may be set opposite one or another of the channels by the dividing-plates and the proper-sized spaces selected to justify the line. I have also described how such a mechanism is mounted and operated. I have also described what is called the "averaging mechanism," by which two adjacent sizes of spaces may be selected, which together will produce justification and the laws and principles underlying these operations. In the present case I am devoting my attention to improvements of structure, and therefore for simplicity I shall not pursue the same order of description, but as far as possible follow the line as it travels through the machine, first setting, then measuring, then determining the size of true spaces, then moving forward the line, then dividing the line, then determining the true spaces and describing the mechanism by which true spaces are determined and supplied in two sizes, then extracting false spaces, and then delivering the line in the galley.

*Word - shaft mechanism.*—312 is what I term the "word-shaft," because this shaft controls the mechanism for dividing the line into words and the operations subsequent thereto. This shaft extends the length of the machine parallel with the line-shaft and is mounted in suitable bearings in the uprights 2 2 and in the bracket 805 and is located toward the front of the machine. Its general location can be seen by reference to Figs. 33 and 82, Fig. 33 being an elevation of one end of the machine, and Fig. 82 being a plan of the other end. The right-hand end of the word-shaft (shown in Fig. 33) is provided with a clutch, which, as far as its detail of construction is concerned, is identical with the clutch for the line-shaft 74, which has been heretofore fully described. Briefly referring to Figs. 70 and 71, 313 is a gear provided with a hub for spacing the gear from the upright 2 and loose on the shaft 312, which gear has secured to it the toothed wheel 314. 315 is the disk fast to the shaft and carries the radial bolt 317. 318 is the spring for forcing the bolt into engagement with the teeth of the toothed wheel and connecting the two parts of the clutch together. 319 is the lever which carries the clutch-block 320. All these parts are identical with the corresponding parts of the line-shaft clutch, which have been heretofore specifically described. As, however, the word-shaft makes a plurality of revolutions for the justification of a single line, the number of which depends upon the number of words in the line under justification, I do not provide this clutch with the mechanism shown in connection with the line-clutch for throwing the clutch out after a single revolution, but instead I provide means for throwing the clutch out after it has made the desired number of revolutions.

321 is a spring, one end of which is secured to the upright 2 and the other end to the lever 319. This spring tends to hold the face of the lever against the side of the disk 315, so that the cam-block will raise the bolt out of engagement with the toothed wheel and unlock the clutch. The lever 319 is pivoted at 322 between the arms 323, projecting from the bracket 808, the lever being provided with an extension 324 beyond the pivot, the extension being best shown in dotted lines in Fig. 70.
325 is a lever pivoted to a suitable pivot 326, secured to the upright 2, the pivot 326 being at right angles to the pivot 322. The lever 325 extends to the rear of the machine and carries on its end a cam-roller 327, which stands in the path of the edge of the cam 328 on the line-shaft 74. The lever 325 is supported and its cam-roller 327 pressed against the cam 328 by the spring 335, which is seated in the socket in the bracket 808 on screw 337. The upper end of the spring presses a plunger 336 against the under side of the lever. The lever 325 is in the form of a bell-crank lever, the other arm 329 being provided with a set-screw which is adapted to engage the arm 324 of the lever 319, whereby when the end of the lever 325 is depressed by the cam the lever will, through the arm 329, swing the lever 319, carrying the block 320, so that the block will be disengaged from the bolt 317 and allow the bolt to drop down into the teeth of the toothed wheel 314, and so lock the two parts of the clutch together. Referring to Figs. 34, 126, and 127, 330 is a latch-lever provided on its end with a hook 332. The lever 330 projects from and is fast to a hub 825, which is pivoted in brackets 826, secured to the front edge of the right-hand upright 2. To the same hub are secured the arms 680 and 681, which will be hereinafter described. The hook 332 is adapted to engage a projecting pin 333 on the lever 319 and hold it in its outer position. The hook 332 of the latch is held in engagement with the pin by means of the spring 334, and the latch being swung on its pivot 331 to release the lever by means which will be hereinafter described.

The word-shaft is driven in the following manner: Meshing with the gear 75 on the main driving-shaft 66 is an intermediate 338, which meshes with the gear 339, carried on the stub-shaft 340. Connected to the gear 339 is the gear 341, which meshes with the gear 313, which is the loose member of the clutch, and through this train of gearing the word-shaft 312 is driven from the driving-shaft.

*Line forwarding and dividing mechanism.*—After the line has been measured by the mechanism which I have described and the caliper-head raised the line is taken by mechanism to be hereinafter described and carried on through the raceway to the word-separating mechanism, where the line is divided up into words, then the words carried forward, the proper-sized spaces inserted between the words, the false spaces removed, and the justified line assembled over the galley into which it is afterward depressed.

The type which I use in connection with my machine are provided with one or more notches in their side, and in the form of type shown in connection with this application the type are provided with two notches, as is clearly seen in Figs. 36 and 77. The false spaces which separate the words are not provided with these nicks. The purpose of nicking the type and not nicking the false spaces is to enable the machine to separate the line into words by providing in the raceway what I term "wards" which will allow the type because of the nicks to pass under the same, but will stop the spaces which have no nicks when the spaces strike against the wards. As far as this feature is concerned it is broadly the same as that shown in my prior application above referred to.

343 is a hook carried on an arm 344, and this hook is adapted to engage the back of the line when the line is in the position shown in Fig. 36 and force the same along through the raceway until the first false space is stopped by the wards. The arm 344 is pivoted at 345 to a rack-bar 346, which is adapted to reciprocate in a way cut in the bed of the raceway. 347 is a pin projecting downward from the lever 344 into the cam-slot 348 for the purpose of throwing the hook out of the raceway when the hook is moved by the rack 346 to the position shown in Fig. 36, which position it assumes just before the line is forced into the raceway. When the rack 346 moves in the opposite direction, the pin 347 traveling in the cam-groove 348 will draw the arm 344 into a position parallel to the rack and throw the hook 343 into the raceway behind the line.

349 is a projection from the side of the stop 165, having a cam-face upon its upper surface, which projects into the way cut in the face of the raceway-bed 157 for the rack 346. The rack 346 has on its right-hand end a beveled face 350, which by engagement with the cam-face of the projection 349 will depress the stop 165 while the hook 343 is over it, moving either backward or forward, so that the hook may clear the latch, the angular space 351 allowing the latch to rise when the hook is at its extreme position.

Referring to Fig. 34, 352 is a cam carried by the line-shaft 74, the slot in this cam being engaged by a roller 353 on a lever 354, pivoted at 355 to the bracket 808, said lever at its other end being connected to the rack 356 by means of the connecting-link 357. 358 represents guides secured to the frame of the machine, in which the rack 356 is guided. The rack 356 engages a gear 368. 360 is a stub-shaft secured in the face of the raceway-bed 157 and projecting therefrom, on which there is loosely mounted the sleeve 361. Mounted on the sleeve 361 is a gear 368, which meshes with the rack 346 and is provided on its side with a pin 387, which is pressed forward by a spring 389 and projects into an annular slot cut in the adjacent face of the ring-gear 359. 367 is a flanged disk, on the periphery of which is mounted the ring-gear 359. The gear 368 and the flanged disk 367 are both keyed to the sleeve 361 by means of the key 369. The ring-gear 359 has mounted on its exterior face a stud 384, on which is pivoted a pawl 385, and is pressed down on its ratchet by a spring 386. The rear end of the stud 384 projects through the ring-gear into the annular groove 388 and forms a stop for the pin 387, so that either of these gears may make one revolution without moving the other. 365 is a ratchet-wheel loosely journaled on the sleeve 361 next to the ring-gear 359, but separated from it by a friction-washer 370. The width of the ratchet-wheel 365 must be slightly more than twice the projecting length of the stud 384, so as to permit that stud to pass another stud of similar length mounted on another gear opposite to it. 362 is a second flanged disk splined upon the sleeve 361 by means of the feather 363 next to the ratchet 365, from which it is separated by a friction-washer 366. On the periphery of the flanged disk 366 is mounted a ring-gear 371, which carries, projecting from its inner face, a stud 381, on which is pivoted a pawl 382, which stands over and engages the ratchet-wheel 365 and is pressed on the ratchet by the spring 383. 364 is a circular collar set on the face of the flanged disk 362 and forms one of the flanges by which the ring-gear 371 is held in place. 379 is a circular cup-shaped spring encircling the sleeve 361 and pressed against the collar 364 by the nut 380, which is threaded on the sleeve. 374 is a bracket connected to the left-hand upright 2, in the lower end of which is secured the stud 373, on which is loosely journaled the gear 372, which meshes with the ring-gear 371. This bracket also forms the guide for the end of the rack 356, which meshes with the gear 359. 376 is a counter-shaft journaled in a bracket 827, projecting from the left-hand side of the left-hand upright 2, on the front end of which is fast the pinion 375, which meshes with the gear 372, and on the other end a beveled gear 377. It also carries a cam 697 intermediate of its ends. The beveled gear 377 meshes with and is driven by a similar beveled gear 378 on the word-shaft 312. 823 is a cover set on the outer ends of the shafts 360 and 373 and by which they are to some extent supported, the cover being suitably secured to the face of the raceway-bed. 715 is a roller which is located on the front of the line-raceway in position to come in contact with the face of the line of type just before the same reaches the wards to force the feet of the type against the back of the raceway, so that the nicks in the type will be sure to register and pass under the wards.

The operation of the above-described mechanism, which is designed to move the hook to feed the line up to the wards and onto what I term the "bridge," which will be hereinafter described, is as follows: When the line-shaft is started by the depression of the line-key and consequent tripping of the line-clutch in the manner heretofore described, the cam 352, through the lever 354 and connections, will first force the rack 356 forward, rotating the gear 359 in the direction of the arrow shown in Fig. 39, the rack 346 carrying the hook 343 being at the beginning of this operation in the position shown in Fig. 39, and the pin 387 on the gear 368 will be in a position just in front of the pawl-pivot 384, so that the pivot will immediately engage the pin 387 and through this pin rotate the gear 368 to drive the rack 346, carrying the hook 343, back to the position shown in Fig. 36, the beveled face 350 on the end of the rack 346 operating through the cam 349 to depress the stop 165 while the hook is passing over it. The cam-slot 348 operates through the pin 347 to swing the arm 344, carrying the hook 343, into the position shown in Fig. 36. When the hook has been moved to this position, there is a dwell in the cam 352 to allow the hook to remain in this position while the line is transferred from the stick into the raceway and the calipering-head moved up against the line, measuring the same between the head and the stop 165, as hereinbefore described. After this is accomplished the cam 352, through the lever connections, returns the rack 356. This drives the gear 359 in a direction opposite that indicated by the arrow in Fig. 39, and the pawl 385 will engage the teeth of the ratchet 365 and drive this ratchet. This ratchet will, through the friction-washers 366 and 370, drive the flange-disks 362 and 367, which, being connected to the sleeve 361 by the feather 363 and the key 369, will drive this sleeve, together with the gear 368, and through this gear 368 the rack 346, carrying the hook, will be returned. The cam-slot 348 will operate to swing the hook in behind the line, and the line will then be carried along until the first false space strikes against the wards, whereupon the rack-bar 346, carrying the hook, will stop, which will cause the gear 368 to stop and through the key 369 will stop the rotation of the sleeve 361 and the flange-disk 367. The ratchet-wheel 365, however, continues its rotation, being driven by the rack 356 through the ring-gear 359, which is loose on the flanged disk 367, and the pawl 385, this being made possible by the frictional connection between the ratchet 365 and the flanged disks 362 and 367. As soon as the false space which has arrested the movement of the line by coming in contact with the wards has been removed by removing the word preceding it and the false space with it the line is free to be again forced forward by the hook until the next false space comes in contact with the wards. Then before any further movement of the line is possible the word in front of the second false space, together with that false space, must be removed from the front of the line, and this operation must be continued until the line has been entirely divided into words. The mechanism for so removing the words from the front of the line will be hereinafter fully described.

Since the line-shaft makes but a single revolution and then comes to rest and because of the frictional connection just described, the rack 356 may return to its normal position before there has been sufficient time to divide the line into words. It is therefore necessary to provide an additional driving means for the ratchet 365 in order that the gear 368 may complete its revolution and continue moving the line ahead and bringing the false spaces in the line successively in contact with the wards. The word-shaft 312 is started by the cam on the line-shaft tripping the word-clutch in the manner previously described before the completion of the rotation of the line-shaft, and therefore the word-shaft through the train of gears 378, 377, 375, and 372 will start the gear 371 rotating before the gear 365 has ceased to rotate under the driving influence of the rack 356. It will be remembered that the pawl 382, which is carried by the gear 371, engages the ratchet-wheel 356 and that therefore the gear 371 will, through the pawl 382, continue to drive the ratchet-wheel 365 as long as the word-shaft 312 continues to rotate, which is, as a matter of fact, until after the entire line is justified, and therefore the ratchet 365, which is the common element in the two driving mechanisms, will, through the friction connection just described, continue to carry the line through the raceway until the end of the line has passed the wards.

*Bridge mechanism.*—As I have before stated, the line is carried by the line-carrier or hook under the wards until a false space strikes the wards in order that the line may be divided into words, and I will next describe this dividing mechanism, part of which I term a "bridge" because it is located between the line raceway and word-raceway, and which coöperates with a word-depressing mechanism to separate the word from the line.

Referring to Figs. 40, 41, 42, 77, 78, and 79, 390 is a block which is inserted in an opening cut in the bed 157 of the raceway, and this block is held in position by means of the screws 391. This block as a matter of fact forms part of the raceway, and the object of the same is to allow the bridge 392 to work in an opening 393, cut in the bottom of the raceway for this purpose. The block 390 carries a shoulder 394 to prevent the top of the bridge from protruding above the level of the raceway. The lower right-hand corner of the bridge 392 is provided with a shoulder 395, which is adapted to engage with the shoulder 394 for this purpose. The bridge is supported upon a tubular post 396, which extends down through a hole cut in the raceway-bed, and the bottom of this hole is closed by a screw 397. In this tubular post I place a spring 398, one end of said spring being in the tubular post and the other end resting against the screw 397, whereby the bridge is held in the position shown, for instance, in Fig. 40. In a slot cut longitudinally through the center of the bridge I place a frictional plate 399, which is held up by springs 400, to hold the type firmly between the surface of the bridge and the line-depressor and prevent them from falling down while they are on the bridge. 401 is a bar sliding in ways formed in a bracket 402, supported on and depending behind the raceway. The bar 401 is provided with a right-angular T-shaped projection 403, (see Fig. 36,) which forms the word-depressor and extends over the bridge 392, as most clearly shown in Figs. 77 and 79, the T-head of the word-depressor being of the same shape and size as the bridge. To limit the upward movement of the word-depressor, I provide the bracket 402 with a screw 404, and to limit the downward movement of the depressor the bar 401 is provided with a projecting pin 405, which projects into a slot 406, formed in the side of the bracket 402, the slot being provided with a set-screw 407, against the end of which the pin 405 abuts. 342 represents the wards. They consist of small pendent webs cut on the surface of blocks which are set into the under face of the bar 158, which forms the top of the raceway, and they are located on each side of the word-depressor a distance from its forward end equal to the width of a false space. These wards are best shown in Fig. 82. 408 is a cam carried on the word-shaft 312. This cam engages a roller 409, carried by an arm 410, which is pivoted on a stud 411, projecting from the left-hand side of the left-hand upright 2. 412 is a lever pivoted on the stud 411, one end of which is provided with a head 413, adapted to engage a slot 414, cut in the end of the word-depressor bar 401, the end of the lever opposite the head 413 being engaged by a spring 415, this spring tending, through the lever 412, to depress the line-depressor 403. The lever 412 is provided on the same side of the pivot as the head 413 with a boss 416, which is bored out and in which is located a hollow pin 417, in which is seated a spring 418, stronger than the spring 415, one end of the spring 418 being in and pressing against the hollow pin 417 and the other end abutting against the screw 419, which closes the hole in the boss. 420 is a lug on the side of the arm 410, against which the pin 417 is pressed. 421 is a second lug carried by the arm 410, which stands over a set-screw 422, passing through the boss 416 of the lever 412. It will be seen that at every rotation of the word-shaft 312 when the low portion of the cam 408 is reached the spring 415 will be allowed to move the word-depressor from the position shown in Fig. 77 to that shown in Fig. 79 and that when the high portion of the cam comes in contact with the roller 409 it will raise the word-depressor against the tension of the spring 415 by the lug 420 acting on the pin 417, it being remembered that the spring 418 which holds the pin 417 is stronger than the spring 415. The word-depressor 403 will rise until it strikes the adjusting-screw 404, when it will stop, the spring 418 being compressed by any further rise of the roller 409 on the cam 408, and thus the alinement of the under side of the word-depressor with the top of the raceway insured. The lug 421 and the set-screw 422 are to limit the amount of movement which can be imparted to the lever 410 by the spring 418.

The wards 342 are located a distance from the end of the line-depressor equal to the width of one of the false spaces, and the type are provided with nicks, so that the type may pass under the wards, while the false spaces are unnicked and will therefore be stopped by the wards. It will be seen, therefore, that a word of type, together with a false space, will be forced onto the bridge, but the succeeding words will be stopped by the wards engaging the unnicked false space and remain on the raceway. When during the rotation of the word-shaft 312 the low portion of the cam 408 passes under the roller 409 on the lever 410, the word-depressor 403 will be depressed by the spring 415, and the word, together with the false space behind the word, will be depressed into the position shown in Fig. 42, the spring 398 yielding to allow the bridge to go down. The word is then moved off from the bridge into the word-raceway 423 by the word-forcer 424 to be presently described. After the line has been moved off from the bridge by the word-forcer 424 the bridge returns to its normal position, and the line-forcer 343 forces the next word, with its false space, on to the bridge in position to be lowered at the next operation of the depressor. It will be seen, therefore, that by this bridge and line-depressor the line is divided into words.

*Word-forcer.*—The word-forcer 424 is a U-shaped piece sliding in ways 425, cut in the raceway, the sides of the forcer projecting up on each side of the lower portion of the bridge in such position that they will engage behind a word when the same is depressed by the bridge, as is most clearly shown in Figs. 40 and 42. 426 is a pendent lug on the bottom of the word-forcer 424, to which is pivoted the link 427, the other end of said link being connected to one end of the lever 428, the other end of said lever being pivoted to a stud 429, mounted in a bracket secured to the frame of the machine. 430 is a second stud mounted in the same bracket as the stud 429. Pivoted to this stud 430 is the lever 431, carrying at one end the cam-roller 432, engaging a cam 433, carried on the word-shaft 312, the other end of the lever 431 being connected by the adjustable link 434 to the lever 428. By this construction it will be seen that the word-forcer will be reciprocated once for each revolution of the word-shaft 312 by the cam 433, and consequently once for each depression of the bridge, and will carry a word in front of the space-ejecting mechanism now to be described and into the galley-receiving channel over the galley.

435 is a latch pivoted at 436 in the bed of the word-raceway near its end and held up into the path of the type by the spring 437. This latch is to prevent the false space at the back end of the word from being drawn back by the word-forcer when the same is returned.

*True-space-inserting mechanism.*—In my present machine, as in the machine shown in my prior application above referred to, the line is justified by using ten different sizes of spaces, each space varying from the next sized space by .01 of an inch, the spaces being arranged in the case with the smallest size of space at one side of the case and the largest size of space at the other, the intervening sizes of spaces being arranged in the order of their size from the smallest to the largest. As I have fully set forth in my prior application, with these ten sizes of spaces it is possible to justify a line to within .005 of standard—that is to say, the total variation may be .01. As this variation is within the limits of elasticity of a line and is very much closer than ordinary hand justification, it is sufficiently accurate for all practical purposes. This closeness of justification is brought about by using two adjacent sizes of spaces to justify a given line when necessary, the mechanism inserting a proper number of one sized space and then stepping up and inserting the next larger-sized space to fill the rest of the line, this combination effecting the close justification in the manner fully set out in my prior application. Of course if it so happens that the difference between the length of the set line and standard is such that it will be justified within .005 of standard by the use of only one sized space the machine will insert this one sized space for all the spaces in the line.

The different-sized spaces are all held each in their proper channel on their sides in the space-case 438, which may be of any desired construction, and it is necessary, therefore, to turn these spaces on their axes through an angle of ninety degrees, so that they will rest on their edges, as do the type, before they can be inserted in the line. For accomplishing this I curve the lower ends of the channels of the case, as shown in Fig. 101, the curved ends of the channels being marked 439, and provide a straightening-block, as shown in Figs. 104 and 109, which will be hereinafter described. Preferably and as shown the curved lower ends of the space-channels are formed in a separate block 440, and on top of this block the space-case proper rests; a projection 441, carried by the space-case, engaging a notch 442, cut in the block at its upper end, the case is supported by the projection 829, which extends behind it from the side of the frame 2. The lower ends of these curved channels are cut in a manner most clearly shown in the sectional part of Fig. 101, in which it will be seen that at the bottom of the curved channel there is a projection having an inclined shoulder 443, against which the bottom space rests in the position there shown when the forcers 444 are in their retracted position. These forcers 444 eject the space from the space-channel into the word-raceway in the path of the word being carried forward by the word-forcer. The ends of these forcers are guided in a channel 445, cut in the projection just under the inclined shoulders 443. The forcers are each provided with a shoulder 446, which is a distance back from the tip of the forcer slightly less than the length of a space, and this shoulder is of a width equal to the width of the space which the forcer ejects. By this construction it will be seen that when the forcers move forward to eject a space the shoulder of the forcer will come in contact with the bottom space, which is resting against the inclined shoulder in the channel, and will move the space forward into the raceway. The portion of the forcer beyond the shoulder supports the spaces remaining in the channel, as shown in the extreme right-hand channel of Fig. 101 and in Fig. 103, until the forcer again returns to its normal position. As the spaces are carried out of their channel by the forcer they are standing on an edge, and it is necessary to straighten them up before they are moved into the raceway. For this purpose I mount in front of the channels a block 447, which has cut therein a series of channels 448, parallel to the axis of the space and of a size to form a way 449 for the forcer and the space. While the space is passing through this channel it is turned from the position shown in Fig. 105 to the position shown in Fig. 106 by contact of one of the forward corners of the space with a cam-face 451, formed on one side of the slot 450. The channel must therefore be of such a shape as to accommodate the space in the two positions which it occupies while in the channel. The shape of this channel is best shown in Figs. 108 and 109, in which a space is shown in its two positions. When the spaces are forced into the raceway, they pass under the friction-bars 163, and by these bars they are pressed onto the bed and prevented from falling over their sides.

In Figs. 103 to 107, inclusive, I have shown diagrammatically the different positions of the space while being ejected. In Fig. 103 I show the position of the space before it is moved from the space-channel. Fig. 104 shows the space out of the space-channel and in the position it occupies at the time of its entrance into the channel of the block 447. Fig. 105 shows the space as it begins to emerge from the channel of the block 447 and makes contact with the cam-surface 451. Fig. 106 shows the space entirely straightened by means of the cam-face 451, and Fig. 107 shows the space in the raceway held by the friction-plates 163 and the forcer partly returned. Figs. 108 and 109 show sections through the channeled block, Fig. 108 showing the space as just entering the block, while Fig. 109 shows the space as it leaves the block.

829 is a bracket mounted upon the bed 1 of the machine between the bracket 805 and the left-hand upright 2. Upon the brackets 805 and 829 is supported a table 830, on which is mounted the space-ejector and galley mechanism. Secured to the forcers 444 by a projection 452, formed on the forcers, are the parts 453, which have a slot cut therein corresponding to and engaging the projection 452. This part 453 is merely an extension of the forcer and as a matter of fact forms a part of the forcer. Projecting from the upper surface of the part 453 of each of the forcers is a lug 454, which lug is engaged by a suitable mechanism, to be hereinafter described, to actuate the forcers. The forcers 444 slide in a series of parallel ways 455, cut in the surface of the table 830.

456 is a bed secured to the table 830 over the ways 455, the bed having a series of ways 831 cut in its under surface, which are wider than the ways 455. Through the bed 456 are cut a series of parallel slots 832, which are parallel to and extend into the ways 831. The forcers 444 are mounted and slide in the ways 455, and the other part of the forcers, which is wider than the part 444, is mounted and slides in the ways 831. The lugs 454 on the upper surface of the parts 453 project through and are guided by the slots 832.

469 represents a series of stationary blades with knife-edges on their rear ends, one of which is set into each of the parallel ribs formed between the slots 832 of the bed 456. The upper surfaces of these stationary knife-edges stand below the level of the tops of the vertically-projecting lugs 454 on the rear ends of the forcers. These blades are located equal distances apart, and their knife-edges form the boundaries of the zones of the space-magazines.

Immediately behind the bed 456 and parallel to the raceway are two ways 457 and 833, the way 833 being in the bottom of and smaller than the way 457. Sliding in the way 457 is the ejector-carriage 458.

459 represents ways formed in the carriage 458 at right angles to the ways 457, in which slides a bar 460. Pivoted to the bar 460 by means of the pivot 461 is the ejector 462, the amount of pivotal movement of this ejector on the bar 460 being limited by means of the screw 463 passing through an enlarged hole 464 in the bar 460 into a tapped hole in the ejector 462.

465 is a head, formed on the free end of the ejector, adapted to engage with the projections 454 of the forcers to carry the same forward to eject a space, and 466 is a downwardly-projecting nose carried by the bar 460 to return the forcers after the space has been ejected.

467 is a spring tending to hold the ejector against the side of a groove cut in the bar 460 in the position shown in Fig. 88.

Carried by the head 465 is a depending knife-edge 468. (Shown in the dotted lines in Figs. 88 and 89.) The knife-edge 468 is located with its straight side upon the center line of the ejector and its beveled side on the side opposite the spring 467, with its beveled face facing the beveled faces of the stationary knife-edges 469, the knife-edges 468 and 469 being opposite each other. When, therefore, the bar 460 is moved forward, carrying the ejector 462 with it, if the beveled face of the knife-edge 468 comes in contact with the beveled face of one of the knife-edges 469 it will be pushed to one side, as shown in Fig. 89, and the ejector will be brought into contact with the forcer which is on the side toward which the ejector is moved.

Sliding in the ways 833 directly under the ways 457, which guide the ejector-carriage 458, is a rack-bar 470. (See Figs. 86 and 87.) This rack-bar is provided with a notch 471, which is adapted to be engaged by the spring-pressed pin 472, carried by the carriage. Meshing with the teeth of the rack-bar 470 is the gear 473, which is mounted upon a suitable bracket on the frame of the machine, and meshing with this gear is a second gear 474, carried by the vertical shaft 475, which carries at its upper end a gear 476, (see Fig. 45,) meshing with a rack 477, carried by the plate-forwarding arm 301. By means of this connection it will be seen that the rack 470 is given a movement proportional to the amount of movement of the plate-forwarding arm 301, the amount of movement of the arm 301 being controlled by the distance that the plate goes forward before it comes in contact with the gage-block 205, and that, therefore, for the reasons which are fully set forth in my prior application above referred to the space-ejector, which is carried by the carriage, will be set in proper relation to the stationary blades on the table, the pin 472 at this time being in engagement with the notch 471. When the carriage has been so set, the pin 472 is lifted out of engagement with the notch 471, so that upon the return of the rack by the return of the plate-forwarding arm the ejector-carriage will be left in its set position. For the purpose of lifting the pin out of engagement with the notch I provide the pin with a head 478, which is engaged by a plate 479, which is of sufficient length to engage the pin at any position of the carriage. The plate 479 is pivoted on the pin 480. Projecting rearwardly from the hub of the plate 479 is the arm 481, carrying a cam-roller 482, adapted to contact with the cam 483, carried by the line-shaft 74. This cam is so timed that the plate 479 will raise the pin while the plate-forwarding arm 301 is in its forward position and leave the carriage free to to be moved independently of the mechanism by which it was given its primary setting. Passing through the center of the carriage 458 is a shaft 545, mounted in bearings 834 in the brackets 829 and 830, and is provided with a longitudinal groove which engages a feather in a pinion 546. The pinion 546 is retained in a transverse slot in the carriage 458 and moves with it and engages the rack 547 of the space-ejector. It will thus be seen that the carriage may move back and forth in its ways without disengaging the mechanism by which the spaces are ejected.

484 is a lever pivoted at 485 to the rear end of the table 830, said lever carrying a cam-roller 486, engaging the cam 487, carried by the line-shaft 74.

488 is an arm pivoted to the lever 484 at 489, and 490 is a spring device adapted to hold the arm in the position shown in Fig. 82.

491 is a pin carried by the arm 488 adapted to make contact with the projections 492 to limit the movement of the arm on the lever.

493 is a finger carried by the arm 488 and adapted to engage the ejector-carriage when the lever is actuated by the cam 487 to return the carriage to the position shown in Fig. 82, from which position it is set by the movement of the rack 470 in a manner hereinbefore described. The cam 487 is so timed that it will operate to return the carriage to the position shown in Fig. 82 before the plate-forwarding arm has started on its forward movement.

The object of providing the lever 484 with the arm and the yielding connection is for the purpose of preventing any breaking of parts should the carriage for any reason meet with abnormal resistance.

*Averaging-cam mechanism.*—In my prior application above referred to I have stated a mathematical law which I have discovered which governs the selection of two sizes of spaces differing from one another by .01 of an inch or any other arbitrary increment if two sizes be necessary and the choice of the requisite number of each of these two sizes to make up the requisite aggregate thickness of space to justify a line. The mechanism for carrying out this mathematical law I term the "averaging" mechanism, which is designed for the purpose of causing the space-ejector carriage to step forward from its place of primary setting a distance equal to the width of a space-magazine zone in a number of steps equal to the number of spaces to be inserted in the line and one additional step, the purpose of which will be hereinafter described. The step-by-step motion of the space-ejector carriage is always from the position of primary setting in a direction toward the next larger sized space, and this as the machine is arranged is from left to right.

As in my prior application, I employ a series of cams mounted so as to have a horizontal transverse motion under the end of a lever, said cams differing in altitude from one another by a calculated amount, and the particular cam which happens to be under the lever will determine the throw of the lever and through intervening mechanism the length of the steps of the carriage. Now as the shaft carrying the averaging-cams is revolved by its connection with the word-shaft a number of times equal to the number of words in the line the ejector-carriage will make a number of steps equal to the number of words in the line. It is therefore a matter of measurement to provide a cam which will cause the ejector-carriage to move a distance which multiplied by the number of spaces in the line will equal the exact width of a zone of a space-magazine. Thus it will be seen that the altitude of the cam determines the length of the carriage steps, and the number of revolutions of the cam will determine the distance the carriage is to move. It is merely, therefore, a matter of measurement to determine a series of cams which if brought successively under the lever will cause the carriage to move an equal amount for a given number of revolutions—that is to say, the four-space cam must cause the carriage to make four steps, which in the aggregate will equal the width of the magazine zone. The five-space cam must cause the carriage to take five steps, which in the aggregate will equal the width of the magazine zone, the carriage traveling the same distance in each of these cases, but in a varying number of steps. By the mathematical law above referred to and by the peculiar relations which the plates bear to each other and to the positions of the space zones of the magazines the ejector-carriage when set by the plate in proper position in front of a zone will when stepped forward by the averaging-cams in the manner above described pass, if two-sized spaces should be necessary, from one space zone into the next and cause such a combination of spaces to be delivered as will justify the line. In my machine for convenience these averaging-cams are carried by and driven from a shaft which is driven from the word-shaft and makes as many revolutions as the word-shaft, which is as many revolutions as there are words in the line; but there is one less space inserted than there are words in the line. It therefore becomes necessary to set the space-ejector carriage one step beyond its correct position for the first space, and I have provided means for preventing a space from being ejected when the ejector-carriage steps from its set position to the correct position, so that while the ejector-carriage makes as many steps as there are words in the line one less space is inserted in the line than there are words, and the space-carriage is always stepped a distance equal to the width of a zone of the space-magazine in one less than its total number of steps or in a number of steps equal to the number of spaces to be inserted in the line.

The mechanism which I have devised for accomplishing the results above stated is as follows: Referring to Figs. 84, 85, 92, and 93, the averaging-cams 494 are cut upon a hub, each cam being constructed to step the carriage the width of a space zone in a different number of steps, and in the machine which I have illustrated there are a series of fifteen cams, which are arranged to step the carriage the width of a zone in from four to eighteen steps. On reference particularly to Figs. 84 and 92 it will be noted that the individual cams forming the series do not differ from each other by the same amount, but by varying amounts, the difference being the smallest between the cams having the least throw and the greatest between the cams having the greater throw, this difference being necessary in order that each of the cams shall throw the space-carriage the width of a magazine zone in a number of steps corresponding to the particular cam. These averaging-cams are mounted on a shaft 495, supported in suitable bearings 835 on the bed of the machine. The shaft has a longitudinal groove in which fits a feather on the interior of the hub of the averaging-cams, so that these cams may be moved longitudinally of the shaft, but rotate with the shaft. The averaging-cams are held between two collars 496, encircling the shaft 495, located on each side of the hub of the averaging-cams, to a carriage 497. The collars are connected by arms by which the cams may be moved longitudinally on the shaft. Secured to the bottom of the carriage 497 by the screws 498 is the rack 499, and meshing with this rack is a gear 500, carried on a shaft 501. The other end of the shaft 501 is supported in a bracket 502, secured to the base of the machine, and this end of the shaft carries a gear 503, meshing with a rack carried on a bar 504, the other end of the bar 504 being secured to the plate-carriage 240, (shown in Figs. 53, 54, and 65,) the rack-bar 504 which moves the averaging-cams being, in fact, the same rack-bar and one of the racks by which the dividing-plate carriage is raised and lowered, so that the averaging-cam carriage is positively connected to the plate-carriage. These connections are so proportioned that as the plate-carriage is stepped up the distance of a plate the averaging-cams are moved the distance between adjacent cams. It will be seen, therefore, that whatever plate is in position to be moved forward by the plate-forwarding arm the cam corresponding to that plate will be in position to actuate the mechanism for stepping the carriage, which I will now describe. 505 is a lever which is operated by the averaging-cams, and this lever carries a cam-roller 506, upon which the cams operate. The lever 505 is secured to a collar which is loosely mounted on a hub 507. The hub 507 is mounted on a shaft 508, the ends of which are supported in brackets 509, which are pendent from the under side of the table 830. The hub 507 carries on its forward end a disk 510. To the front face of the disk are pivoted a series of pawls 521, pivoted at 522 and pressed toward the center of the disk by springs 523. 511 represents friction-washers, of leather or other suitable material, interposed between one side of the collar of the lever 505 and the disk 510. Situated on the opposite side of the collar of the lever 505 from that which engages the disk 510 is the disk 512, which is splined on the hub 507 by means of the feather 513 engaging a slot 514, cut in the hub 507. 515 is a nut on the hub 507, and between this nut and the disk 512 there is interposed a spring 516, the tension of which may be regulated by the nut. 517 represents frictional washers, of leather or other suitable material, interposed between the disk 512 and the collar of the lever 505. The object of the above construction is to cause the lever 505 to drive the disk 510 through the friction of the washers 511 and 517 upon the adjacent faces of the disks 510 and 512 and the collar of the lever 505, the amount of this friction being determined by the position of the nut 515, which compresses the spring 516 against the disk 512. 518 is a disk secured to the shaft 508 by means of the pin 519, and this disk has secured to its inner face the ratchet-ring 520, the ratchet standing between the disks 518 and 510, as clearly indicated in Fig. 94, and below the pawls 521. In the machine shown five of these pawls 521 are used, the pawls being placed around the ratchet and in such relation to the teeth that when one of the pawls is in engagement with a tooth of the ratchet the other pawls will all be resting on the inclined surfaces of teeth below them, the one next to the engaging pawl one-fifth, the next two-fifths, the next three-fifths, the next four-fifths, of the length of the inclined surface from the tooth in front of it, whereby the same result is produced as if in the case illustrated in the drawings a ratchet having five times as many teeth and only a single pawl were used. 524 is a gear secured to the end of the shaft 508, and meshing with this gear is a gear 525, mounted on a stud set in the forward bracket 509. The gear 525 also meshes with a rack 526, secured to the bottom of the ejector-carriage 458. Mounted in a bracket 527, secured to the base of the machine, is a shaft 528, and secured to one end of this shaft is a lever 529. Carried by the free end of this lever is a cam-roller 530, said cam-roller running on a cam 531, carried by the word-shaft 312. 532 is a spring one end of which is secured to the lever 529 and the other end to the base of the machine to hold the roller 530 in engagement with the cam and tending to move the lever in a direction opposite to that in which it is operated by the cam. 533 is a collar fast to the other end of the shaft 528 from that which carries the lever 529, and loosely mounted on the shaft between this collar and the end of the bracket 527 is a locking-cam 534. 535 is a pin projecting from the cam into an opening 536 in the collar in position to be engaged by a pair of oppositely-disposed pair of set-screws 537, passing through the collar into the opening 536. 538 is a screw passing through an elongated slot in the collar 533 into a tapped hole in the cam 534. By this construction it will be seen that the position of the cam around the shaft 528 may be adjusted by means of the set-screws 537 and when so adjusted may be held by the screw 538. When the lever 529 is allowed to move downward by the cam 531 under the tension of the spring 532, the cam 534 will be thrown in contact with the periphery of the disk 510 and lock the same against rotation, and it will remain locked until the word-shaft has made nearly a complete revolution and the cam 531 again comes under the roller 530. The lever 505 is, practically speaking, a pawl-lever for the disk 510, being rendered so by the friction connection between this lever and the disk, the cam 534 acting in connection with the disk 510 as a holding-pawl to prevent the disk from moving backward on the return oscillation of the lever 505, the cam 531, carried on the word shaft, being so timed in relation to the operation of the averaging-cams, which, it will be remembered, are driven by the word-shaft, that the disk will be locked immediately after the lever 505 has moved from the position shown in full lines in Fig. 93 to the position shown in dotted lines, the lever 505 being returned by means of the spring 539, one end of which is secured to the lever and the other to the base of the machine, and the downward movement of this lever is limited by a set-screw 540, passing through the other end of the lever and abutting against a suitable stop on the frame. It will be noticed that by using this last-described mechanism, which may be termed a "friction pawl and ratchet," there is no lost motion due to the pawl moving into engagement with the teeth on either the feeding or return stroke of the lever. The disk 510 is thus stepped forward step by step, the length of such steps depending upon the particular averaging-cam which is operating the lever 505. This disk carries the pawls 521, which are in engagement with the ratchet 520 on the disk 518, and through this connection the shaft 508 is given a step-by-step movement which, through the gears 524 and 525, gives the ejector-carriage the desired step-by-step motion to feed this carriage the distance of one zone of the space-magazine in one less than the total number of steps given said carriage. It is important when the space-ejector carriage is set that it should not be disturbed in its set position until moved by the stepping mechanism, and in order to insure this result a lock is provided by which the carriage is locked in its set position as soon as set and held stationary until the time arrives for it to begin its step-by-step motion.

On the inner side of the table 830 is a pendent boss through which passes and in which is journaled a shaft 542, on the lower end of which is secured a lock 541, which is substantially identical in construction with the lock 534 just described.

543 is a lever secured to the upper end of the shaft 542 and operating the lock 541. The free end of this lever is provided with a cam-roller which engages the side of the cam 544 to actuate the lever to unlock the lock, the lock being locked by the spring 545, one end of which is in contact with the lever 543 and the other end being secured in a suitable bracket carried in the frame of the machine.

At the time the lever 484 moves the ejector-carriage to the position shown in Fig. 84 both the locks just described will be unlocked, and the disks are therefore free to rotate, and there will be a slip due to the frictional connection between the disk 510 and the collar of the lever 505 to allow of this movement of the ejector-carriage. The ejector-carriage is then moved to its set position by the rack 470, which is operated from the plate-forwarding arm 301 in the manner previously described. The cam 544 on the line-shaft is so timed that as soon as the carriage has been set by the forward movement of the plate-forwarding arm the low part of the cam 544 will come opposite the cam-roll on the lever 543 and allow the spring 545 to act, which will operate the lock 541 and lock the disk 518, and so hold the ejector-carriage in its set position, while the rack-bar 470 returns to the position shown in Fig. 86 upon the return of the plate-forwarding arm 301. Before the lock 541 has released the disk 518 the lock 534 has been allowed to operate by the cam 531 on the word-shaft, and this lock is so timed with relation to the operation of the averaging-cams that it will unlock just before the averaging-cams operate the lever 505 to move the disk 510 and will then lock the disk before the lever 505 returns. It will therefore be seen that the ejector-carriage is always locked after it has been set, except during the times when it is being stepped forward by the operation of the lever 505.

I have now described the mechanism by which the ejector-carriage is set in proper relation to the space-channels and the mechanism by which the carriage is given the step-by-step movement so that a proper sized space or combination of sized spaces will be ejected to justify the line, and I will now describe the mechanism for actuating the ejector to eject the spaces.

Referring to Figs. 86, 87, 96, 97, and 98, 545 is a shaft extending through the carriage in a direction parallel to its line of movement and having bearings in brackets 834, mounted on the table 830. 546 is a gear mounted on the shaft by a feather and groove, as before described, said gear being between the sides of the carriage, so that it moves with the carriage and along the shaft, but by the feather-and-groove connection will be rotated by the shaft. Mounted on the bar 460, carrying the ejector 462, is a rack 547, which engages with the gear 546. Mounted on the outer end of the shaft 545 is a gear 548, which is engaged by a gear-sector 549, carried on the arm 550, pivoted at 551. The arm 550 is provided with a cam-roller 552, adapted to engage a cam-groove in the side of the cam 553, loose on the word-shaft. 554 is a clutch-disk connected to the word-shaft 312 by a feather 555. 556 is a pin carried by the cam-disk 553, adapted to engage a hole 557 in the clutch-disk 554. The clutch-disk 554 is provided with a peripheral groove in which project pins carried by a yoke of the lever 558, pivoted on a pin 559, carried by a bracket mounted on the outside of the support 805. This lever is in the form of a bell-crank, and to the arm 560 of this lever is connected the bell-crank lever 561 by means of the connecting-link 562. The bell-crank lever 561, which is pivoted at 563, carries the cam-roller 564, adapted to run on the periphery of the cam 565, carried by the line-shaft. 566 is a spring one end of which is connected to the arm 562 and the other end to the frame of the machine, adapted to force the clutch-disk 554 against the cam-disk 553, the cam 565 operating to move the clutch-disk away from the cam-disk and disengage the pin from the hole 557. 567 is a spring-pressed pin mounted in the bracket 839, riding on the periphery of the cam-disk and engaging in a depression 568 in the periphery of the cam-disk 553 to prevent the cam from rotating when the clutch is thrown out. By this construction it will be seen that when the clutch is in the position shown in Fig. 97 the cam-disk 553 will be driven by the word-shaft and the sector 549 oscillated, which will oscillate the shaft 545 and through the rack 547 will operate the ejector 462, which will actuate the forcer which is in its path. It will be remembered that the ejector-carriage is set in a position one step to the left of its correct position, and the averaging-cam moves it one step into correct position before the ejector is actuated. To prevent the ejector from operating until after the carriage has been given this first step, or, in other words, the word-shaft made one revolution, I provide the clutch mechanism just as described. As has been before stated, the word-shaft starts rotating before the line-shaft has completed its revolution, and the cam 565 is so timed that it will throw out the clutch-disk 554 and hold the same out while the word-shaft is making its first revolution and that therefore during the first revolution of the word-shaft and the first step of the carriage the ejector will not be actuated and no space will be ejected. The cam 553 on the word-shaft which actuates the ejector to eject the space onto the raceway is so timed in relation to the cam 433, which operates the word-forcer, that the spaces will be ejected in front of the word as it is carried in front of the space-channels by the word-forcer, and the space will be carried along in front of each word, and it is because the spaces are inserted in front of each word that no space is inserted until after the first word has been carried past the space-channels.

*False-space extractor.*—It will be remembered that when the line is divided into words the false space following each word is depressed with the word by the depressor and carried with the word by the word-forcer. After the permanent spaces have been inserted between the words it becomes necessary to extract these false spaces, and I will next describe mechanism for accomplishing this. Each word as it is carried along the word-raceway in front of the space-channels is left by the word-carrier just in front of the latch 435, and while in this position the false-space extractor operates to extract the false space. Referring to Figs. 110 to 122, inclusive, 569 is the false-space extractor, which has a hooked outer end 570, the hook being of substantially the width of a false space. The false-space extractor 569 reciprocates in ways at right angles to the raceway formed in an L-shaped piece 580, which is itself adapted to reciprocate in ways parallel to the raceway. The other end of the extractor is provided with a slot 571, which is engaged by a head 572, carried on an arm 573. This arm is pivoted on a shaft 574, carried in brackets 575, secured to the base of the machine. Secured to the hub of the arm 573 is a second arm 576, provided with a cam-roller 577, adapted to make contact with the cam 578, carried on the word-shaft 312. 579 is a spring one end of which is connected to the lever 576 and the other end to a bracket secured to the frame of the machine and which holds the cam roller 577 in contact with the cam 578. The L-shaped piece 580 is provided with a slot 581, formed on its under side, which engages a head 582, carried on the lever 583, pivoted on the stud 584, the other end of this lever carrying a cam-roller 585, which is held in contact with the side of the cam 586, carried by the word-shaft 312, by the spring 587. The cam 578 is a complete circle except for a single depression, while the cam 586 is constructed to give the L-shaped piece 580, and consequently the extractor, three steps of motion in a direction at right angles to the motion imparted by the cam 578. The motion of the extractor in extracting a space is first to the right to move the extractor away from the false spaces which have been replaced in the false-space channel to be described; second, forward; third, to the left to engage a false space and to move the line into the galley-receiving channel; fourth, back, withdrawing the false space from the raceway, and, fifth, to the left, forcing the false space into the false-space channel, and these motions are caused by the construction of the cams 578 and 586, as will be readily seen.

*False-space-receiving channel.*—The false spaces are inserted by the extractor in one end of a false-space channel and are ejected by the false-space forcer from the other end of this channel, which I will now describe.

As the false spaces are extracted from the line they are carried back and forced under a block 588, which is pivoted at 589 and is provided with a spring-pressed latch 590, the end of said latch engaging a suitable hole drilled in the back of the raceway to hold the block in the position shown in Fig. 132. Mounted in longitudinal slots in the under side of this block are the spring-pressed plates 591, which are friction-plates to hold the false spaces in position under the block. 592 is a gate also carried in the bottom face of the block and pressed downwardly by means of the spring 593. As the false spaces are drawn back by the false-space extractor they are drawn under the gate 592, which is raised by the space coacting with the beveled forward edge of the gate, and when the extractor gives the false spaces their final movement to the left this gate drops in behind the false spaces and holds the same in the false-space channel. The plate 594, which forms the bottom of the false-space channel, at the entrance end is curved, as most clearly shown in Figs. 112 and 115, and 595 is a second plate, one end of which is held against the left-hand end of the block 588 and curved in a similar manner to the plate 594, these two plates or strips forming a channel in which the false spaces are carried after they pass from under the block 588. As a number of false spaces in this channel constantly varies, depending upon the number of false spaces which have been ejected into a line being set and also in a line which may happen to be undergoing the operation of justification, it is necessary, in order to prevent the spaces from being loose in the channel and getting out of place, to provide the channel with means whereby its length may increase or decrease to keep it always equal to the length of the line of spaces in the channel and to keep the spaces held one against the other. In order to accomplish this, I make the channel in three sections, one section being the section formed by the strips or plates 594 and 595, the second section being the section 596, which is shown as vertical and is located in the setting mechanism, and from the bottom of it the false spaces are ejected into the setter-raceway when the line is being composed. Connecting these two sections is a flexible spring-controlled section, which spring-controlled section is adapted to telescope into one of the other two sections and is under the tension of springs constantly tending to draw the flexible section into the section with which it telescopes, whereby the length of the channel is always kept equal to the length of the line of false spaces in the channel. 597 and 598 are the flexible strips forming the sides of this flexible section. As shown, one end of these strips is secured to the section 596 of the channel. The other end of the section formed by these strips telescopes into the section of the channel formed by the strips 594 595. Near the ends of the plates or strips 594 595 are cut longitudinal slots 599, and projecting through these slots are the blocks 600, which are secured to the flexible strips 597 598. Connecting these blocks is the U-shaped piece 601, this piece being connected to the blocks by means of the screws 602 and 603, the screws 603 having long heads which are engaged by the springs 604, the other ends of the springs being secured to a yoke 605, encircling the part of the channel formed by the strips 594 595. It will thus be seen that these springs constantly tend to hold the flexible section of the channel drawn into the ends of the section of the channel formed by the strips 594 595 as far as will be permitted by the false spaces contained in the channel, and as the number of false spaces in the channel varies the length of the false-space channel will vary by the springs 604 yielding to permit the yielding section to move in or out of the other section. 606 is a strip secured to the plates 594 595 to form a back for the section formed by the strips 594 595, and the stationary plate 607 forms the back for the flexible section, the edges of the flexible strips 597 598 resting against the face of this plate. The end of the section formed by the strips 594 595 is secured to the plate 607 by means of the screw 608, and the section 596 is held secured to the other end of the plate by means of the screws 609, the flexible strips 597 598 being secured to the section 596 in any desired way, as by these same screws 609. In Fig. 120 I show in detail a spring-tongue 610, which is formed by slitting the end of the plate 595 and then bending the tongue downward into the path of the spaces. It will be understood that the springs 604, which draw the flexible section down upon the column of spaces in the channel, would eject the spaces from the horizontal end of the channel unless some means was provided to prevent their escape. This result is accomplished by the spring-tongue 610 and the gate 592. It will be understood, of course, that the false spaces are ejected from the lower end of the section 596 by a forcer mechanism which has been specifically described in my application for a setting mechanism above referred to.

As the words of the line are carried forward one at a time by the word-forcer and left in front of the latch 435, each word of the line after the first one having in front of it at this time the proper-sized space and each word of the line having at its back end the false space, which at this point is extracted by the false-space extractor, as above described, the extractor when it extracts a space pushes the word, together with any words which may have preceded the word, along out of the end of the word-raceway and onto what I term a "gate," which in its normal position stands immediately under the end of the galley. The words of the line are assembled on this gate, and there the line remains until the line-key is struck to justify the succeeding line, when this gate is drawn out from under the line and the line depressed into the galley by the line-depressor. I will now describe the mechanism by which this is accomplished.

611 is a gate, one end of which projects out over the end of the galley 612, as is most clearly shown in Fig. 132. The other end of this gate is secured to a bar 613, sliding in ways in the table 830. The bar 613 is provided in its edge with a slot 614, (shown in Fig. 123,) in which works a pin 615, carried by an arm 616, pivoted on the shaft 617, which is mounted in bearings 836, secured to the table 830. Connected to the lower end of the arm 616 is the adjustable connecting-link 618, connecting the arm 616 with the lever 619, the lever 619 being loosely mounted on the shaft 480.

620 is an arm which is secured to the hub of the lever 619 and carries a cam-roller adapted to engage the cam 621, carried on the line-shaft 74.

622 is a spring, one end of which is secured to the lever 619, the other end being secured to the table 830 to hold the cam-roller of the lever 620 in contact with the cam 621. The cam 621 is so timed that as soon as the line-shaft 74 begins to revolve it will operate the lever 619 and through the connecting-link 618 the arm 616 and draw the gate out from under the line of type resting thereon, the gate being forced forward to the normal position shown in Fig. 132 by the action of the spring 622 as soon as the high part of the cam 621 has passed the roller carried on the lever-arm 620.

623 is a bar which forms practically a continuation of the top of the word-raceway, and in this bar are mounted the spring-pressed plates 624, which hold the type on top of the gate and prevent the same from tipping over.

When the gate is withdrawn in the manner just described, it is necessary to have a depressor which will depress the line down into the galley and depress the lines which are already in the galley. Straddling the bar 623 are the plates 625, which constitute the line-depressor. These plates are mounted on each side of a block 626, pivoted to the ends of the levers 627 627, both of which are secured to the shaft 617. One of the levers 627 is provided with a lug 628, which is adapted to abut against a set-screw 629, set in a stationary extension 630 of the bearing 836 of the shaft 617, the screw 629 limiting the upward motion of the lever 627.

631 is an arm fast on the shaft 617 and carrying at one end a set-screw 632 and at its other end a lug 633.

634 is a plunger mounted in a boss 837, extending up from the table 830, which is held in contact with the lug 633 by means of the spring 635, and this spring-pressed plunger tends to hold the arm 631 and the arm 627, which are both fast to the shaft 617 in the position shown in Fig. 132, in which the lug 628 is in contact with the set-screw 629.

The lever 616 is provided with a laterally-projecting lug 636, in which is mounted a plunger 637, said plunger being held in the position shown in Fig. 131 by means of the spring 638. It will be remembered that upon the operation of the cam 621 the lever 616 is swung to withdraw the gate and at the time the gate is withdrawn the parts are in the position shown in Fig. 135 with the plunger 637 in contact with the set-screw 632, carried in the arm 631, which is fast on the shaft 617. Upon further operation of the lever 631, which is operated by the further movement of the arm 616, the parts are moved to the position shown in Fig. 136, where the line is shown fully depressed into the galley by the operation of the line-depressor. The spring 638, which holds the plunger 637 in position, is a strong spring and under ordinary conditions does not yield to the pressure of the lever 631; but should the depressor for any reason meet an abnormal resistance this spring will yield to prevent breakage of parts. The end of the plunger 637 stands normally some distance away from the screw 632, so that upon the operation of the lever 618 the lever 616 will be moved and retract the gate before the plunger contacts with the screw, so that the gate will be withdrawn from under the line before the depressor is operated.

In Figs. 122, 133, and 134 I have shown means for holding the galley in position, Fig. 133 being a continuation of Fig. 122, which is broken off. 639 is a bracket which extends out from the bed of the machine, and to this bracket is secured the part 640, which at its upper end is fast to the table 830 and forms the support for the galley. 641 is a rod which extends down from the table 830 parallel with the galley-support 640, the lower end of the rod being supported in a bracket extending out from the galley-support 640, and 642 is a clamp-screw which when set up is adapted to clamp the rod in its supports. 643 is a screw tapped into an ear secured to the support 640, the screw carrying at its upper end a block 644, which engages a longitudinal slot cut in the end of the galley, the upper end of said galley resting against the plate 645, secured to the table, whereby the galley is firmly held in position. 646 is a bracket-arm which has a hub loosely engaging the rod 641, so that the bracket may slide on the rod. 647 is a wedge-shaped groove cut in the rod 641, and this groove is engaged by a similarly-shaped block 648, which is pressed into the groove by a spring 649, the tension of the spring being adjusted by the screw 650. 651 is a bar the upper end of which engages a notch cut in the adjustable block 652, the block 652 being provided with the slot 653, through which pass the clamp-screws 654, the screws being tapped into the frame of the machine. By setting the block 652 the width of the upper end of the galley is varied for varying lengths of line, the lower end of the bar 651 being held in proper position by means of the wooden blocks 655. 656 is a wooden block placed on top of the bracket-arm 646, on which the justified lines of type directly rest. 657 is a plunger mounted in the block 652 and pressed outwardly by the spring 658 and adapted to hold the top line of type in the galley in position. 659 is a T-shaped plate which is secured to a block 660, adapted to slide in ways cut in the top of the bar 623. The T-shaped plate forms the line-follower and is pressed forward against the advancing line by a suitable spring. It serves to press the words as they enter the galley-receiving channel back against the shoulder 838 and hold the words which have been forced into the channel firmly and prevent their turning over until the line is completed and depressed. It also serves to trip the word-shaft when the line has reached a predetermined length.

I will next describe the mechanism whereby, after the word-shaft has revolved a number of times equal to the number of words in the line under justification, the word-shaft clutch is automatically thrown out to stop the rotation of the word-shaft. This I accomplish by two independent means, one of which acts to stop the word-shaft when the rear end of the last word has reached the bridge and the other to accomplish the same result when the forward end of the line has reached the end of the galley-receiving channel, or, in other words, one acts when the rear end of the line has reached a predetermined point and the other when the forward end of the line has reached a predetermined point, or when the line has reached a predetermined length. Connected to the block 660 is a wire 661, said wire being connected to the block by means of the nuts 662, so that the relative position of the block 660 may be adjusted with relation to the end of the wire. The wire 661 extends to the right-hand end of the setting mechanism, where it is secured to a block 663, (see Fig. 126,) mounted upon a bar 664, which is fitted in ways cut in the front of the frame of the setting mechanism below the type-raceway and in proximity to the word-shaft clutch. The bar 664 is provided on its upper face with a rack 665, which is adapted to be engaged by a gear 666, mounted on the pivot 667. This gear 666 carries the pinion 668, and meshing with this pinion is a rack carried on a hollow sleeve 669, which is free to move in a hole bored in the frame of the setting mechanism.

670 is a pin one end of which is secured to the threaded plug 671, and the other end of which passes through a hole bored in the end of the sleeve 669. The function of this pin is to hold and guide the spring 672, one end of which rests against the screw-plug 671 and the other end of which rests against the end of the sleeve 669, tending to force the sleeve to the position shown in Fig. 126, and, through the gears 668 666, holding the bar 664 in the position shown in this figure. Through the wire 661 the spring 672 acts to hold the line-follower 659 against the end of a line which is being assembled on the gate 611, as most clearly shown in Fig. 122.

The gate 611 is in a plane slightly below the plane of the word-raceway, so that the shoulder 838 is formed, against which the type are held, the type being held down onto the gate at this shoulder by means of the friction-pin 673, which is held down by means of the plate-spring 674. It will thus be seen that as the line is assembled on the gate the plate 659 is moved to the left, and through the block 660, which carries the plate 659, the wire 661 is pulled to the left, which draws the bar 664 to the left.

675 is a plate which is provided with a longitudinal slot in its face, which plate is adapted to be adjusted to different positions for different lengths of lines on the bar 664 in accordance with a scale, which is preferably placed on the bar, the plate being held in its adjusted position on the bar by means of the clamping-screw 676 engaging in one of the holes 677, tapped into the bar 664. Depending from the plate 675 is a lug 678, through which is tapped the screw 679. The end of the screw 679 is adapted to engage a cam-surface 680, carried by the arm 681 of the trip-lever 330 and swing said lever out, so that the pin 333, carried by the clutch-lever 319, will be disengaged from the hook 332 of the trip-lever and allow the clutch-lever to be swung into the path of the bolt of the word-shaft clutch under the influence of the spring 321 and raise the bolt of the clutch, releasing said clutch and stopping the word-shaft. It will be remembered that this clutch only operates upon the completion of a revolution of the word-shaft, and that consequently while the trip will be operated upon the completion of the line on the gate, which is before the word-shaft has completed its revolution, said clutch-lever will not operate to disengage the clutch until the shaft has completed its revolution.

By the mechanism just described the word-clutch is thrown out by the line reaching a predetermined length, or, in other words, by the front end of the line reaching a predetermined position. I also provide means for throwing out the word-clutch when the rear end of the line reaches a predetermined position, and in the normal operation of the machine this latter mechanism is the one which trips the word-clutch to stop the word-shaft as the rear end of the line will reach a predetermined position—that is, pass onto the bridge before the line has been completed on the gate. This latter mechanism will also operate to stop the word-shaft after one revolution should the line-key be depressed when there is no line in the stick to be justified, as in that case the line-forcer will immediately move up to the position which it occupies when the last word of the line has been moved onto the bridge. The trip-lever 330 is provided with an arm 682, and to this arm is connected a wire 683, the other end of said wire being connected to a lever 684, fast on the shaft 685. (See Fig. 73.) 686 is a second lever also fast on the shaft 685. 687 is a hook, one end of which is pivoted to the lever 686 at 688 and the hooked end 689 of which stands in position so that it may engage a pin 690, carried by a lever 691. The free end of the hook 687 is supported on one end of a lever 692, pivoted at 693. The other end of this lever carries a cam-head 694. The hook 687 is normally held down and the cam-head 694 held up by a spring 695. The lever 691 is pivoted at 696 and is held in contact with the cam 697 by the spring 698. The cam 697 is carried on the shaft 376, which, it will be remembered, is driven from the word-shaft and rotates in unison therewith. 699 is a cam-dog carried by the line-forcer 344. The operation of this construction is as follows: When the parts are in their normal position, which is shown in detail in Fig. 74, the lever 692 is held against the stop-pin 700 by the spring 695, and the hook 689 is below the pin 690, so that as the lever carrying the pin is oscillated by the cam 697 said pin swings back and forth and does not engage the hook 689; but when the word-forcer 344 moves forward far enough to cause the cam-dog 699 to strike the cam-head 694 it will raise the hook 689 up into the path of the pin 690, so that upon the next oscillation of the lever 691 the hook-lever 687 will be drawn upon, and through the arms 686 and 684 will operate the wire 683, which through the arm 682 will trip the clutch-lever and release the clutch. The rack 346, which carries the line-forcer 343, is also provided with a camming-dog 701, (see Figs. 39 and 80,) which when the hook is in the position shown in Fig. 36 is adapted to come in contact with the cam-head 694 and throw the hook 689 in a position to be engaged by the pin 690; but the cam 697 on the shaft 376 is so timed with relation to the movement of the line-forcer that in the normal operation of the machine the lever 691 is not swung, while the hook 689 is held up by the camming-dog 701; but should for any cause the line-forcer 343 be prevented from returning with the line the nominal timing of the machine will be destroyed, and with the next revolution of the shaft 376 the hook 689 will be engaged by the pin 690 and will operate the trip to release the clutch in the manner before described, and the word-shaft will make but a single revolution.

Should for any reason the line not be properly justified—that is to say, be longer or shorter than the standard line—I have provided means which are operated by the word-clutch-releasing mechanism, which is controlled by the length of the line on the gate, to prevent the depressions of the line-key 71. Mounted on one end of the rock-shaft 73, which is operated by the line-key 71, is the arm 86, which operates the trip for the line-shaft in the manner previously described. This arm is provided with a forwardly-projecting lug 702. 703 is a lever pivoted at 704 and one end of which is provided with a slot 705, through which when the slot registers with the lug the lug 702 is adapted to pass upon the depression of the line-key. 706 is a stop against which the lever is adapted to be held by the spring 707. The lever 703 is provided with two cam-surfaces 708 and 709, the cam-surface 708 being in position to be engaged by the end of a screw 710, pendent from the block 663 on the bar 664. 711 is a screw pendent from a block 712, which is carried by the adjustable plate 675, the screw 711 being adapted to make contact with the cam-surface 709. These parts are so adjusted with relation to each other that when the line-follower 659 is in its normal position, which is with no type on the gate, the parts will be in the position shown in Fig. 126, when the lever 703 will be held in position by the screw 710 acting on the cam-surface 708, so that the lug 702 can pass through the slot 705 and allow the line-key to be depressed. As soon, however, as any type have passed onto the gate and moved the line-follower to the position shown, for instance, in Fig. 122, then the screw 710 will be moved away from the cam-surface 708, and the lever 703 will assume the position shown in Fig. 131, when, as will be clearly seen, the lug 702 will strike against the lever instead of passing through the slot, and thus prevent the line-key from being depressed, and the lever 703 will remain in this position until the line has reached the standard length. Upon the line reaching the standard length the screw 711 will come in contact with the cam-surface 709 in the manner shown in Fig. 130 and raise the lever until the slot 705 registers with the lug 702, when the lug may again pass through the slot and allow the depression of the line-key. If, however, the line on the gate should be too long, the screw 711 will move up the cam-surface 709 to the position shown in Fig. 129 and throw the slot 705 out of register with the lug 702, making it again impossible to depress the line-key. It will therefore be seen that a line composed by the setter cannot enter the justifier unless the line in the galley-receiving channel is of the proper length and until the preceding line has been entirely and completely justified.

713 represents fast and loose pulleys by which power is applied to the machine, and 714 is a copy-holder placed in convenient position for the operator.

Having now described all the parts of my machine in detail, I will briefly describe the operation of the machine in order that the relation between these parts may be clearly understood.

Power being applied to the machine-shaft 66 through the pulleys 713 this shaft is driven continuously. When now the operator presses the keys and sets the type with the false spaces between each word, as fully described in my setter application above referred to, the type as set being partly in the transferring-stick and partly in the stationary channel. Each time the operator depresses the space-key for the purpose of inserting a false space the plate-stepping-up mechanism is operated and the mechanism is stepped-up so that the proper plate may be brought into position to measure the line. When the line is of a sufficient length, the operator depresses the line-key 71, tripping the lever which holds the bolt of the line-clutch out, allowing the bolt to drop and engage one of the teeth of the toothed wheel in the line-clutch, and so starting the line-shaft 74. As soon as the line-shaft starts to rotate the type-depresser 839 is given its maximum throw by the cam 129, and the whole line of type is forced into the stick. As soon as this occurs the cam 144 operates the rack 136 and swings the stick around in position, so that its channel is in line with the line-raceway. As soon as the stick has been swung to its position the cam 146 operates the blade 145 and pushes the line out of the stick into the raceway, in the position shown in Fig. 41. While these operations are occurring the cam 284 has operated to oscillate the cam-ring 277 and by lifting the pawls brought the plate corresponding to the number of words in the line into position and allowed the actuating-ratchet to be returned to its initial position to be again stepped-up upon the depression of the space-key. When the line is forced into the raceway from the stick by the blade 145, the front end of the line abuts against the caliper-head and pushes the caliper-head forward against the tension of its spring 210 until the rear end of the line has passed the gage-stop 165, and as soon as the blade 145 is returned the line is moved back under the influence of the spring 200, which through the levers and upright shaft 194 tends to move the caliper-head toward the stop 165, so that the end of the line abuts against this stop. As soon as the rear end of the line contacts with the gage-stop, being pressed against the stop by the caliper-head, the caliper-head is located and the measurement of the line determined. This sets the bar which carries the gage-block 205 in position. The gage-block-bar lock is now operated by the cam 232 to lock the bar carrying the block in its adjusted position. As soon as the bar is locked the cam 308 allows the plate-forwarding arm to be moved forward under the operation of the spring 310 and move the plate which is in front of the plate-forwarding arm forward until it makes contact with the block 205. The movement of the plate-forwarding arm through the rack-and-gear connections draws the rack 470 to the left a distance proportional to the amount of movement of the plate until it makes contact with the block 205, the space-ejector carriage being at this time in engagement with the bar 470, so that the ejector-carriage will be given its primary setting by the forward movement of the plate-forwarding arm, the position to which it is set being determined by the distance which the plate moves forward. It will be remembered that the averaging-cams are connected to and moved with the plates when they are raised and lowered. It will therefore be seen that the averaging-cams have already been set so that the proper cam will be in a position to operate the lever 505 and step forward the carriage during the time in which the spaces are ejected. As soon as the line has been measured by the caliper-head the cam 182 operates to lift the head out of the path of the line and allow its forward movement. At the same time that the stick is being swung by the cam 144 the cam 352 operates the rack 356 and drives the hook which carries the line forward into the position shown in Fig. 36, and as soon as the line has been measured by the plate and the plate has been returned to its initial position the hook is moved in the opposite direction, carrying the line forward until the first false space in the line makes contact with the wards 342. While the hook is making its forward movement, the cam 328 has operated to trip the lever 319 and throw in the clutch of the word-shaft, so that the word-shaft has begun to rotate, and soon after the word-shaft has begun its rotation the line-shaft completes its rotation and is stopped at the end of its single revolution. As soon as the word-shaft starts to rotate the driving mechanism for the hook, which is operated from the word-shaft, begins to operate and continues to force the line into engagement with the wards. The cam 408 now operates to depress the word-depresser and separate the line into words. Immediately after each depression of the word-depresser the cam 433 on the word-shaft operates to drive the word-forcer 426 forward and carry a word by the front of the space-channels.

As soon as the word-shaft has begun its rotation the averaging-cams have begun to rotate, and these through the lever 505 have begun to step forward the space-ejector carriage one step at a time. The cam 553 through the segment 549 operates the ejector to eject a space at each revolution of the word-shaft except the first revolution, when the clutch by which the cam is connected to the word-shaft is thrown out by means of the cam 565 on the line-shaft. The cams are so timed with relation to each other that the carriage is stepped and a space ejected in front of each word as it is swept by the front of the space-channels by the word-forcer except for the first word, when while the carriage is stepped forward no space is ejected. As the words are left just in front of the latch 435 by the word-forcer, it being remembered that there is a false space at the end of each word, the space-extractor is operated through the cams 578 and 586, the extractor being given the five motions described by means of these cams and the space extracted and placed in the false-space channel. As the words are assembled they are forced over onto the gate 611 over the galley and carry forward the plate 659, and this plate will operate the word-clutch trip, when the line has attained a predetermined length, in the manner previously described. In the normal operation of the machine, however, the word-clutch is tripped by the tripping mechanism which is operated by the line-carrier reaching its predetermined position, which is the position it occupies after the last word has passed the wards. When the line-clutch is tripped out by one of these trips, the shaft completes its revolution and then stops. The gate 611 is retracted and the line depressed into the galley upon the commencement of the revolution of the line-shaft by the cam 621.

Having described my invention, what I claim, and desire to secure by Letters Patent, is—

1. In a type-setting mechanism, the combination with a pivoted stick provided with a channel in which type are assembled as set, a trip mounted on the stick and projecting into the channel in the path of the type, and an alarm device on the frame of the machine, means for swinging the stick about its pivot, and means whereby, when the stick is in position to receive the type and the type actuate the trip, the alarm device will be tripped and will operate, and whereby, when the stick is moved on its pivot and again returned to the type-receiving position, the alarm device will be reset in position to be again actuated when the trip is operated by the next line.

2. In a type-setting mechanism, the combination with a pivoted stick provided with a channel in which type are assembled as set, a trip adjustably mounted on the stick and projecting into the channel in the path of the type and an alarm device on the frame of the machine, means for swinging the stick about its pivot, and means whereby, when the stick is in position to receive the type and the type actuate the trip, the alarm device will be tripped and will operate, and whereby, when the stick is moved on its pivot and again returned to the type-receiving position, the alarm device will be reset in position to be again actuated when the trip is operated by the next line.

3. In a type-setting mechanism, the combination with means for setting type to form a line, of a stick provided with a channel in which the type are assembled as set, spring-pressed friction-plates carried by the stick projecting into the channel, the plates having a beveled edge whereby type may be easily removed from and inserted into the stick.

4. In a type setting and justifying mechanism, the combination with means for setting type to form a line, including a stick provided with a channel in which type are assembled and means for forcing the type into one end of the channel, means for delivering type from the other end of the channel, a justifying mechanism, means for operating the stick whereby it will transfer the set line from the setting to the justifying mechanism, and a hook located in the end of the stick adapted to be pressed back by the entering type to prevent the type from falling out of the receiving end of the channel during the transferring operation.

5. In a type setting and justifying mechanism, the combination with means for setting type to form a line, including a stick provided with a channel in which the type are assembled, and means for forcing type into one end of the channel, means for delivering type from the other end of the channel, a justifying mechanism, means for operating the stick whereby it will transfer the set line from the setting to the justifying mechanism, and a pair of spring-pressed hooks located in the end of the stick in position to be pressed back by the entering type to prevent the type from falling out of the receiving end of the channel during the transferring operation.

6. In a type setting and justifying mechanism, the combination with means for setting type to form a line, including a stick provided with a channel composed of a stationary side and a yielding side, the distance between the stationary and yielding sides varying at the different points in the channel, whereby when there are a plurality of type in the channel the end one of the type will always be held between the yielding and stationary sides of the channel, means for forcing type into the channel, a justifying mechanism, and means for operating the stick whereby it will transfer the set line from the setting to the justifying mechanism.

7. In a type setting and justifying mechanism, the combination with means for setting type to form a line, including a stick provided with a channel composed of a stationary side and a yielding side, the distance between the stationary and yielding sides varying at different points in the channel, whereby, when there are a plurality of type in the channel the end one of the type will always be held between the yielding and stationary sides of the channel, means for forcing type into the channel, a justifying mechanism, means for operating the stick whereby it will transfer the set line from the setting to the justifying mechanism, and hooks located in the end of the stick to prevent the type from falling out during the transferring operation.

8. In a type-setting mechanism, the combination with means for setting type to form a line, of a stick provided with a channel in which type are assembled as set, one of the sides of the channel being adjustable toward and away from the other, whereby the width of the channel may be varied, spring-pressed friction-plates projecting from one of the sides into the channel, the normal distance between the edge of the plate and the opposite side of the channel varying at different points in the channel, whereby, when there are a plurality of type in the channel the end one of the type will always be held between the yielding and stationary sides of the channel.

9. In a type-setting mechanism, the combination with a movable channel in which type are assembled into a line, a trip projecting into the channel in the path of the line and an alarm device carried by the frame of the machine and adapted to be operated by the trip when the trip is actuated by the type, to notify the operator when the line is nearly completed.

10. In a type-setting mechanism, the combination with a movable channel in which type are assembled into a line, a trip projecting into the channel, means whereby the trip may be adjusted to different positions in the channel, an alarm device carried by the frame of the machine and adapted to be operated by the trip when actuated by the type, to notify the operator when the line is nearly completed.

11. In a type-setting mechanism, the combination with a movable channel adapted to receive the type, of an alarm device carried by the frame of the machine, an adjustable trip projecting into the channel in the path of the type, and connections whereby the bell will be operated no matter what the position of the trip in the channel may be.

12. In a justifying mechanism, a line-measuring device consisting of the combination of means for supporting the composed line with the rear end thereof abutting against an abutment, a caliper-bar composed of two parts, one mounted on the other and held in adjustment in relation to each other by interlocking teeth on their contacting surfaces and means for fixing the parts in their adjusted position, a caliper-head carried by the bar and provided with means for lowering and raising it into and out of the path of the line of type, means for holding the caliper-head in contact with the end of the line of type, and a gage-block controlled and set by the caliper-bar.

13. In a type-justifying mechanism, a line-measuring device which consists of the combination of means for supporting a composed line of type with one end thereof abutting against a stop, a caliper-head, means to advance said head into contact with the other end of said line and exert the desired pressure thereon, means controlled by the movement of said head to set a gage-block in a fixed position, and means to move said head out of the path of the line.

14. In a type-justifying machine, a word-separating device, consisting of the combination of a raceway through which the line of type is moved, one of the walls of which is provided with projecting wards adapted to stop unnicked type while allowing nicked type to pass under the same, with a word-removing device located between the wards and adapted to remove the word which has passed the wards.

15. In a type-justifying machine, a word-separating mechanism consisting of a word-receiving device, part of which is stationary and part of which is movable, wards located on the stationary part of the receiving device and on either side of the movable part and adapted to stop a series of unnicked false spaces located between the words of a line of type, while allowing the nicked type to pass under the same.

16. In a type-justifying machine, the combination with a line-raceway located in one plane, of a word-raceway located in a plane below the plane of the line-raceway, a word-separating device adapted to separate the line in the line-raceway into words and transfer the same one word at a time to the word-raceway, and means for forwarding the words on the word-raceway.

17. In a type-justifying machine, the combination of a line-separator, which consists of a word-receiving device having wards above said receiving device of a size suitable to permit nicked type to pass under the same but stop unnicked false spaces, with means for forcing the line onto the word-receiving device and against the wards, and means for removing the word which has passed the wards and the false space which has made contact with them.

18. In a type-justifying mechanism, the combination of, a word-separating mechanism which consists of a spring-supported table, a word-depressing device located over the table, suitable wards arranged on a stationary part on either side of the word-depressing device, the same being arranged to allow nicked type to pass the wards but adapted to engage unnicked spaces, means for pushing the line onto the table as far as the wards will permit, means for depressing the word-depressor and a word-forcer located upon the lower level adapted to force the depressed word over the receiving-table and through a word-raceway to a point of delivery.

19. In a type-justifying mechanism, the combination with a shaft adapted to make a single revolution and then be stopped, of a second shaft adapted to make as many revolutions as there are words in the line to be justified, a space-ejecting device, a cam loose on the last-mentioned shaft, and connections whereby the space-ejecting device will be operated by the cam, a clutch adapted to connect and disconnect the cam with and from the shaft, and means carried by the first-mentioned shaft for operating the clutch, the construction being such that during the first revolution of the last-mentioned shaft the clutch will be thrown out and the space-ejector will not be operated, but during the subsequent rotations of the last-mentioned shaft the clutch will be thrown in and the space-ejector will be operated upon each subsequent revolution of the second-mentioned shaft, whereby one less space will be inserted in the line than there are words in the line.

20. In a type-justifying machine, the combination with a set of space-channels, of an ejector, adapted to eject spaces from the channels, with means for setting the ejector in its initial position in front of one of the space-channels, means for giving the ejector a step-by-step motion, consisting of a set of cams of different altitudes, a lever under which any one of the cams may be brought, means for bringing the cams into position under the lever, a disk with which the lever is held in frictional contact, pawls carried by the disk, connections between the disk and the ejector-carriage, a lock adapted to operate to lock the disk, the lock locking the disk when the lever is making its return stroke, whereby the lever, the disk and the lock will form a pawl-and-ratchet device and move the ejector-carriage step by step without lost motion.

21. In a justifying-machine, the combination of a series of independently-movable inclined plates, of a series of ways in which said plates are adapted to move independently of each other, of a carriage to which said ways are secured, and means for adjusting said ways to adjust the angle of said inclined plates with relation to each other.

22. In a justifying-machine, the combination of a series of independently-movable inclined plates, each plate differing in altitude from its adjacent plate by the same arbitrarily-selected increment, of ways in which said plates are adapted to move, a carriage to which said plates are secured, and means for adjusting said ways independently of each other in relation to said carriage, whereby the angle of said plates may be adjusted with relation to each other.

23. In a justifying-machine, the combination of a series of inclined plates with a carriage in which all of said plates are mounted and by which they may all be moved together, each plate being independently movable in the carriage in a direction at right angles to the carriage motion.

24. In a justifying-machine, the combination of a series of inclined plates with a carriage in which all of said plates are mounted and by which they may be moved together, each plate being movable independently in the carriage in a direction at an angle to the direction of the motion of the carriage.

25. In a justifying mechanism, the combination with means to determine the difference between a set line and standard, a set of independently-movable dividing-plates and means to move the same an amount determined by the shortage and particular plate moved, of means governed by the number of words in the line to be justified to determine which plate is to be moved, and mechanism, controlled by the movement of the plate, to supply spaces of the proper size to justify the line.

26. In a justifying mechanism, the combination with means to determine the difference between a set line and standard, a set of independently-movable plates and means to project any one of the same beyond the others an amount determined by the shortage and particular plate moved, of means governed by the number of words in the line to be justified to determine which plate is to be projected, and mechanism, controlled by said plate-projecting means, to supply spaces of the proper size to justify the line.

27. In a machine for justifying composed lines of type, the combination with means to determine the difference between a set line and standard, a series of independently-movable dividing-plates and means adapted to move any one of said plates an amount determined by the shortage and the particular plate moved, of mechanism for supplying the line with spaces of the proper size and number to justify said line, said mechanism being controlled by the extent of travel of the particular plate operated.

28. In a machine for justifying composed lines of type, the combination with means to determine the difference between a set line and standard a series of independently-movable inclined plates, and means adapted to move any one of said plates an amount determined by the shortage and the particular plate moved, of mechanism for supplying the line with spaces of the proper size and number to justify said line, said mechanism being controlled by the extent of travel of the particular plate operated.

29. In a machine for justifying composed lines of type, the combination with means to determine the difference between a set line and a standard, a series of independently-movable inclined plates, each plate differing in altitude from its adjacent plate by the same arbitrarily-selected increment, means adapted to move any one of said plates an amount determined by the shortage and particular plate moved, mechanism for supplying the line with spaces of the proper size and number to justify said line, said space-supplying mechanism being controlled by the travel of the particular plate operated.

30. In a machine for justifying composed lines of type, the combination with a device for measuring an unjustified line to ascertain the difference between the set line and standard, means set by the measuring device to establish a point a distance from a certain fixed point proportionate to said difference, a series of independently-movable plates, means for forcing one of the plates at a time between the two points, and means for causing a relative movement between the plates and the forcing means, whereby any one of the plates may be operated.

31. In a mechanism for justifying composed lines of type, the combination with a device for measuring an unjustified line to ascertain the difference between the set line and standard, of means set by the measuring device to establish a point a distance from a certain fixed point proportionate to said difference, a series of independently-movable inclined plates, means for forcing the plates, one at a time, between said two points, and means for causing a relative movement between the plates and the forcing means, whereby any one of the plates may be operated.

32. In a mechanism for justifying composed lines of type, the combination with a device for measuring an unjustified line to ascertain the difference between the set line and standard, of means set by the measuring device to establish a point a distance from a certain fixed point proportionate to said difference, a series of independently-movable inclined plates, each plate differing in altitude from its adjacent plate by the same arbitrarily-selected increment, means for forcing said plates, one at a time, between said two points, and means for causing a relative movement between said plates and said forcing means, whereby any one of said plates may be operated.

33. In a justifying mechanism, the combination with means to determine the difference between a set line and standard, a set of independently-movable inclined plates, and means to project any one of said plates beyond the other an amount determined by the shortage and particular plate moved, of means governed by the number of words in a line to be justified to determine which plate is to be projected, and mechanism controlled by the extent of travel of the projected plate, to supply spaces of proper size to justify the line.

34. In a justifying mechanism, the combination with means to determine the difference between a set line and standard, a set of independently-movable inclined plates, each plate differing in altitude from its adjacent plate by the same arbitrarily-selected increment, of means to project any one of said plates beyond the others an amount determined by the shortage and the particular plate projected, means governed by the number of words in a line to be justified to determine which of said plates is to be projected, and mechanism controlled by the extent of travel of the projected plate, to supply spaces of the proper size to justify the line.

35. In a justifying mechanism, the combination with means to determine the difference between a set line and standard, a set of independently-movable inclined plates and means to move the same, of means governed by the number of words in the line to be justified to determine which plate is to be moved the amount of movement being determined by the shortage and particular plate moved, and mechanism, controlled by the movement of the plate, to supply spaces of the proper size to justify the line.

36. In a justifying mechanism, the combination with means to determine the difference between a set line and standard, a set of independently-movable inclined plates, each plate differing in altitude from its adjacent plate by the same arbitrarily-selected increment, and means to move the same, of means governed by the number of words in the line to be justified to determine which plate is to be moved the amount of movement being determined by the shortage and particular plate moved, and mechanism controlled by the movement of the plate, to supply spaces of the proper size to justify the line.

37. In a mechanism for justifying a composed line of type, the combination with a device for measuring an unjustified line to ascertain the distance between the length of the set line and standard, of means set by the measuring device to establish a point a distance from a certain fixed point proportional to said difference, a series of inclined plates, each plate being adapted to measure the distance between said two points, means actuated by the type-setting device to cause a relative movement between the plates and the points, whereby a plate corresponding to the number of spaces in the set line is brought into operative relation to the points, the amount of movement of the plates for the selection of one of them being equal to the distance from the plate corresponding to the number of spaces in the line last set to the plate corresponding to the number of spaces in the line set next before the last, means controlled by the operation of plate operated to supply such a number and size of spaces as will justify the line.

38. In a mechanism for justifying a composed line of type, the combination with a device for measuring an unjustified line to ascertain the difference between the length of the set line and standard, of means set by the measuring device to establish a point a distance from a certain fixed point proportional to said difference, a series of inclined plates, each plate differing in altitude from its adjacent plate by the same arbitrarily-selected increment, and each plate being adapted to measure the distance between said two points, means actuated by the type-setting device to cause a relative movement between the plates and the points, whereby a plate corresponding to the number of spaces in the line and the points are brought into operative relation, the amount of movement in any case being equal to the distance from the plate corresponding to the number of spaces in the line last set to the plate corresponding to the number of spaces in the line set next before the last, and means controlled by the operation of the plate operated to supply such a number and size of spaces as will justify the line.

39. In a mechanism for justifying a composed line of type, the combination with a device for measuring an unjustified line, to ascertain the difference between the length of the set line and standard, of means set by the measuring device to establish a point a distance from a certain fixed point proportional to said difference, a series of plates, each plate being adapted to measure the distance between said two points and divide it into a number of parts, means actuated by the type-setting device to cause the plates to move in relation to the points, whereby a plate corresponding to the number of spaces in the line is brought into operative relation with said points, the amount of movement in any case being equal to the distance from the plate corresponding to the number of spaces in the line last set to the plate corresponding to the number of spaces in the line set next before the last, and means controlled by the operation of the operative plate to supply such a number and size of spaces as will justify the line.

40. In a mechanism for justifying a composed line of type, the combination with a device for measuring an unjustified line to ascertain the difference between the length of the set line and standard, of means set by the measuring device to establish a point a distance from a certain fixed point proportional to said difference, a series of inclined plates, each plate being adapted to measure the distance between said two points and divide it into a number of parts, means actuated by the type-setting device to cause said plates to move in relation to said points, whereby a plate corresponding to the number of spaces in the line is brought into operative relation with said points, the amount of movement in any case being equal to the distance between the plate corresponding to the line last set and the plate corresponding to the line set next before the last, and means controlled by the operation of said measuring device to supply such a number and size of spaces as will justify the line.

41. In a mechanism for justifying a composed line of type, the combination with a device for measuring an unjustified line to ascertain the difference between the length of the set line and standard, of means set by the measuring device to establish a point a distance from a certain fixed point proportional to said difference, a series of inclined plates, each plate differing in altitude from its adjacent plate by the same arbitrarily-selected increment, and each plate being adapted to measure the difference between said two points, means actuated by the type-setting device to cause said plates to move in relation to said points, whereby the plate corresponding to the number of spaces in the line is brought into operative relation with said points, the amount of movement in any case being equal to the distance between the plate corresponding to the line last set and the plate corresponding to the line set next before the last, and means controlled by the operation of said measuring device to supply such a number and size of spaces as will justify the line.

42. In a mechanism for justifying a composed line of type, the combination with a device for measuring an unjustified line to ascertain the difference between the length of the set line and standard, of means set by the measuring device to establish a point a distance from a certain fixed point proportional to said difference, a series of independently-movable inclined plates, each of which is adapted to be thrust between said two points to measure the distance between said two points and divide it into a number of parts, means actuated by the type-setting device to cause a relative movement between the plates and the points, whereby a plate corresponding to the number of spaces in the line and the two points are brought into operative relation, the amount of movement in any case being equal to the distance between the plate corresponding to the line last set and the plate corresponding to the line set next before the last, and means controlled by the extent of travel of the plate operated to supply to the line such a number and size of spaces as will justify the line.

43. In a mechanism for justifying a composed line of type, the combination with a device for measuring an unjustified line to ascertain the difference between the length of the set line and standard, of means set by the measuring device to establish a point a distance from a certain fixed point proportional to said difference, a series of independently-movable inclined plates, each of which is adapted to be thrust between the two points to measure the distance between them, means actuated by the type-setting device to cause a relative movement between the plates and the points, whereby a plate corresponding to the number of spaces in the line and the points are brought into operative relation, the amount of movement in any case being equal to the distance between the plate corresponding to the last line set and the plate corresponding to the line set next before the last, and means controlled by the extent of travel of the plate operated to supply to the line such a number and size of spaces as will justify the line.

44. In a mechanism for justifying a composed line of type, the combination with a device for measuring an unjustified line to ascertain the difference between the length of the set line and standard, of means set by the measuring device to establish a point a distance from a certain fixed point proportional to said difference, a series of independently-movable inclined plates, each plate differing in altitude from its adjacent plate by the same arbitrarily-selected increment, each of which is adapted to be thrust between said two points to measure the distance between them, means actuated by the type-setting device to cause a relative movement between the plates and said points, whereby the plate corresponding to the number of spaces in the set line and the said points are brought into operative relation, the amount of movement in any case being equal to the distance between the plate corresponding to the line last set and the plate corresponding to the line set next before the last, and means controlled by the extent of travel of the plate operated to supply to the line such a size of spaces as will justify the line.

45. In a mechanism for justifying a composed line of type, the combination with a device for measuring an unjustified line to ascertain the difference between the length of the set line and standard, of means set by the measuring device to establish a point a distance from a certain fixed point proportional to said distance, a series of inclined plates each differing in altitude from its adjacent plate by the same arbitrarily-selected increment, and each plate adapted to measure the distance between said two points, means actuated by the type-setting device to cause said plates to move in relation to said points, whereby the plate corresponding to the number of spaces in the set line is brought into operative relation with said points, the amount of movement in any case being equal to the distance between the plate corresponding to the line last set and the plate corresponding to the line set next before the last, and means controlled by the extent of travel of the plate operated to supply to the line such a number of spaces as will justify the line.

46. In a justifying mechanism, the combination with a series of plates, of mechanism for setting the same, whereby any one of the plates may be brought into position to be operated, means for holding said plates in the set position, and means for returning the setting mechanism to its initial position without returning the plates.

47. In a justifying mechanism, the combination with a series of dividing-plates, mechanism for setting the same, whereby any of the plates may be brought into position to be operated, means for holding the plates in the set position, means for returning the setting means to its initial position without returning the plates, and means to bring the plates and setting mechanism into operative relation when the setting means have been again set.

48. In a justifying mechanism, the combination with a series of dividing-plates, of means to move the plates, whereby any desired plate may be selected, the selection of the plate being effected without the plates being returned to their zero position, the selected plate operating to control the justification of a line of type.

49. In a justifying mechanism, the combination with a series of dividing-plates, each plate being adapted to determine the size of space necessary to justify a line containing a certain number of words, of means to bring the plate corresponding to the number of words in the line to be justified into operative position, said plates moving only the distance between the plate last used and the plate to be used.

50. In a justifying mechanism, the combination with means for measuring a line to determine the difference between the set line and standard, means for dividing the difference into a number of parts equal to the number of word-spaces in the line to determine the size of spaces necessary to justify the line, means for supplying spaces to the line, and an averaging mechanism connected to and moving with a part of the space-determining mechanism and adapted to control the operation of the space-supplying means.

51. In a justifying mechanism, the combination with a space-supplying mechanism of a series of plates, means for selecting any desired plate, means for actuating said plate to set the space-supplying mechanism to supply the proper size or sizes of spaces, and an averaging mechanism connected to and moving with said plates to control the operation of the space-supplying mechanism.

52. In a mechanism for justifying a composed line of type, the combination of means for setting a line of type with intervening spaces, a series of dividing-plates adapted to compute the size of the true spaces needed for justification, means for setting the plates to correspond to the number of spaces in the line, means for returning the setting mechanism after the plates have been set without moving the plates, and means for moving the plates from the position corresponding to the line set next before the one last set to the position corresponding to the line last set.

53. In a mechanism for justifying a composed line of type, the combination of means for setting a line of type with interposed spaces, a series of dividing-plates, means for setting the plates to correspond with the number of spaces in the composed line, means for returning the setting means without moving the plates after they have been set, means for actuating the setting mechanism, and means for moving the plates to the position of the setting mechanism, the distance traveled by the plates being the distance between the first plate used and the plate next to be used.

54. In a mechanism for justifying a composed line of type, the combination of a series of inclined plates, one for each of the possible number of word-spaces in a line, which are adapted to divide the shortage of the line into a number of equal parts equal to the number of word-spaces in the line, means for setting the inclined plates to correspond with the number of word-spaces in a set line, and means for moving the plates from the position given them for a given line to the position required for a succeeding line, the distance to be traveled by the plates being only the distance between the plate corresponding to the line first set and the plate corresponding to the line next set.

55. In a type-justifying mechanism, the combination with a raceway of a projection or ward extending from the side of the raceway into the path of the line of type, of a hook adapted to engage the rear of the line, driving means for said hook, and a friction connection between said hook and said driving means whereby, when the front end of the line comes in contact with the wards, the hook may stop its forward movement, while the driving mechanism continues to operate, and the line be held pressed by the hook against the wards.

56. In a type-justifying mechanism, the combination with a raceway of a hook adapted to engage behind a line of type in the raceway and carrying the line along the raceway, a rack carrying the hook and gear engaging the rack, a second gear and second rack engaging the second gear, means for reciprocating the second rack, frictional connections between the two gears whereby, when the second rack is operated, the first rack carrying the hook will be driven to feed the line along the raceway and the line may be stopped while the second rack continues its reciprocation.

57. In a justifying mechanism, the combination with a raceway of a hook adapted to carry a line of type along the raceway, of a rack on which the hook is pivoted, means for reciprocating the rack, a camway on the raceway, and a projection on the hook adapted to engage the camway, whereby, when the rack is reciprocated in one direction, the hook will be thrown out of the raceway to enable the hook to pass behind the line, and upon the reciprocation of the rack in the opposite direction the hook will be thrown in behind the line to carry the same through the raceway.

58. A channel adapted to contain type, spaces or the like composed of two sections, and means whereby one of the sections may move in relation to the other section to allow the length of the channel to increase or decrease to meet varying conditions.

59. A channel adapted to contain type, spaces or the like composed of two sections, and means whereby one of the sections may move in relation to the other and allow the length of the channel automatically to increase or decrease to meet varying conditions.

60. A channel adapted to contain type, spaces, or the like composed of two sections and a spring constantly tending to move one of the sections in relation to the other whereby the length of the channel may increase or decrease to meet varying conditions.

61. A channel adapted to contain type, spaces or the like composed of two sections one of which is flexible, and means whereby the length of the channel may vary to meet varying conditions.

62. A curved flexible channel adapted to contain type, spaces or the like whose curve may vary to meet varying conditions.

63. A channel adapted to contain type, spaces or the like composed of sections, said sections telescoping one within the other and means tending to draw one of the sections into the other, whereby the length of the channel may automatically increase and decrease to meet varying conditions.

64. A channel adapted to contain type, spaces or the like composed of sections, said sections telescoping one within the other and a spring tending to draw one of the sections into the other, whereby the length of the channel may automatically increase and decrease to meet varying conditions.

65. A channel adapted to contain type, spaces or the like composed of two sections set at an angle to each other and a flexible section uniting said first two mentioned sections, and means whereby the length of the channel may vary.

66. A channel adapted to contain type, spaces or the like composed of two sections set at an angle to each other, a flexible section uniting the first two mentioned sections and means tending to cause the flexible section to telescope with one of the first-mentioned sections, whereby the length of the channel may automatically increase and decrease to meet varying conditions.

67. A channel adapted to contain type spaces or the like composed of two sections, set at an angle to each other, a flexible section uniting the first two mentioned sections, and a spring constantly tending to cause the flexible section to telescope with one of the first-mentioned sections, whereby the length of the channel may automatically increase and decrease to meet varying conditions.

68. In a justifying mechanism, the combination with a bar adapted to be moved longitudinally to various positions by the operation of the machine, of means for locking the bar in any position consisting of a block which is moved toward and from said bar by a toggle, and means controlled by the operation of said machine for operating said toggle.

69. In a justifying mechanism, the combination with a bar provided with a longitudinal wedge-shaped groove, the bar being adapted to be moved longitudinally to various positions by the operation of the machine, means for locking the bar in any position, consisting of a block provided with a wedge-shaped projection, a toggle for moving the block toward and away from the bar, the toggle being controlled by the operation of the machine, whereby the projection will coact with the groove and lock and unlock the bar.

70. In a justifying mechanism, the combination with a bar adapted to be moved longitudinally to various positions by the operation of the machine, of means for locking the same in any position, consisting of a block, a pivoted lever carrying the block, toggle connections between the block and lever for actuating the block, and means controlled by the operation of the machine for operating the toggle.

71. In a justifying mechanism, the combination with a longitudinally-grooved bar adapted to be moved longitudinally to various positions by the operation of the machine, the groove being wedge-shaped in cross-section, of means for locking the bar in any position consisting of a block provided with a wedge-shaped projection, a pivoted lever carrying the block, toggle connections between the block and lever and means controlled by the operation of the machine for actuating the lever whereby the block is moved toward and away from the bar, so that the projection will coact on the groove to lock and unlock the bar.

72. In a justifying mechanism, the combination with a longitudinally-grooved bar adapted to be moved longitudinally to various positions by the operation of the machine, the groove being wedge-shaped in cross-section, of means for locking the bar in any position, consisting of a block provided with a wedge-shaped projection, the projection being of such size that it cannot be forced to the bottom of the groove, and a toggle mechanism operated by the machine for moving the block toward and away from the bar, so that the projection will coact with the groove to lock and unlock the bar.

73. In a justifying mechanism, the combination with a bar adapted to be moved longitudinally to various positions by the operations of the machine, of a toggle mechanism for locking the bar in any position and consisting of a block, yielding means to operate the toggle to move the block to lock the bar and positive means to operate the toggle, move the block to unlock the bar, the means being controlled by the operation of the machine.

74. In a justifying mechanism, the combination with a longitudinally-grooved bar adapted to be moved longitudinally to various positions by the operation of the machine, the groove being wedge-shaped in cross-section, of means for locking the bar in any position consisting of a block provided with a wedge-shaped projection, a toggle mechanism and yielding means adapted to move the toggle to lock the bar and positive means to operate the toggle to unlock the bar, the block being moved toward and away from the bar by the toggle, so that the projection thereon will coact with the groove to lock and unlock the bar.

75. In a justifying mechanism, the combination with a shaft of means operated by the shaft for supplying spaces to a line, and means for stopping the shaft when one end of the line has reached a predetermined position.

76. In a justifying mechanism, the combination with a shaft of means operated by the shaft for supplying spaces to a line, and means for stopping the shaft when the line has reached a predetermined length.

77. In a justifying mechanism, the combination with a driving mechanism of a shaft, a clutch for connecting the shaft to said driving mechanism, means operated by the shaft for supplying spaces to a line, and means operating when one end of the line has reached a predetermined position for releasing the clutch and stopping the rotation of the shaft.

78. In a justifying mechanism, the combination with a driving mechanism of a shaft, a clutch for connecting the shaft to the driving mechanism, means operated by the shaft for supplying spaces to a line, and means operating when the line has reached a predetermined length, for releasing the clutch and stopping the rotation of the shaft.

79. In a justifying mechanism, the combination with a driving mechanism of a shaft, a clutch for connecting the shaft to the driving mechanism, means operated by the shaft for supplying spaces to a line, means for forcing the clutch into engagement to drive the shaft, and means operated when one end of the line has reached a predetermined position to disengage the clutch and stop the rotation of the shaft.

80. In a justifying mechanism, the combination with a driving mechanism, of a shaft, a clutch for connecting the shaft to the driving mechanism, means operated by the shaft for supplying spaces to a line, means for forcing the clutch into engagement to drive the shaft, and means operating when the line has reached a predetermined length to disengage the clutch and stop rotation of the shaft.

81. In a justifying mechanism, the combination with means for inserting spaces in a line of a shaft for operating the space-inserting mechanism, a two-part clutch, one member of which is adapted to rotate with the shaft, the other member being loose thereon and continuously driven, means for causing the clutch members to engage, and means controlled by the line to cause the clutch members to disengage.

82. In a justifying-machine, the combination with means for supplying spaces to a line, of a lever operated by the line when it has reached a predetermined length to stop the operation of such space-inserting means.

83. In a justifying mechanism, the combination with means for supplying spaces to a line, of a lever operated by the line when one end of the line has reached a predetermined position to stop the operation of the space-inserting means.

84. In a justifying mechanism, the combination with means for supplying spaces to a line, of driving means to operate the same, and means operated by the line when it has reached a predetermined length to disconnect the driving and space-supplying means.

85. In a justifying mechanism, the combination with means for supplying spaces to a line, of driving means to operate the same, and means operated by the line when one end of the line has reached a predetermined position to disconnect the driving and space-supplying means.

86. In a justifying mechanism, the combination with means for supplying spaces to a line, of driving means to operate the same, and a lever operated by the line to disconnect the driving and space-supplying means.

87. In a justifying mechanism, the combination with a shaft of means operated by said shaft for supplying spaces to a line, driving mechanism for the shaft, and means operated by the line for disconnecting the shaft from the driving mechanism.

88. In a justifying mechanism, the combination with a driving mechanism of a shaft, a clutch for connecting the shaft to the driving mechanism, means operated by the shaft for supplying spaces to a line, and a lever operated by the line to disconnect the driving and space-supplying means.

89. In a justifying mechanism, the combination with a driving mechanism of a shaft, a clutch for connecting the shaft to the driving mechanism, means operated by the shaft for supplying spaces to a line, means for forcing the clutch into engagement to drive the shaft, and a lever operated by the line to disengage said clutch and stop the rotation of the shaft.

90. In a justifying mechanism, the combination with means for inserting spaces in a line, of a shaft for operating the space-inserting mechanism, a two-part clutch, one member of which is adapted to rotate with the shaft, the other member being loose thereon and continuously driven, means for causing the clutch members to engage, and a lever controlled by the line to cause the clutch members to disengage.

91. In a justifying mechanism, the combination with a driving-shaft, of a second shaft, adapted to be driven by the driving-shaft, mechanism for connecting the shafts, and means operated by a line for disconnecting the shafts.

92. In a justifying mechanism, the combination with a driving-shaft of a second shaft adapted to be driven by the driving-shaft, means for connecting the shafts, and a lever operated by a line of type for disconnecting the shafts.

93. In a justifying mechanism, the combination with a driving-shaft, of a second shaft, gearing including a clutch for connecting the shafts together, and means operated by the line for releasing the clutch and disconnecting the shafts.

Signed by me at Baltimore, Maryland, this 6th day of June, 1902.

ALEXANDER DOW.

Witnesses:
HOWARD D. ADAMS,
E. R. BERKELEY.